US012739123B1

(12) United States Patent
Lee

(10) Patent No.: US 12,739,123 B1
(45) Date of Patent: Sep. 15, 2026

(54) PROOF-OF-POLICY-COMPLIANCE (PoPC): RECEIPT-ANCHORED EXECUTION AND OUTCOME-BASED RANKING

(71) Applicant: Yong Bok Lee, Sheridan, WY (US)

(72) Inventor: Yong Bok Lee, Sheridan, WY (US)

(73) Assignee: STONE & INK ARCHIVE LLC, Sheridan, WY (US)

( * ) Notice: Subject to any disclaimer, the term of this patent is extended or adjusted under 35 U.S.C. 154(b) by 0 days.

(21) Appl. No.: 19/324,737

(22) Filed: Sep. 10, 2025

Related U.S. Application Data

(60) Provisional application No. 63/875,783, filed on Sep. 4, 2025, provisional application No. 63/863,668, filed on Aug. 14, 2025.

(51) Int. Cl.
*H04L 9/32* (2006.01)

(52) U.S. Cl.
CPC .......... *H04L 9/3213* (2013.01); *H04L 9/3247* (2013.01)

(58) Field of Classification Search
CPC ......... H04L 9/321–3213; H04L 9/3247; H04L 9/3263–3268; H04L 63/0823
See application file for complete search history.

(56) References Cited

U.S. PATENT DOCUMENTS

| | | | |
|---|---|---|---|
| 4,309,569 A | 1/1982 | Merkle | |
| 5,136,646 A | 8/1992 | Haber et al. | |
| 5,136,647 A | 8/1992 | Haber et al. | |
| 6,308,266 B1 * | 10/2001 | Freeman | G06F 21/121 713/172 |
| 8,184,812 B2 | 5/2012 | Margolis et al. | |
| 9,935,773 B2 | 4/2018 | Sarangdhar et al. | |
| 10,019,601 B2 | 7/2018 | Scarlata et al. | |
| 10,075,298 B2 | 9/2018 | Struttmann | |

(Continued)

OTHER PUBLICATIONS

Laurie, Ben; Messeri, Eran; Stradling, Rob. "Certificate Transparency Version 2.0 (RFC 9162)." IETF, Dec. 2021.

(Continued)

*Primary Examiner* — Kevin Bechtel

(57) ABSTRACT

Systems and methods for receipt-anchored, policy-compliant execution are disclosed. A trusted compute boundary (e.g., TEE, HSM, or deterministic audited sandbox) enforces a compiled policy over canonicalized inputs and emits a policy-compliance receipt whose Minimal ReceiptCore consists essentially of {policy_digest, boundary_measurement, input_digest, output_digest, monotonic_counter, trusted_timestamp}. The Core's canonical digest serves as a leaf commitment to a publicly verifiable append-only log; validators verify STH/SSH signatures, inclusion, and—on head advance—consistency within a freshness threshold (MMD). Mint-After-Verify (fail-closed) gates all follow-on privileges (e.g., capability tokens, session enablement, device RUN_PERMIT) to successful verification. Optional profiles include dual-anchor non-collusion, deterministic recompute guard, platform-authenticator prompts, and signed verification/settlement transcripts. Optional ranking computes context-conditioned, Sybil-resistant scores from validated receipts. The approach yields replay resistance, freshness-gated authorization, and independent auditability for network APIs, regulated settlement, and safety-critical actuation.

12 Claims, 18 Drawing Sheets

(56) References Cited

U.S. PATENT DOCUMENTS

| | | | | |
|---|---|---|---|---|
| 10,581,613 | B2 | 3/2020 | Ford et al. | |
| 10,831,902 | B2 | 11/2020 | Black et al. | |
| 11,243,945 | B2 | 2/2022 | Govindarajan et al. | |
| 11,424,931 | B2 | 8/2022 | Seibel et al. | |
| 11,595,215 | B1 | 2/2023 | Madden | |
| 11,621,846 | B2 | 4/2023 | Stolbikov et al. | |
| 11,677,554 | B2 | 6/2023 | Basile et al. | |
| 11,824,992 | B2 | 11/2023 | Bahety | |
| 11,997,207 | B2 | 5/2024 | Madden | |
| 12,229,302 | B1 * | 2/2025 | Panwar | H04L 9/3239 |
| 2018/0241572 | A1 | 8/2018 | Miele et al. | |
| 2018/0359096 | A1 | 12/2018 | Ford et al. | |
| 2019/0180372 | A1 | 6/2019 | Creighton, IV et al. | |
| 2020/0151840 | A1 * | 5/2020 | McCrary-Dennis | G06Q 10/101 |
| 2023/0344659 | A1 * | 10/2023 | Karame | H04L 63/123 |
| 2025/0358121 | A1 * | 11/2025 | Mullaney | H04L 9/3213 |

OTHER PUBLICATIONS

Crosby, Scott A.; Wallach, Dan S. "Efficient Data Structures for Tamper-Evident Logging." USENIX Security, 2009.

Rundgren, Anders; Jordan, Brent; Erdtman, Samuel. "JSON Canonicalization Scheme (RFC 8785)." IETF, 2020.

Bormann, Carsten; Hoffman, Paul. "Concise Binary Object Representation (CBOR) (RFC 8949)." IETF, 2020.

Schaad, Jim; Jones, Mike; et al. "CBOR Object Signing and Encryption (COSE): Algorithms (RFC 9053)." IETF, 2022.

Birkholz, Henk; Thaler, Ned; Richardson, M.; et al. "Remote Attestation Procedures (RATS) Architecture (RFC 9334)." IETF, 2023.

Intel Corporation. Intel® SGX DCAP: ECDSA Quote Library—API Reference. Intel, 2022.

Lundblade, Laurence; Mandyam, Giridhar; O'Donoghue, Henk; Wallace, Carl. "The Entity Attestation Token (EAT) (RFC 9711)." IETF, Apr. 2025.

Sporny, Manu; Guy, Amy; Sabadello, Markus; Reed, Drummond. "Decentralized Identifiers (DIDs) v1.0." W3C Recommendation.

NIST. Artificial Intelligence Risk Management Framework (AI RMF 1.0) (NIST AI 100-1). Jan. 2023.

Nakamoto, Satoshi. "Bitcoin: A Peer-to-Peer Electronic Cash System." 2008.

Boucher, Nicolas; et al. "Triad: Trusted Timestamps." arXiv:2311.06156v2, 2023.

Birgisson, Arnar; Politz, Joe; Taly, Ankur; et al. "Macaroons: Cookies with Contextual Caveats for Decentralized Authorization in the Cloud." 2014.

NIST. Zero Trust Architecture (SP 800-207). 2020.

ISO/IEC. ISO/IEC 23894:2023—Information Technology—Artificial Intelligence—Guidance on Risk Management. 2023.

IETF. "The Base16, Base32, and Base64 Data Encodings (RFC 4648)." 2006.

HL7. "FHIR Release 5—Security and Privacy Guidance." 2023.

Groth, Jens. "On the Size of Pairing-Based Non-Interactive Arguments." 2016.

Boneh, Dan; Boyen, Xavier; Shacham, Hovav. "Short Group Signatures." 2004.

Douceur, John R. "The Sybil Attack." 2002.

Mamo, Julian; et al. "Dwarna: A Platform for Dynamic Consent." European Journal of Human Genetics, 2020.

European Union. "Regulation (EU) 2024/1689—Artificial Intelligence Act. OJ L, Dec. 7, 2024." 2024.

International AI Safety Report. The International Scientific Report on the Safety of Advanced AI. Jan. 2025.

Laurie, Ben; Langley, Adam; Kasper, Emilia. "Certificate Transparency (RFC 6962)." IETF, Jun. 2013.

* cited by examiner

PROOF-OF-POLICY-COMPLIANCE (PoPC): RECEIPT-ANCHORED EXECUTION AND OUTCOME-BASED RANKING

CROSS-REFERENCE TO RELATED APPLICATIONS

Priority and incorporation. This application claims the benefit of U.S. Provisional Application Nos. 63/863,668, filed Aug. 14, 2025, and 63/875,783, filed Sep. 4, 2025, each under 35 U.S.C. § 119(e). The disclosures of the provisional applications are incorporated by reference for non-essential subject matter to the extent permitted by 37 C.F.R. § 1.57. In the event of any inconsistency, the present disclosure controls; all essential material supporting the claims is provided herein.

The title is provided for identification and does not limit the scope of the claims. For convenience, embodiments may be referred to as "PoPC" (Proof-of-Policy-Compliance) and "OutcomeRank." Such terminology is non-limiting and used interchangeably with the described embodiments.

External interoperability (non-limiting). The disclosed intent-execution-receipt-settlement rail interoperates, via the Verifier API/Gateway and Receipt Profile v1.0, with external modules including: (a) platform passkey/platform-authenticator frameworks, (b) transparency-style publicly verifiable logs (signed tree heads, inclusion/consistency proofs), (c) escrow and settlement controllers, (d) arbitration/dispute services, and (e) federated receipt indexing systems. Labels or codenames used elsewhere are non-limiting and denote generic modules. Except as expressly stated in § [0002], no external document is incorporated by reference. Compatibility does not affect claim scope.

Companion application (illustrative; non-limiting). This disclosure interoperates with a companion application titled "Trusted Reality Compositor: OS-Level Per-Frame Receipt-Gated AR/VR/Camera Overlay Render and Labeling" (TRC). In exemplary deployments, TRC consumes PoPC receipts at OS compositor gatepoints(Render/Share/Upload/Record/Clipboard) and enforces a view-permit latch; compatibility is illustrative only and no external document is incorporated by reference; the claims control.

Standards and references (non-limiting). References to public specifications or standards (e.g., WebAuthn/passkeys, transparency logs with signed tree heads, JSON Schema, post-quantum signature suites) are illustrative and used for terminology and interoperability only; adherence is not required unless expressly claimed.

Appendices as part of the specification. Appendices A-O (including the numbered bracketed paragraphs therein, e.g., Appendix D [D061]) are submitted as part of this specification and form an integral portion of the written description. The appendices provide normative schemas and protocols, representative APIs, definitions, mapping ledgers, conformance tests, ethical-use guidance, and security considerations and optional hardening profiles (Appendix M). These materials are illustrative and non-limiting; the claims control.

Equivalents & non-limiting posture. Functionally equivalent schemas, transports, cryptographic suites, log structures (e.g., STH/SSH; inclusion/consistency/SCP), and proof systems that provide comparable attestation, append-only verifiability, and freshness enforcement are within scope. Examples are illustrative; unless expressly claimed, no particular standard is required.

Policy context (illustrative; non-limiting). Evolving safety frameworks (e.g., the International Scientific Report on the Safety of Advanced AI, 2025, and state-level measures such as New York's RAISE Act) call for auditable controls, incident reporting, and verifiable safeguards for powerful AI systems. The disclosed PoPC rail produces independently checkable artifacts—anchored receipts, signed verification and settlement transcripts, and revocation entries—that can simplify such reporting and oversight while remaining technology- and jurisdiction-agnostic. These references are provided solely for context; they do not narrow the claims and no external document is incorporated by reference.

Non-patent literature (illustrative; non-limiting). Applicants cite the *International Scientific Report on the Safety of Advanced AI* (January 2025) and New York's *Responsible AI Safety and Education* (*RAISE*) *Act* (2025) solely as background context motivating auditable safety controls and incident-reporting; they are not incorporated by reference and do not limit the claims.

FIELD OF THE INVENTION

The present disclosure relates to computer security, compliance, and distributed systems—particularly to computer-implemented systems and methods for policy-compliant execution within a remotely attestable trusted compute boundary (e.g., TEE/HSM); generation of verifiable execution receipts and anchoring such receipts to publicly verifiable append-only logs (transparency-style); receipt-conditioned settlement and dispute resolution; and receipt-attested, outcome-based ranking of candidate services.

The field includes: remote attestation of trusted execution environments and hardware security modules; deterministic canonicalization of inputs/outputs (e.g., JSON canonical form per RFC 8785/JCS or CBOR canonical encoding, illustratively and without limitation) and computation of canonical digests; anchoring receipts to publicly verifiable append-only logs with inclusion proofs and consistency proofs evaluated under a policy-configurable freshness threshold (e.g., maximum-merge delay, MMD); scoped capability tokens minted only after successful verification; fail-closed control for replay/staleness/tamper detection; programmable escrow, clawback, and threshold-signed arbitration for settlement; receipt-attested, provenance-weighted ranking; and privacy-preserving proofs (e.g., zero-knowledge arguments) that enable confidential policy evaluation without revealing policy predicates or raw inputs.

Embodiments apply across cloud services and APIs, agent/tool chains and AI pipelines, OS/browser agents with platform-authenticator assertions (e.g., passkey-class), edge devices and IoT/robotic controllers, and enterprise service meshes. Computer-program-product embodiments include a non-transitory computer-readable medium storing instructions that, when executed by one or more processors, cause machines to perform the operations described herein.

Certain embodiments further support platform-level binding—for example, capability tokens audience-bound to a relying-party identifier and cryptographically bound to (i) a digest of the Minimal ReceiptCore and (ii) the token's scope; platform-authenticator assertions verified inside the TEE/HSM; and model/code identity digests recorded outside the ReceiptCore to identify model weights and/or code segments used during execution.

The foregoing description of the field provides context and classification and is non-limiting. The scope of the invention is defined by the claims, and terms are used with the meanings supplied in the specification and glossary.

References to particular standards, transports, or proof systems are illustrative and do not limit the embodiments.

BACKGROUND

Technical Field The subject matter of this disclosure relates to trusted execution, verifiable transaction processing, and outcome-based service ranking for software agents and networked services. More particularly, it concerns systems and methods that (i) encode user or owner intent and policy constraints as machine-checkable contracts; (ii) attest that an action executed within those constraints inside a trusted compute boundary; (iii) generate non-replayable, verifiable execution receipts suitable for settlement, audit, and dispute resolution; and (iv) compute outcome-based rankings of services, tools, or agents from such receipts.

Technological Context. Computing is shifting from point-and-click interactions toward autonomous and semi-autonomous agents acting across applications, APIs, devices, and cloud platforms. These agents plan tasks, call tools, spend funds, manipulate data, and increasingly control actuators. Platform security has advanced (e.g., hardware-anchored attestation in TEEs/HSMs; channel security; federated identity), yet there is no neutral, portable intent-execution-receipt-settlement rail that binds: (a) what an actor authorized; (b) the policy envelope under which execution was permitted; (c) cryptographic proof that execution satisfied those constraints; and (d) consideration (payments, credits, access) contingent on verified outcomes.

Neutral rail gap (problem statement). Despite advances in platform security—including hardware-anchored attestation in trusted execution environments (TEEs/HSMs), secure channels, and federated identity—there is no universal, portable, and impartial intent-execution-receipt-settlement rail that binds an authorized action end-to-end across heterogeneous systems.

Missing bindings (why existing measures are insufficient) . In current practice, systems rarely bind, in a cryptographically verifiable way: (i) what an actor was authorized to do (intent authorization); (ii) the policy envelope under which that authorization was granted; (iii) proof that execution conformed to those constraints (execution correctness); and (iv) outcome-contingent consideration, released only when verified outcomes are confirmed.

Consequences at agent scale. As autonomous and semi-autonomous agents act across APIs, devices, and clouds, traditional point-and-click consent and provider-controlled logs do not scale. Without a neutral, cryptographic framework that binds intent→policy→attested execution→verifiable receipt→settlement, decentralized trust and secure coordination remain difficult to achieve in multi-actor ecosystems.

Required characteristics. A viable rail MUST provide: portability of proof across trust boundaries; verifiable audit trails independent of any single provider; automated, receipt-conditioned settlement; and security assurances stronger than isolated hardware or channel protections—namely, attested execution linked to a ReceiptCore and proof-validated gating (inclusion/consistency under a policy-configurable freshness threshold, e.g., MMD) that fails closed on any verification defect.

Limits of Authorization and Provider Logging. Conventional authorization (e.g., bearer tokens, scopes) governs who may start an action, but not how the action executed or whether it conformed to constraints such as purpose limitation, residency, budget, data minimization, safety rules, or time windows. Provider-controlled logs and screenshots are mutable, incomplete, and non-portable across trust boundaries, and typically lack deterministic canonicalization of inputs/outputs or the inclusion/consistency proofs needed for independent third-party verification.

Conventional authorization gap (non-limiting elaboration). Traditional authorization (e.g., bearer tokens, scopes) governs who may initiate an action but does not attest how the action executed or whether it conformed to declared constraints, including purpose limitation, geographic residency, budget ceilings, data minimization, safety/compliance rules, or allowed time windows.

Provider-controlled evidence is insufficient. Provider logs and screenshots are typically mutable, incomplete, and non-portable across trust boundaries. They often lack deterministic canonicalization of inputs/outputs and omit inclusion/consistency proofs, preventing independent third-party verification.

Resulting verification failure. In the absence of a neutral, portable intent→receipt rail, a relying party cannot independently verify that an action: (i) was authorized for the stated intent; (ii) executed within a declared policy envelope; (iii) complied with those constraints throughout execution; and (iv) should trigger outcome-contingent consideration (payments, credits, access).

Need for a universal rail. A workable solution requires cryptographic bindings across the full lifecycle-intent→policy→attested execution→verifiable receipt→settlement—that are portable across heterogeneous platforms, APIs, and devices and do not rely on trust in a single provider's logs. (These elaborations are illustrative and non-limiting; the claims control.)

Related technologies (non-limiting). Public literature describes building blocks that address identity, authorization, execution assurance, and conditional outcomes in distributed systems. Examples include decentralized identity and verifiable credentials (for portable authorization assertions), hardware-anchored trusted execution environments (TEEs/HSMs) and verifiable computation mechanisms (for execution correctness), programmable AAA policies and zero-trust controls, and escrow/oracle arrangements for outcome-contingent release. These references are cited for terminology and interoperability context only; they do not limit the embodiments.

DID/VC (identity and authorization). In some ecosystems, agents present verifiable credentials that attest roles/capabilities. Such credentials can be consumed as inputs to an atomic intent contract (AIC); the present disclosure remains agnostic to credential formats and issuers and does not require any particular DID/VC stack.

Correct execution & proof of correctness. Execution correctness may be established via (i) an attested trusted compute boundary (TEE/HSM) that produces a boundary measurement and sealed-key signatures, and/or (ii) verifiable-computation proofs that the intended function ran on committed inputs. The disclosed ReceiptCore accepts either pathway and binds the resulting attested execution artifacts into a neutral receipt.

Zero-trust AAA and policy engines. Programmable authorization stacks can supply policy predicates and context to the AIC. The disclosed rail enforces compiled policy inside the trusted boundary and fails closed when proofs or freshness checks do not validate.

Outcome-contingent release. Outcome verification may rely on publicly verifiable append-only logs (signed tree heads, inclusion/consistency) and, where applicable, escrow/oracle components. The settlement controller releases or claws back consideration only after validation of the anchored receipt and configured dispute/arbitration outcomes.

Economic Signals Based on Proxies, Not Outcomes. Search, recommendation, and marketplace ranking systems rely on proxies (links, clicks, impressions, self-reported conversions) that are gameable and loosely correlated with task fulfillment. These signals rarely encode compliance with declared constraints. In an agent-first world—where the unit of work is an API call, tool invocation, or robotic action—ranking must be driven by attested outcomes, not interaction proxies.

Fragmented Trust and Settlement. Each platform implements a bespoke mix of access grants, logging, and billing. There is no portable receipt a verifier can validate across organizations, no multi-log anti-collusion pattern with dual anchors and consistency proofs, and no standard way to release or claw back consideration based on verifiable policy compliance. Disputes are resolved ad hoc (emails, screenshots, internal logs), raising integration cost, inhibiting interoperability, and frustrating regulators and auditors who require independently checkable artifacts.

Compliance and Liability Pressure. Emerging laws and sectoral rules require demonstrable adherence to consent, data minimization, locality, fairness/safety filters, and auditability. Enterprises must prove to customers, regulators, counterparties, and insurers that actions occurred within stated constraints. Terms of service and best-effort logging are increasingly insufficient for funds movement, health/finance operations, model-governed decisions, or physical actuation.

Attestation Without Policy Binding. Trusted execution environments attest to where/what executed, but do not attest that execution satisfied a declared policy tied to a specific intent, data scope, budget, or safety rule. Transparency-style publicly verifiable logs provide durable ordering and proofs of inclusion (and, when present, consistency), but do not by themselves attest in-policy correctness. A binding is needed between policy, attested execution, and a portable receipt that third parties can validate without trusting a single provider.

Replays, Over-Delegation, and Overreach. Delegation mechanisms frequently over-grant capabilities and lack least-privilege, context-aware tokens (e.g., time- and scope-bounded capability tokens). Absent a standard receipt with one-time nonces, connector session identifiers, and a freshness threshold tied to signed tree heads, malicious or buggy agents can replay authorizations, exceed budgets or purpose, or launder outcomes through unverifiable intermediaries-leaving principals and marketplaces with limited remedies.

Ranking Without Verifiable Evidence. Modern rankers rarely incorporate verifiable ground truth of fulfillment. Without receipts that bind intent→policy→attested execution→outcome, rankers cannot reliably preference services that actually satisfy tasks within constraints. Markets then reward activity rather than compliant accomplishment, inviting fraud and eroding trust.

Resulting Technical Problems. In view of the foregoing, at least the following problems have persisted: (a) absence of a portable, cryptographically verifiable receipt proving that an action executed within a declared policy envelope tied to a specific intent; (b) lack of a standard settlement primitive that releases or claws back consideration based on such receipts; (c) inability to compute a robust, Sybil-resistant, outcome-based ranking from verifiable receipts under comparable contexts; (d) difficulty enabling cross-platform agent interoperability while preserving least-privilege delegation, privacy, and auditability; (e) absence of a reproducible, independently auditable dispute/arbitration trail; (f) lack of deterministic canonicalization of inputs/outputs and of receipt chaining to enforce multi-step pipeline integrity; (g) lack of privacy-preserving federation of receipts across organizations while retaining attestation provenance; (h) absence of dual-anchor anti-collusion validation across independent logs; (i) lack of platform-authenticator evidence and audience-bound tokens tied to the relying party; and (j) lack of verifier-side attestation (e.g., verifier running inside a TEE/HSM with a sealed-key signature and measurement).

Conventional systems may attest runtimes (TEE/HSM) or anchor artifacts to public logs, but do not gate follow-on capabilities on independent log-freshness and consistency proofs for a canonical Minimal ReceiptCore. By contrast, the disclosed rail performs mint-after-verify gating: a token or any Follow-On Privilege issues only after a verifier validates inclusion under a signed tree head (STH) within a freshness threshold (MMD) and, upon STH advancement, a consistency proof—failing closed otherwise. This integration reduces replay/staleness and cross-domain repudiation beyond what siloed approaches achieve.

Need for an Intent-Execution-Receipt-Settlement Rail. Accordingly, there is a need for systems and methods that: (i) encode user/owner intent and constraints as an atomic, machine-verifiable contract; (ii) provision a trusted compute boundary and enforce constraints during execution; (iii) emit a proof-of-policy-compliance (PoPC) receipt binding the intent contract, boundary measurement, canonical input/output digests, timestamps, one-time nonce, connector session identifier, and participant signatures; (iv) anchor receipts to a publicly verifiable log and validate inclusion and consistency proofs under a freshness threshold (e.g., MMD), optionally with dual anchors to mitigate collusion; (v) derive time- and scope-bounded capability tokens and drive escrow release and programmable clawback from validated receipts; (vi) support selective-disclosure proofs so that redacted audit views remain verifiable; (vii) enable federated indexing of receipts using privacy-preserving protocols while preserving attestation provenance; (viii) support determinism attestation (e.g., determinism salt and code measurement) for reproducibility and a recompute check; (ix) accept platform-authenticator assertions and audience-bound tokens for high-assurance flows; (x) provide verifier-signed transcripts (and, where applicable, settlement transcripts) to furnish an independently checkable trail; and (xi) compute Outcome-Based Ranking signals from the receipt corpus, including provenance-aware Sybil resistance, so that selection, search, and marketplaces prefer services with attested fulfillment rather than proxy popularity.

Objects. Objectives include:

(a) furnish a portable, cryptographically verifiable receipt that proves an action executed within a declared policy envelope tied to a specific AIC;

(b) enable receipt-conditioned settlement with programmable clawback and threshold-signed dispute resolution;

(c) provide a least-privilege continuation via capability tokens minted only after proof validation and bound to time-to-live and scope digest (and, in some profiles, a relying-party identifier); and (d) compute OutcomeRank from validated receipts with provenance-aware Sybil resistance, so selection/search prefer attested fulfillment over proxy popularity.

Non-Limiting Summary of Advantages. Implementations described herein can: (a) convert opaque actions into verifiable transactions; (b) reduce fraud via receipt-conditioned settlement, replay/freshness checks, and dual-anchor validation; (c) simplify compliance by furnishing portable, redaction-verifiable audit artifacts; (d) enable least-privilege, time/scope-bounded capability tokens derived from verified receipts; (e) deploy with minimal disruption via transparent sidecar proxies and OS/browser agent frameworks; (f) provide determinism attestation for recomputation; (g) offer post-quantum signature options for long-term integrity; (h) promote privacy-preserving audits via selective-disclosure and zero-knowledge proofs; (i) enable verifier-in-TEE operation with sealed-key signatures and measurement; and (j) replace proxy-driven ordering with receipt-proven outcome ranking resilient to replay and Sybil manipulation. While specific technologies (e.g., TEEs, secure elements, zero-knowledge proofs, threshold signatures, publicly verifiable logs) may be employed in exemplary embodiments, the concepts are technology-agnostic and may be realized using equivalent mechanisms that provide comparable attestation, enforcement, and verifiability.

Unlike link-graph popularity, OutcomeRank uses attested receipts with independence/diversity floors and publishes a signed ranking transcript committing to the contributing receipt and STH/SSH identifiers for auditability. Functionally equivalent schemas/transports/crypto suites with comparable security/verifiability fall within scope (see § [D162]).

Non-capture interoperability (illustrative). Deployments may prefer multi-operator anchoring and open conformance suites; these choices are illustrative and do not limit claim scope, which remains defined by the claims and the technical invariants (Minimal ReceiptCore→anchor→freshness/consistency→MAV).

Terminology. As used herein: an "agent" is software that plans and/or executes operations on behalf of a principal across one or more services; an "atomic intent contract (AIC)" is a machine-readable artifact specifying an actor, permitted operation(s), policy constraints, compensation terms, expiry, and dispute rules; a "proof-of-policy-compliance (PoPC) receipt" is a non-replayable, cryptographically verifiable record binding an AIC to attested execution artifacts and timing, optionally including a parent-receipt pointer, one-time nonce, and connector session identifier; a "publicly verifiable log (transparency-style)" is an append-only structure that exposes signed tree heads (STHs) and provides inclusion and consistency proofs; "deterministic serialization" means a canonical, unambiguous encoding of inputs/outputs used to compute canonical digests; a "determinism salt" and "code measurement" attest reproducible execution inside a deterministic sandbox; a "selective-disclosure proof" demonstrates that a redacted audit view is derived from committed receipt fields; a "continuity record" links successive STHs via validated consistency proofs; a "platform-authenticator assertion" is an assertion (e.g., passkey/WebAuthn-class) produced by a platform-resident authenticator and verified within a TEE/HSM; an "audience-bound token" encodes a relying-party identifier and is bound to a digest of the Minimal ReceiptCore and token scope; and a "trusted compute boundary" encompasses hardware-backed or verifiably deterministic execution environments capable of producing attestable measurements and enforcing policies. The words "comprise," "include," and variants are used in an inclusive sense. As used herein, "trusted execution boundary" and "trusted compute boundary" are used interchangeably to denote a hardware-anchored TEE/HSM or a verifiably deterministic audited sandbox capable of producing attestable measurements.

Disclaimers. References to commercial products, protocols, or standards are exemplary, not limiting, and do not constitute admissions regarding the state of the art. The problems and needs articulated above are provided to motivate the disclosed technology and are not prior-art admissions. Nothing herein is presented in Jepson format and no preamble statement is an admission of prior art.

SUMMARY OF THE INVENTION

Disclosed are computer-implemented systems and methods that provide a neutral, portable intent-execution-receipt-settlement rail for software agents and networked services. In exemplary embodiments: an actor signs an atomic intent contract (AIC) declaring permitted operations and policy constraints; the operation executes inside a remotely attestable trusted compute boundary (e.g., TEE/HSM) that enforces the constraints; a proof-of-policy-compliance (PoPC) receipt is emitted that binds the AIC to attested execution artifacts; the receipt is anchored to a publicly verifiable append-only log (transparency-style) and validated with inclusion and consistency proofs under a freshness threshold (e.g., maximum-merge delay, MMD); a capability token is minted only after successful verification and a fail-closed controller denies the operation upon any verification failure; settlement is conditioned on independent validation of the receipt (with programmable clawback in a revocation window); and an OutcomeRank is computed over corpora of validated receipts.

Key rule. No capability token is minted until inclusion (and, upon STH advancement, consistency) is validated under the MMD freshness policy—and, where enabled, under dual-anchor non-collusion.

In one aspect, a system includes: (i) an intent wallet storing AICs that specify actor, resource scope, machine-enforceable policy, compensation, expiry, and dispute rules; (ii) an execution engine operating within a trusted compute boundary (e.g., TEE, HSM, or verifiably deterministic audited sandbox) that verifies remote attestation prior to provisioning secrets and enforces the policy during a permitted operation via a connector to an external service; (iii) a receipt generator that computes a ReceiptCore comprising a policy digest, a boundary measurement, canonical input and canonical output digests computed from deterministic canonicalization, a monotonic counter, and a trusted timestamp, and produces a sealed-key signature from within the boundary; (iv) a log interface that anchors the receipt by submitting a commitment to a publicly verifiable append-only log and obtaining a signed tree head (STH) and an inclusion proof; (v) a verifier module that validates the inclusion proof and a consistency proof to a more-recent STH obtained within the freshness threshold; (vi) a capability token minter that cryptographically binds the token to the verified receipt; (vii) a fail-closed controller that withholds the token and denies the operation upon any freshness/replay/proof failure; and (viii) a publication component that emits a digitally signed verification transcript identifying receipts, STH/SSH identifiers, and, in some embodiments, a continuity record linking successive STHs.

In some embodiments, the PoPC receipt (a) embeds a parent-receipt pointer that references a prior receipt in a multi-step pipeline; (b) includes a one-time nonce and connector session identifier bound to the attestation quote or report; (c) is anchored with a cryptographic commitment (leaf digest of the canonical Minimal ReceiptCore) whose inclusion proof is verifiable against an STH; (d) is validated under a freshness policy (e.g., MMD) and, in certain profiles, under dual-anchor non-collusion across independent logs; and (e) supports a recompute guard in which a canonical output digest must reproduce from attested inputs, determinism_salt, and code_measurement. Validators reject replays, enforce pipeline integrity across chained operations, and fail-closed on any mismatch.

Second Aspect—Method. In another aspect, a method includes: receiving a signed AIC; verifying remote attestation of a trusted compute boundary and binding secrets to an attested boundary measurement; enforcing the compiled policy while performing a permitted operation via one or more connectors; computing a PoPC receipt with canonical digests, timestamps, and a monotonic counter; producing at least one digital signature from within the boundary; anchoring the receipt to a publicly verifiable append-only log and obtaining an inclusion proof and validating a consistency proof within a freshness threshold; minting a capability token bound to the verified receipt; and releasing escrow responsive to validation of the receipt against the AIC and proofs. The method may initiate clawback upon attestation revocation, policy-contradiction signals, or arbitrated defects within a revocation window, and may emit a signed verification transcript.

Third Aspect-Non-Transitory Medium. In a further aspect, a non-transitory computer-readable medium stores instructions that, when executed by one or more processors, cause the foregoing method to be performed and bind the intent wallet to a platform secure element, passkeys/platform-authenticator assertions, or an operating-system agent framework enforcing user-consent prompts.

Fourth Aspect-Outcome-Based Discovery and Ranking. In yet another aspect, a ranking engine maintains a receipt corpus of anchored PoPC receipts, encodes a current task/policy as a context feature vector, and computes an OutcomeRank for candidate tools/services based on frequencies of receipt-proven successful outcomes in similar contexts subject to cost and constraint satisfaction. The engine may: (i) down-weight or exclude candidates lacking attested receipts or verifiable anchors; (ii) apply provenance-aware discounting using attestation vendor/hardware diversity, key continuity, and cross-party signature entropy; (iii) perform deduplication via canonical digests and incorporate freshness decay and domain-specific safety thresholds; (iv) generate an explainable ordered list; (v) produce, on request, a digitally signed ranking transcript and an explainability payload identifying a weighted subset of receipts whose aggregate weight exceeds a defined fraction of the score; and (vi) optionally anchor a commitment of the ranking transcript for audit, or emit a privacy-preserving proof attesting to the ranking without revealing raw inputs.

Policy & Privacy Extensions. In some embodiments, the policy is expressed as a declarative rule set or finite-state machine compiled to bytecode executed inside the trusted compute boundary. The PoPC receipt may embed a zero-knowledge proof that selected predicates (e.g., age, residency, budget caps, safety rules) were satisfied without revealing underlying inputs or the predicates themselves (confidential policy). Predicates MAY also require presence of a Right-of-Publicity Consent Token(RPCT) for depicted faces/voices; satisfaction can be proven with selective-disclosure or zero-knowledge without revealing subject identity. (Illustrative.) Implementations may employ selective-disclosure proofs so that a redacted audit view remains verifiable against committed receipt fields. Long-lived receipts may use post-quantum signatures in addition to classical signatures.

Child-Safety Profile (illustrative; non-limiting). Implementations MAY enable a Child-Safety Profile (CSP-01) in which selected predicates—e.g., age-of-majority satisfied, guardian/co-sign consent present, no targeted content class, time-of-day window, geofence (school/home), and spend/budget caps—are enforced inside the trusted compute boundary. Predicate satisfaction MAY be attested by zero-knowledge proofs without revealing underlying data or the predicates themselves. Failure of any predicate SHALL deny Mint-After-Verify (MAV) and FAIL-CLOSED; acceptance remains governed solely by the Minimal ReceiptCore→anchor→freshness/consistency→MAV gate described herein. This profile is illustrative; the claims control.

Least-Privilege Continuations. In some embodiments, a validated receipt yields a capability token bound to time-to-live and scope digest (and optionally resource identifiers) that authorizes follow-on operations under least privilege; connectors reject tokens presented outside the time-to-live or with a mismatched scope digest. Tokens may be audience-bound to a relying-party identifier and may reference the receipt's log anchor for traceability. In high-assurance modes, platform-authenticator assertions are verified inside the TEE/HSM prior to mint.

Examples of follow-on operations include activation of an OS- or browser-resident view-permit latch that gates overlay rendering in a reality compositor; such a latch is a Follow-On Privilege (FOP) governed by the Mint-After-Verify rule. (Illustrative; claims control.)

Settlement & Arbitration Variants. Settlement may employ programmable escrow, including distributed-ledger smart contracts, supporting milestones, partial refunds, chargeback limits, and bonds. Arbitration quorums may comprise independent entities whose threshold signatures are linked to the PoPC receipt and anchored to the publicly verifiable log; the settlement controller updates state in response to signed resolutions and may produce a digitally signed settlement transcript.

Compliance Interface. Implementations can expose a regulator-verifiable audit view that redacts sensitive inputs while preserving verifiability of at least the policy digest, boundary measurement, signatures, and timeline. Anchoring may use transparency-style, publicly verifiable append-only logs (including public chains). Verification artifacts may include continuity records linking successive STHs.

Evidence bundles (illustrative). An auditor bundle profile aggregating receipt(s), anchor(s), transcript(s)/certificate(s), and (where applicable) aggregate commitments is defined in Appendix H; bundles are normative for interop and illustrative for claim scope. Bundles MAY include runtime certification results and view/interaction transcripts from a TRC-style deployment as additional evidence; these artifacts are optional and do not affect Minimal ReceiptCore semantics.

Reference assets (non-limiting). To facilitate interoperability and pilot deployment, this specification includes Appendix J (golden test vectors), Appendix K (reference Verifier OpenAPI sketch), Appendix L(RUN_PERMIT reference latch I/O and timing), Appendix N($R^2$UA schemas), and Appendix O (wire interop & standard headers). These materials are provided solely for regulatory, audit, and pilot convenience and do not limit the scope of the claims Hardware & Deployment Options. The trusted compute boundary may comprise Intel SGX, Intel TDX, AMD SEV-SNP, ARM TrustZone, secure enclaves in cloud/edge devices (e.g., AWS Nitro Enclaves), or a verifiably deterministic audited sandbox with external attestation. The system may execute on endpoints (an OS/browser "intent wallet"), servers, transparent sidecar proxies fronting legacy services, edge gateways, or IoT/robotic controllers.

Security & Resilience. Embodiments may include anti-replay counters, monotonic trusted time, key rotation and revocation lists, multi-party key custody, and fallback verification paths. The execution engine can produce a determinism_salt and code_measurement to attest reproducible execution in a deterministic sandbox. Receipt validation can survive provider outages by relying on independently verifiable anchors, cached inclusion proofs, and, in certain profiles, dual-anchor validation across independent logs.

Interoperability. A standardized AIC schema, PoPC receipt format, and Verifier API permit cross-platform interoperability among agents, services, marketplaces, and regulators. Federated indexing of the receipt corpus may employ privacy-preserving aggregation using at least one of private set intersection and homomorphic encryption, while retaining attestation provenance.

Interop profiles (e.g., Appendix D PROFILE-SEL-01) allow ingesting third-party pre-authorization or tribunal artifacts as oracle attestations or transcript evidence while preserving PoPC's Minimal ReceiptCore→anchor→freshness→MAV gate.

Advantages. Compared with conventional access control and provider logging, disclosed embodiments: (i) convert opaque actions into verifiable transactions; (ii) condition settlement on policy-compliant outcomes proven by validated receipts; (iii) enable auditable least-privilege delegation; (iv) provide portable artifacts for regulatory audit; and (v) replace proxy-based ordering with receipt-attested, Sybil-resistant ranking that rewards compliant accomplishment.

Non-Limiting Nature. The foregoing summaries are provided to introduce select concepts and do not identify essential features or limit the scope of the claims. Other embodiments, equivalents, and variants will be apparent in view of this disclosure.

Interoperability posture (non-limiting). Embodiments may interoperate with DID/VC identity stacks, platform-authenticator frameworks, transparency-style logs, verifiable-computation proofs, and escrow/oracle services; no particular standard is required unless expressly claimed. Implementations MAY interoperate with license-bound workflows (e.g., LBTC) by carrying a license manifest digest (e.g., CLM) and license-event/consumption proofs (e.g., LER/LCP) as Oracle Attestations and/or EvidenceBundle items; PoPC validity remains governed solely by Minimal ReceiptCore→anchor→freshness→MAV.

Industrial applicability (pointer). For sectoral deployments, regulatory alignment, and licensing patterns, see § XI (INDUSTRIAL APPLICABILITY).

Single General Inventive Concept (examiner convenience; non-limiting).

The system, server/verifier, settlement controller, and ranking method are implementations of one inventive concept whose special technical feature is: a Minimal ReceiptCore whose canonical digest is the leaf commitment recorded in a publicly verifiable append-only log; verifiers enforce inclusion and, upon STH/SSH advancement, consistency within a freshness threshold (MMD); and Mint-After-Verify (MAV) fail-closed gating denies any follow-on privilege until those validations succeed. Settlement and ranking operate only on such validated receipts and therefore are downstream uses of the same feature. (Illustrative; the claims control.)

Unity & search guidance (examiner convenience; non-limiting).

Examination of any independent claim necessarily searches and evaluates the same ReceiptCore/commitment identity/public-log freshness/MAV feature set; the settlement and ranking aspects are not distinct inventions for restriction purposes because they require validated receipts committed per the foregoing rules. Specification anchors include §§ [0042A] (Minimal ReceiptCore, commitment identity), [0043]-[0043A] (canonicalization), [0044]-[0044E] (anchoring, MMD, SSH/SCP equivalence), [0055A] (continuity), [0098]-[0105] (verifier/settlement), [0109]-[0111B] (ranking), and Appendices A, D, E, and H.

SYSTEM ARCHITECTURE OVERVIEW

Overview. This section specifies the architecture, data formats, and enforcement profiles for the intent-execution-receipt-settlement rail. It defines normative component roles, the Receipt schema and ReceiptCore composition, anchoring and freshness policies, replay/chain rules, attestation and revocation handling, federation, timers, cryptography, OS/browser integration, capability-token derivation and enforcement, compliance views, and ranking outputs. Protocol imperatives (MUST/SHOULD/MAY) denote conformance for implementations and do not limit claim scope; the claims control.

Conventions. The key words "MUST," "MUST NOT," "SHOULD," "SHOULD NOT," and "MAY" are used as in RFC 2119 and RFC 8174 to express normative requirements for interoperability. Where a paragraph cites other sections, cross-references identify paragraph numbers (e.g., "see §§ [0053]-[0055]"). Use of MUST/SHOULD/MAY expresses interoperability profiles and does not limit claim scope.

A. Reference Components

Logical subsystems. An exemplary deployment comprises: Intent Wallet (IW); Execution Engine (EE); Connector(s); Receipt Generator(RG); Log Interface (LI); Verifier (V); Settlement Controller (SC); Dispute/Arbitration (DA); OutcomeRank Engine (ORE); Compliance Interface (CI). (Functional roles defined in detail below.)

Minimum conformance profiles—Cloud Enclave, OS/Browser Wallet, Robotic/IoT (rtPRC)—are defined in Appendix A § [A026]; paragraph references herein describe profile-neutral behavior.

B. Normative Receipt Schema

Receipt object. A PoPC Receipt MUST contain the following fields; field names are normative. Optional extensions are indicated.

```
Receipt {
  version        : u16;         // schema version
  receipt_id     : bytes32;     // digest of canonical Minimal ReceiptCore
  aic_id         : bytes32;     // digest of AIC (hex32)
  policy_digest  : bytes32;
```

-continued

```
  boundary_measurement : Attest {          // aligns with D030
       vendor, model, fw, tcb,
       quote, measurement
     };
  code_measurement   : bytes32;
  determinism_salt   : bytes*;            // ≥128-bit recommended (variable-length by profile)
  io_canon           : Canon { alg, params };
  input_digest       : bytes32;
  output_digest      : bytes32;
  t_start            : time64;
  t_end              : time64;            // trusted_timestamp inside Minimal ReceiptCore
  monotonic_counter  : u64;
  nonce              : bytes*;
  session_id         : bytes*;
  parent_receipt_id  : bytes32?;
  anchor             : Anchor { log_id, tree_head, commitment };
  inclusion_proof    : Proof[ ];          // array of { sib: bytes32, pos: L|R}
  signatures         : SigSet { actor?, engine?, service? };
  pq_signatures      : SigSet?;
  zk_proofs          : ZK[ ]?;
  provenance         : Prov?;
  model_identity_digest : bytes32 ?;
  extensions         : Map<String,Bytes>?;
}
```

Consistency-proof carriage. Consistency proofs are not fields of the Receipt. They are obtained and validated during verification and MAY be conveyed in Anchor artifacts (Appendix D [D050]) or referenced in transcripts. Verifiers MUST require and validate a consistency proof upon STH/SSH advance within MMD (see §§ [0044A], [0055A]).

ReceiptCore Profiles (normative). Minimal Core (claims-aligned). ReceiptCore consists essentially of {policy_digest, boundary_measurement, input_digest, output_digest, monotonic_counter, trusted_timestamp (t_end, time64)}. It excludes anchor, inclusion_proof, signatures (including PQ), zk_proofs, provenance, model_identity_digest, and extensions. The leaf commitment (anchor.commitment) and receipt_id are computed over a canonical encoding of the Minimal ReceiptCore.

Extended fields (outside the Core). Deployments MAY record additional data outside the ReceiptCore (e.g., code_measurement, determinism_salt, t_start, nonce, session_id, parent_receipt_id). Some non-Core fields (e.g., io_canon) are REQUIRED by the Receipt schema to ensure reproducible canonicalization; they remain outside the Minimal ReceiptCore. Such fields do not change the canonical encoding used for the Minimal ReceiptCore commitment.

Trusted-time presentation (non-core). The Core uses a numeric time64 t_end as the trusted timestamp. Human-readable RFC-3339 mirrors MAY appear only in transcripts/certificates and do not affect the Core commitment.

Commitment identity (normative). receipt_id=H (canonical (Minimal ReceiptCore)) and anchor.commitment=receipt_id. See Appendix D.K for byte-exact canonicalization→hash→receipt_id/anchor.commitment (illustrative; claims control).

Interoperability test vectors are referenced in Appendix A § [A040] and may be published separately; claims are independent of any test data.

Schema references (illustrative). Representative JSON outlines for the AIC and PoPC receipt appear in Appendix B (see [B003], [B005]); capability token and anchor formats appear in Appendix D ([D040], [D050]). See Appendix D [D140] for a worked canonicalization/commitment example. These schemas are normative for interoperability and illustrative for claim scope.

Optional-field notation. In the informal schema outlines in this specification (e.g., the Receipt outline in § [0042]), a "?" suffix denotes an optional field (for example, parent_receipt_id: bytes32?). This shorthand is for readability only and does not limit claim scope. The normative wire formats are the JSON Schemas in Appendix D. Illustrative schema excerpts in this specification are interoperability aids; minor syntactic differences in examples do not alter ReceiptCore semantics or claim scope.

Canonicalization. Inputs/outputs MUST be serialized deterministically prior to hashing. Implementations MUST support at least one of: (i) JCS(RFC 8785) for JSON canonical form, or (ii) CBOR Canonical Encoding (CTAP2). io_canon.alg MUST identify the algorithm (e.g., JCS+SHA-256, CBOR+SHA-256), and io_canon.params MAY record fixed-field ordering or normalization options. Digest suites MUST be algorithm-agile; default SHOULD be SHA-256; long-lived records MAY use SHA-512/256. Where ZK circuits are used, implementations MAY employ ZK-friendly permutations (e.g., Poseidon) for auxiliary proofs while preserving the canonical Minimal ReceiptCore digest for anchors. The cryptographic commitment over the canonical Minimal ReceiptCore is computed by a registry-identified digest (default SHA-256).

Implementations SHOULD support deterministic JSON (e.g., RFC-style canonical JSON) and CBOR canonical encodings via io_canon to ensure stable digests across platforms. Implementations MAY alternatively employ length-prefix encodings (e.g., varint-prefixed frames) to guarantee unambiguous parsing; io_canon.params MAY record the length-prefix scheme. Such encodings remain deterministic and produce the same canonical digests. Algorithm and io_canon parameter identifiers SHOULD be drawn from a deployment registry; see Appendix A [A037]. (Informative; claims control.)

Worked example. See Appendix D.K for a byte-exact canonicalization and digest test vector; Appendix D schemas remain the normative wire formats. Illustrative inputs include a scene_digest that binds an overlay to captured reality (e.g., pose/time/depth/feature hash) for AR/HUD placements; scene_digest is recorded via io_canon and remains outside the Minimal ReceiptCore. (Illustrative.)

Registry note (illustrative; non-limiting). Deployments MAY publish an algorithm/parameter registry (hash, signature, io_canon identifiers) and cutover-policy IDs referenced by transcripts and certificates; registry use does not affect claim scope.

Anchoring. anchor.commitment MUST be a leaf commitment (the digest of the canonical Minimal ReceiptCore). The inclusion_proof MUST verify that this leaf is a member of a tree rooted at the signed tree head (STH) of a publicly verifiable append-only log (transparency-style), and consistency proofs MUST be verifiable for subsequent STHs. Multiple anchors MAY be recorded (e.g., a transparency log and a public chain). Follow-on privileges are subject to the Mint-After-Verify Rule in Appendix A [A107].

Signed Tree Head (STH) & Maximum-Merge Delay (MMD).

An STH is the log's digitally signed commitment to a Merkle-tree root at a given tree_size and timestamp. "Freshness threshold" means a configured Maximum-Merge Delay (MMD): the maximum acceptable age of the referenced signed head relative to the operation's trusted end time (t_end) or, where so configured, to a verifier policy epoch. Validators MUST (i) verify the STH's digital signature under a public key associated with the log; (ii) enforce freshness by rejecting any inclusion proof that references an STH older than MMD; and (iii) verify a valid inclusion proof that the commitment (equal to H (canonical (Minimal ReceiptCore)) per § [0042A]) is included under that STH. Where a newer STH/SSH than anchor.tree_head (or sth_id) is available within the applicable MMD, validators MUST require and verify a cryptographic consistency proof linking the referenced head to the newer head and SHALL deny if the proof is absent or invalid. References to STH apply equally to SSH (Signed Set Head) and to their associated append-only proofs per § [0044E]. By way of example, a runtime overlay profile MAY configure MMD on the order of minutes (e.g., ≤600 s) while preserving the same freshness semantics. (Illustrative.)

Multi-anchor non-collusion. For deployments requiring higher tamper resistance, receipts MAY be anchored to at least two independent publicly verifiable logs. Validators MUST deny when (i) inclusion proofs disagree on the committed leaf or (ii) a consistency proof fails for either log's STH chain within the applicable MMD.

Attested Transport Enforcement (aTLS). In high-assurance profiles, the subsequent operation MUST be performed over a mutually authenticated transport whose client credential is cryptographically bound, by remote-attestation evidence, to the trusted boundary measurement that produced the Minimal ReceiptCore; connectors SHALL deny non-attested sessions. (See Appendix A [A044A].)

Mint-after-verify (dual-anchor). Where the dual-anchor profile is enabled, capability-token minting MUST require validated inclusion proofs (with STH-signature verification) for each independent log within the applicable freshness thresholds. (see Appendix A [A107])

Generalized anchoring. Anchoring and verification apply identically where the log publishes a Signed Set Head (SSH) rather than an STH, and where inclusion/consistency proofs are provided as a Set Consistency Proof (SCP). Validators SHALL treat STH/SSH and inclusion/consistency/SCP as functionally equivalent for acceptance and freshness enforcement (including MMD), unless a particular profile expressly specifies otherwise. Functionally equivalent cryptographic structures (e.g., vector-commitment logs, polynomial commitments, or zk-SNARK/zk-STARK-anchored inclusion proofs) MAY be used in the same roles, provided they furnish append-only guarantees and verifiable freshness under the Maximum-Merge Delay (MMD) policy; generalizations are illustrative and non-limiting. Verifiers SHOULD periodically gossip recent STH/SSH identifiers and anchor a signed continuity record at a policy-defined cadence T to deter split-view attacks (see § [0055A]; Appendix A [A074]).

Replay prevention. Verifiers MUST reject any receipt that reuses a prior nonce or session_id (namespace per Appendix A [A084]), or whose receipt_id collides with a previously anchored record under the same log. (Dual-anchor deployments expect the same receipt_id across different logs.)

Receipt chaining. If an operation is part of a multi-step pipeline, parent_receipt_id MUST reference the immediately preceding step. Validators MUST confirm a contiguous chain of anchored receipts for end-to-end provenance. Mint-after-verify gating SHALL deny capability-token issuance unless the required contiguous chain of anchored receipts is validated within the freshness policy. For each link, child. parent_receipt_id MUST equal the parent's anchor.commitment; any STH/SSH advance between adjacent links MUST be covered by a valid consistency_proof within MMD.

C. Trusted Compute Boundary & Determinism Model

Boundary types. The trusted compute boundary MAY comprise a TEE (e.g., Intel SGX/TDX, AMD SEV-SNP, ARM TrustZone/CCA-RME, cloud enclaves such as AWS Nitro Enclaves), an HSM, or a verifiably deterministic audited sandbox producing attestation evidence. Examples are illustrative and non-limiting.

Edge/IoT trust attributes (optional). Device/edge connectors MAY be labeled with trust attributes (provisioning method, attestation freshness/tenure, key custody, physical-tamper posture). Verifiers MAY down-weight or deny based on these attributes under policy.

Deterministic execution. Where a deterministic audited sandbox is used, the execution engine (EE):

(i) MUST emit a determinism_salt recorded in the receipt outside the Minimal ReceiptCore (Appendix A [A109]);

(ii) MUST ensure that all admissible entropy for the run derives solely from determinism_salt, and that any sources of non-determinism (e.g., wall clock, network, RNG) either are included in canonical inputs (so they contribute to input_digest) or are derived solely from determinism_salt; otherwise they are disallowed;

(iii) MUST record code_measurement and boundary_measurement in the receipt (outside the Minimal ReceiptCore);

(iv) MUST satisfy the recomputation property: a run is reproducible iff, given {AIC, canonicalized inputs, determinism_salt, code_measurement}, the canonical output_digest recomputes identically; and (v) MAY derive determinism_salt from boundary_measurement and MAY incorporate a verifier-issued challenge nonce bound to an STH/SSH identifier (Appendix A [A114]); the resulting salt value SHALL be recorded in the receipt.

Recompute test. A receipt is INVALID if, given {AIC, inputs, determinism_salt, code_measurement}, the canonical output_digest fails to recompute identically. Where a verifier-issued challenge nonce is used per § 0048, recomputation SHALL use the same nonce as captured in determinism_salt. Verifiers SHOULD emit a signed Deterministic Recompute Transcript (DRT) indicating recomputation status (see Appendix O [O020]).

Deterministic recompute profile. When a recompute guard is enabled, implementations derive determinism_salt from the trusted boundary measurement and a verifier-supplied challenge nonce bound to an STH/SSH identifier and use it when recomputing the canonical output_digest from the canonical inputs under an attested code_measurement (see Appendix O [O010]-[O020]).

Dual-path correctness (optional). Where attestation trust degrades, verifiers MAY accept a recompute-verified receipt chain (determinism_salt+code_measurement reproduces output_digest) as an alternate correctness path; settlement remains fail-closed on any mismatch.

Attestation. The EE MUST verify a fresh remote attestation prior to provisioning secrets and record boundary_measurement in the receipt. Attestation MUST chain to vendor endorsements or certificate roots, with revocation status checked during the revocation window (see §§ [0053]-[0055]).

Mechanisms (illustrative). Illustrative mechanisms include Intel SGX/TDX DCAP/PCS endorsement chains, AMD SEV-SNP VCEK/platform certificate chains, ARM CCA(RME) attestation tokens, and AWS Nitro Enclave attestation documents. Verifiers treat these as examples and MUST accept functionally equivalent evidence that chains to a vendor root and passes revocation and TCB-level checks as specified herein.

Revocation re-checks. During the revocation window, validators MUST re-check attestation status (OCSP/CRL/vendor endorsements/TCB levels) and treat revocation or ban lists as clawback triggers.

D. Federation & Corpus Construction

Receipt corpus. The ORE MUST index receipts by at least {context features, policy_digest, outcome label, actor/service IDs, anchor.log_id} and retain the anchor.commitment and inclusion_proof for independent verification.

Privacy-preserving federation. For cross-organization matching and analytics, implementations MAY use privacy-preserving protocols comprising at least one of: (i) OPRF/DH PSI for private set intersection over feature keys; and/or (ii) homomorphic encryption (e.g., Paillier/CKKS) for aggregate statistics. Federation MUST retain attestation provenance (vendor/hardware, key continuity, signature entropy) to support provenance scoring and Sybil resistance.

Threat model. The default federation threat model is honest-but-curious participants with attested endpoints. For stronger adversaries(malicious or colluding) the corpus SHOULD incorporate outlier detection and cross-anchor verification.

E. Timers, Revocation Windows, and Anchoring Cadence

Secure time. EE MUST use a monotonic trusted time source for t_start, t_end, and monotonic_counter. Receipts MUST include at least one such counter.

Tri-Source Trusted Time (optional). In high-assurance profiles, EE SHOULD compute a TimeConfidenceScore $\in$ [0,1] from three concordant sources: (i) an attested monotonic counter/clock within the trusted boundary; (ii) an external signed time oracle (e.g., Roughtime/NTP with signed responses) bound into the receipt as a short transcript digest; and (iii) the anchor context (receipt_id committed under an STH/SSH whose timestamp is fresh within MMD). Mint-After-Verify (MAV) gating MAY require TimeConfidenceScore$\geq\tau$_t (deployment-defined). Timestamps MUST be strictly monotonic across receipts for the same boundary; RFC 3339 applies only to transcript/non-Core representations, while the Core uses t_end (numeric time64) per § [0042A].

Revocation window. A revocation window MUST be specified (by AIC or log policy). Recommended ranges: 30 seconds to 30 days, with domain-specific defaults. Within the window, the settlement controller MUST: re-verify attestation revocation status; accept policy-contradiction signals (e.g., safety incident); and process quorum-signed dispute outcomes.

Dynamic-Consent Profile (optional). An AIC MAY expose a consent endpoint allowing a principal to withdraw or refine participation within the revocation window. On withdrawal, the settlement controller SHALL (i) anchor a revocation entry referencing receipt_id; (ii) deny or claw back settlement consistent with § [0054]; and (iii) reflect revocation status in signed verification/settlement transcripts. Redacted audit views SHOULD include selective-disclosure proofs (see § [0062]). The Dynamic-Consent profile is illustrative and non-limiting; it does not modify ReceiptCore or claim scope and is intended to aid conformity assessments (see Appendix H-bis). In regulator-mode deployments, controllers SHOULD emit a ConsentReceipt at grant and a RevocationTranscript at withdrawal/incident, each optionally anchored and referenced in verification/settlement transcripts.

Anchor cadence & grace. Anchoring SHOULD occur synchronously with execution completion or within a grace period (e.g., five minutes or less) defined by policy. Late anchors MAY be discounted by ORE freshness decay. In limited offline profiles, a provisional "Short-Receipt" MAY permit restricted presentation under advisory labeling; Share/Upload/Record MUST remain blocked and the Short-Receipt MUST expire unless a fresh inclusion proof is obtained within the applicable MMD. (Illustrative.)

Verification SHOULD include a continuity record linking successive STHs via validated consistency proofs; in profile REG-01 it MUST be emitted as a signed ContinuityTranscript (CTx) (Appendix A [A074]). Continuity records MAY also be included in Evidence Bundles (§ [H010]) to document freshness adherence for auditors.

Conformance tests. Named tests exercising inclusion, consistency, MMD freshness, replay counters, dual-anchor non-collusion, and recompute checks are listed in Appendix F (see [F010]-[F025], [F026]-[F032]) for interoperability; examples are illustrative and do not limit the claims.

CT-style profile (illustrative). Implementations MAY use transparency logs that publish Signed Tree Heads (STHs), inclusion proofs, and consistency proofs; validators SHOULD treat the log's Maximum-Merge Delay (MMD) as the freshness bound and reject inclusion proofs referencing an STH older than MMD. Continuity records (see § [0055A]) document append-only observance over time. Functionally equivalent structures are acceptable; references to STH/inclusion/consistency include their SSH/SCP equivalents (see § [0100H]).

F. Cryptography & Dual-Signature Migration

Algorithms. All signature/digest algorithms MUST be versioned and algorithm-agile. Default signatures SHOULD be Ed25519 or ECDSA P-256; digest SHOULD be SHA-256.

Algorithm identifiers SHALL be drawn from a deployment registry with versioning and deprecation rules; systems MUST reject deprecated algorithms after the configured policy date. (See Appendix A § [A037].)

Long-horizon retention (optional). Receipts intended to be relied upon beyond 10 years SHALL carry dual signatures with at least one post-quantum suite and MUST include an algorithm-agility manifest identifying acceptable successor suites. (Illustrative; claims control.)

Post-quantum cutover. Receipts MAY carry dual signatures (classical+PQ). A policy date (Cutover T) MAY require PQ signatures (e.g., CRYSTALS-Dilithium 2/3). Verifiers MUST accept dual signatures prior to Cutover T and MUST enforce PQ presence thereafter, per policy.

G. OS/Browser Agent & Sidecar Integration

OS/Browser agent (IW). An Intent Wallet agent MAY run as an OS/browser component that: presents a consent UI; binds actor keys to platform secure elements (e.g., Secure Enclave, TPM/Keystore) and passkeys/biometrics; intercepts outbound API calls and injects capability tokens only upon verified consent; records the wallet's platform attestation as part of provenance.

Trusted prompts. The wallet SHALL bind user confirmations to platform passkeys (WebAuthn-class) in a secure element and record a prompt-attestation bit in the receipt provenance. Verifiers MAY reject receipts lacking such attestation for high-assurance modes.

High-assurance call-out. Platform-authenticator assertions (passkeys/WebAuthn-class) SHOULD bind both (i) the capability-token scope and (ii) a digest of the Minimal ReceiptCore; the prompt-attestation bit and, optionally, a PromptDigest are recorded in provenance (see § [0101]).

Biometric privacy (optional). Where local biometrics are used for UX, implementations SHOULD avoid persistent biometric templates and MAY use template-free derivations so only ephemeral challenges and derived cryptographic material are retained in provenance.

Template-free biometrics (optional). Where local biometrics unlock capability mints or continuations, implementations SHOULD avoid persistent biometric templates and MAY use neural-fuzzy-extractor-style constructions so only helper data is retained; PoPC receipts store no raw biometrics.

Guardian/Minor Consent Handshake (optional; non-limiting). In CSP-01, capability-token minting MAY require a co-sign flow in which a platform-authenticator assertion from a guardian credential is verified inside the TEE/HSM and cryptographically bound to (i) a digest of the Minimal ReceiptCore and (ii) the capability-token scope. A prompt-attestation bit and optional PromptDigest for the guardian co-sign MAY be recorded in provenance; absence of the co-sign SHALL deny in CSP-01.

Platform-authenticator assertion. A "platform-authenticator assertion" includes a passkey/WebAuthn-class assertion (or equivalent) produced by a platform-resident authenticator and verified within the TEE/HSM, wherein the client-data binding (or equivalent) incorporates (i) a digest of the Minimal ReceiptCore and (ii) the capability-token scope, and verification includes signature validation under the credential public key.

Edge Small Language Models (SLMs). In some embodiments, the intent wallet or local agent stack employs specialized SLMs for narrow, repetitive tasks (e.g., tool-call formatting, extraction) with PoPC receipts minted locally and anchored per §§ [0044]-[0044A]; MAV gating remains mandatory for any follow-on capability. (Illustrative; non-limiting.)

Transparent sidecar. For legacy services, a transparent sidecar proxy MAY terminate mTLS, validate AIC/policy scope, and enforce a capability gate. Sidecar enforcement MUST block egress unless {boundary_measurement, policy_digest, resource scope} match fields of the AIC.

H. Capability Tokens (Least-Privilege Continuations)

Derivation. Upon receipt validation, the wallet MAY derive a capability token (CPT) bound to: (i) time-to-live (TTL), (ii) a scope digest over permitted parameters/resources, and (iii) a reference to the receipt anchor.

Enforcement. Connectors MUST reject tokens (a) presented outside TTL, (b) whose scope digest mismatches, or (c) whose referenced receipt fails re-verification.

Relying-party binding. Capability tokens MAY encode a relying-party identifier for the destination service and SHALL be bound to a digest of the Minimal ReceiptCore and the token scope; the verifier attests the relying-party identifier for the requested operation.

The verifier MUST bind the relying-party identifier confirmation into the signed verification transcript.

Follow-on privilege gate.

Connectors, OS/Browser agents, and device latches SHALL subject any Follow-On Privilege (FOP) to Mint-After-Verify (MAV), MMD freshness, and—where enabled—dual-anchor and recompute guard; absence of validated anchors SHALL deny (MAV; see Appendix A [A107]). For avoidance of doubt, "subsequent operation" encompasses any Follow-On Privilege (FOP) action (including tokenized calls, session resumption, resource entitlements, or device actuation) gated by MAV per Appendix A [A096].

MAV invariants (fail-closed).

No Follow-On Privilege (FOP) is issued or activated unless receipt_id==anchor.commitment, the STH is fresh (≤MMD), and consistency is validated on advance; otherwise the path FAILS CLOSED.

Recursive-agent safeguard (high-assurance).

In recursive-agent scenarios, a receiving agent SHALL verify the receipt-anchor binding and validate the corresponding signed verification transcript before using any capability token or activating a downstream operation; autonomous or delegated FOP issuance without transcript verification SHALL be denied in high-assurance profiles.

Verifiable caveats (optional). A capability token MAY carry verifiable caveats—e.g., audience, time-window, data-minimization, geofence, device-class—encoded as predicate commitments bound to the token's scope and the Minimal ReceiptCore digest. Connectors MUST evaluate caveats at presentation and FAIL-CLOSED on unsatisfied predicates; third-party caveats MAY be attached and validated by the verifier. In CSP-01, verifiable caveats MAY include age-class, guardian-present, child-safe content class, geofence, and time-window; connectors MUST evaluate such caveats at presentation and FAIL-CLOSED on violations.

I. Compliance Views & Selective-Disclosure Proofs

Redaction with verifiability. The CI MAY emit a redacted audit view accompanied by a selective-disclosure proof (e.g., Merkle inclusion or ZK membership) that the view derives from committed receipt fields (policy_digest, boundary_measurement, timelines, signatures). Regulators can verify compliance without access to raw inputs.

Regulator-mode mappings (illustrative). Appendix H-bis sketches example mappings between PoPC artifacts(ReceiptCore, anchors, signed transcripts, dispute/revocation records) and regulator expectations (e.g., EU AI Act logging/post-market monitoring) or HL7 FHIR AuditEvent/Provenance fields. Mappings are illustrative; claims control.

See Appendix M for optional security profiles (crypto-agility, dual-anchor defaults, continuity records, biometric guardrails); these are illustrative and do not alter claim scope.

Regulator Mode—Child Safety (illustrative; non-limiting). A regulator-verifiable audit view MAY include selective-disclosure proofs that (i) age-gate predicates evaluated TRUE, (ii) any guardian co-sign was verified (passkey-class), and (iii) capability-token caveats (e.g., time-window, scope, audience) matched at presentation-without revealing raw inputs or identity data.

J. OutcomeRank Computation (Provenance & Explainability)

Context encoding. The ORE MUST compute a context feature vector (task, policy facets, domain/safety class, cost envelope). The context feature vector MAY encode child-safety class and down-rank candidates lacking attested child-safety predicates or presenting elevated dispute/incident rates for minor-tagged contexts.

Score function. OutcomeRank MUST combine: (i) receipt-proven success frequencies in similar contexts, (ii) cost/constraint satisfaction, (iii) freshness decay, and (iv) a provenance score derived from attestation vendor/hardware diversity, key continuity, and cross-party signature entropy. Receipts below a provenance threshold SHOULD be down-weighted or excluded; duplicates MUST be deduplicated by canonical digests.

Independence & diversity constraints (illustrative). OutcomeRank SHOULD (i) apply an independence threshold $\tau_e$ over cross-party signature entropy, (ii) enforce counterparty/vendor diversity floors(m, h), (iii) penalize reciprocal-pair density, and (iv) require k_min and d_min per context window. High-assurance profiles SHALL enforce these constraints; parameters are deployment-policy selectable.

Explainable outputs. The ORE MUST, upon request, generate a proof of contribution identifying a weighted subset of anchored receipts whose aggregate weight exceeds a configured fraction of the score, including receipt anchors for independent verification. The ranking transcript SHALL be digitally signed and commit to the receipt set and STH/SSH identifiers used for validation, and SHALL include an explainability payload identifying the most-influential receipts and features.

When present, training-lifecycle certificates (e.g., BIC/IFC) MAY contribute to provenance features and freshness signals; pending unlearning (e.g., codes including E026/E027/E028) MAY down-weight or hold scores until a valid certificate is verified. (Illustrative; claims control.)

Diversity floors (reference). A signed ranking transcript MAY include independence/diversity metrics ($\tau_e$, m, h, d_min, k_min) and oracle-attestation counts; high-assurance profiles SHALL include them (see Appendix A [A097]-[A103]).

Display scaling (UI-only; evidentiary). Implementations MAY log-scale displayed scores for UI stability; the signed value recorded in any RankingTranscript SHALL remain the linear score. (This presentation choice does not affect ReceiptCore validity or verifier behavior.)

K. Technical Effects

Technical effects. Embodiments improve computer security and distributed systems by:

- converting opaque actions into verifiable transactions via a receipt whose Minimal ReceiptCore comprises {policy_digest, boundary_measurement, input_digest, output_digest, monotonic_counter, trusted_timestamp (t_end)}, signed by a sealed key from within a trusted boundary; Receipt Extensions (e.g., code_measurement, determinism_salt, io_canon, t_start) are recorded outside the Core;
- anchoring a commitment of the canonical Minimal ReceiptCore to a publicly verifiable append-only log (transparency-style) and validating inclusion/consistency proofs under a freshness threshold (e.g., MMD), with optional dual-anchor non-collusion;
- enforcing fail-closed control(mint-after-verify) so capability tokens only issue after proof validation and are cryptographically bound to the verified receipt; and
- producing verifier-signed transcripts (and, where applicable, settlement transcripts) that create an independently checkable trail for audit, dispute, and compliance.

BRIEF DESCRIPTION OF THE DRAWINGS

Like numerals refer to like elements across the drawings.

Drawing conventions. Solid rectangles denote required modules; dotted rectangles denote optional/conditional modules; a dashed ellipse denotes a token/data artifact; solid arrows denote the primary required flow; dotted arrows denote conditional flows (e.g., clawback); text labels on arrows indicate the operation. Drawings are schematic and not necessarily to scale; relative dimensions and positions may be adjusted for clarity.

Figure 1:
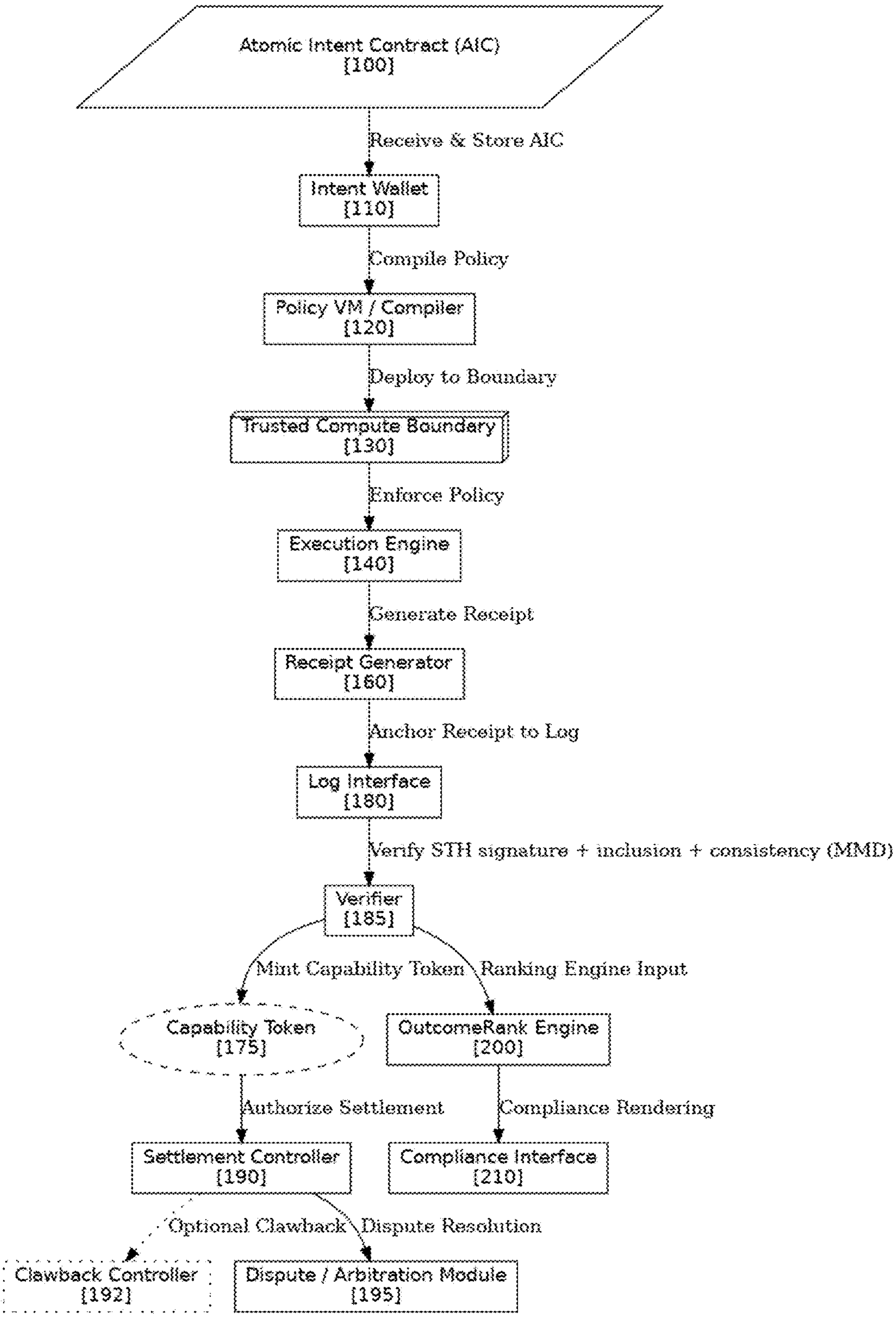
FIGS. 1-18 illustrate example embodiments and are non-limiting.

FIG. 1 is a block diagram of a policy-compliant execution rail (PoPC system) including an intent wallet, a trusted compute boundary (e.g., TEE/HSM or deterministic sandbox), an execution engine, a receipt generator, a log interface, a verifier, a settlement controller, a dispute/arbitration module, an OutcomeRank engine, and a compliance interface.

Figure 2:
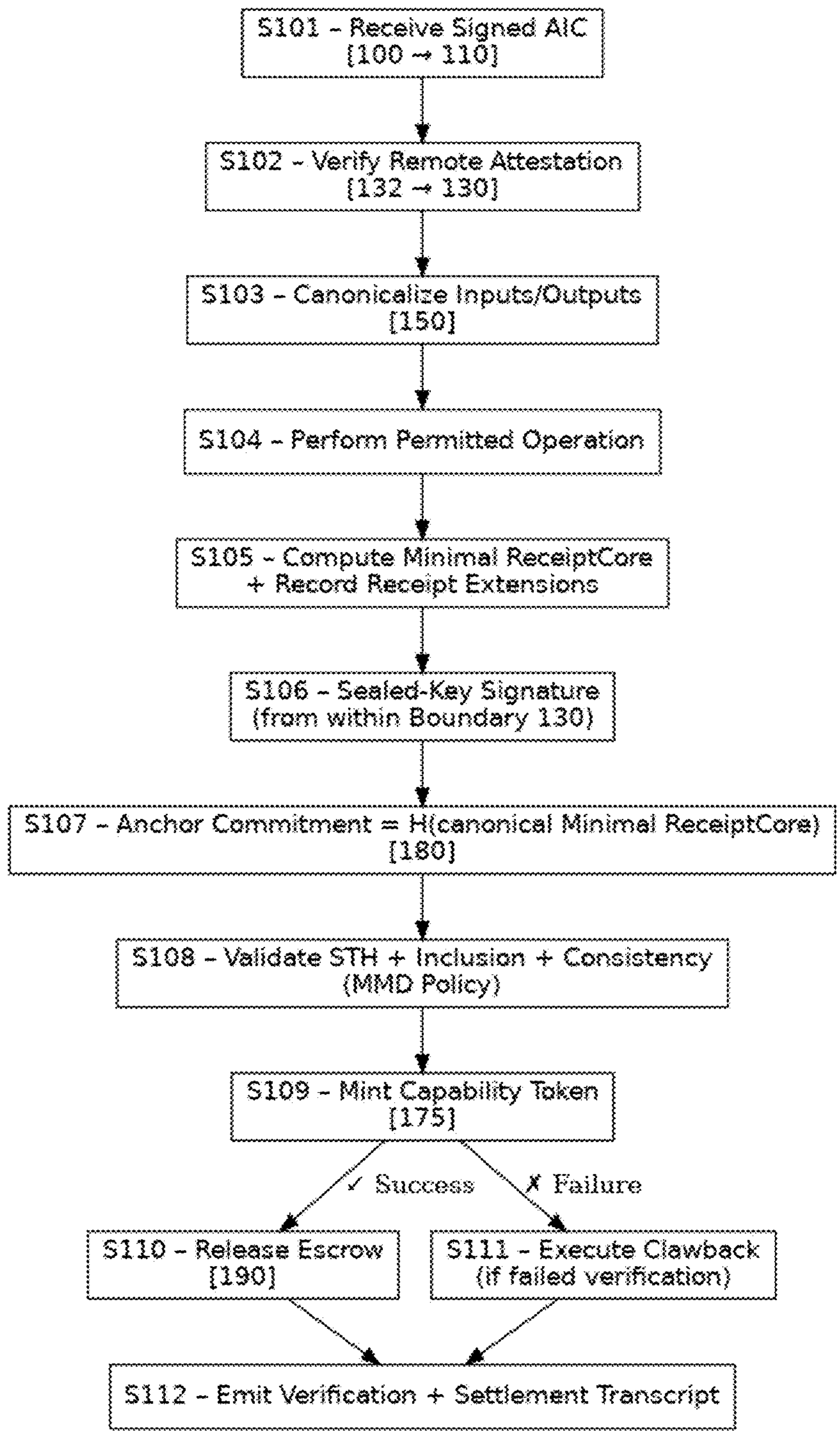

FIG. 2 is a flow diagram of an intent→attested execution→receipt generation→anchoring→verification→token mint→settlement/clawback method.

Figure 3:
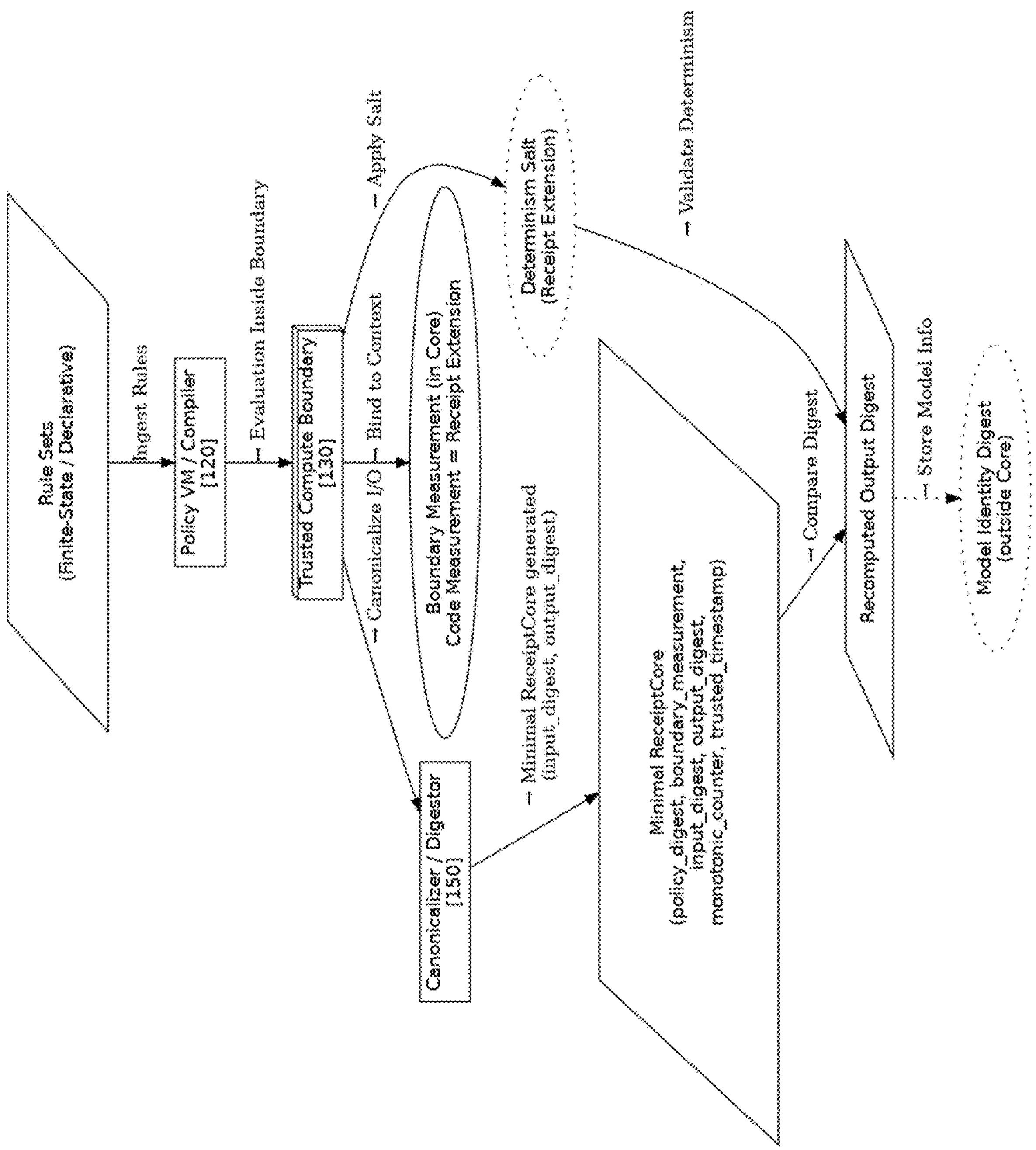

FIG. 3 is a block diagram of a policy VM inside the trusted compute boundary, showing rule ingestion (finite-state/declarative forms), runtime enforcement, deterministic canonicalization of inputs/outputs and digests, boundary measurement, and policy-digest computation.

Figure 4:
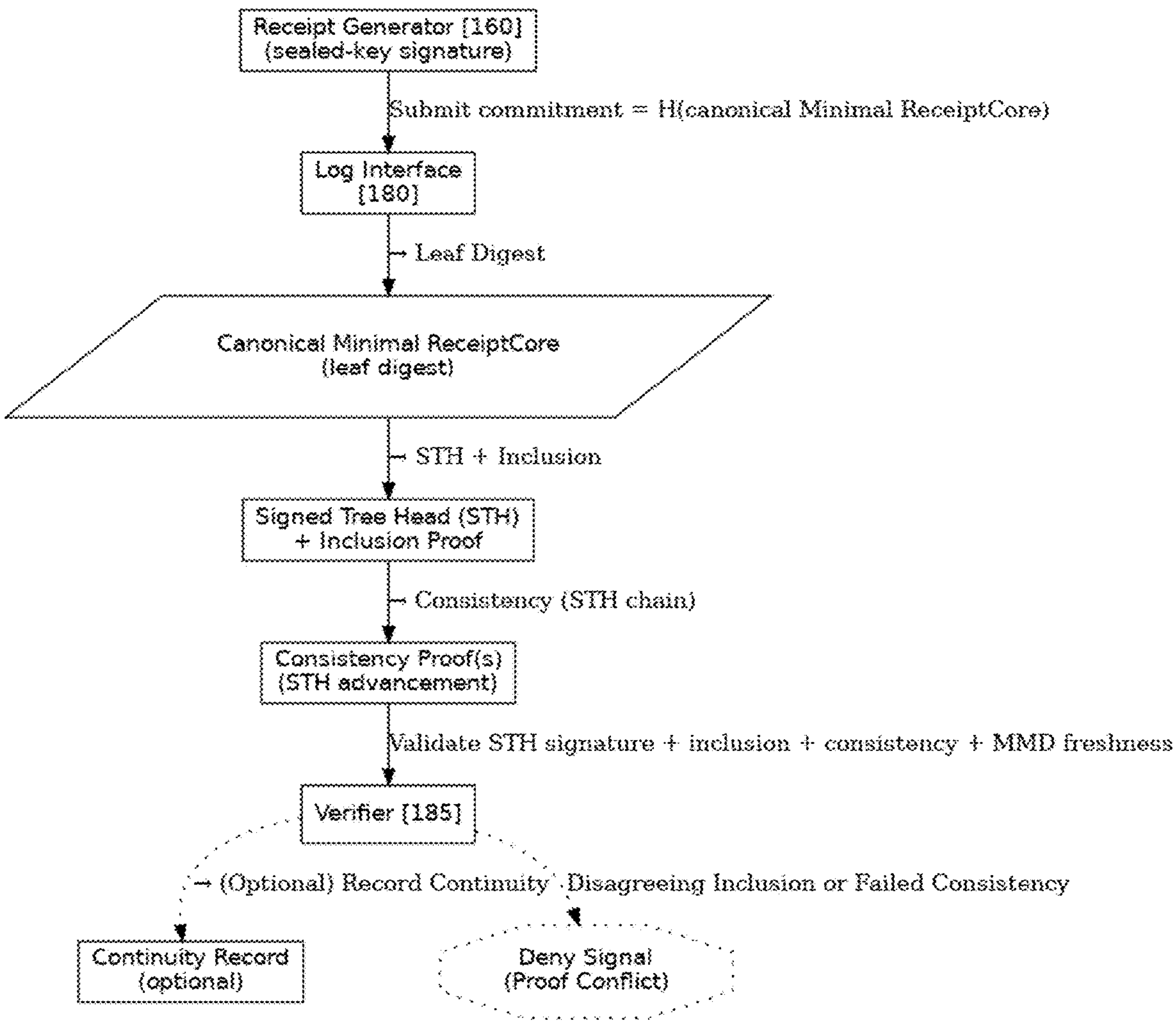

FIG. 4 is a block/sequence view of anchoring and proofs: a cryptographic commitment (leaf digest of the canonical Minimal ReceiptCore) is submitted to a transparency log; the log returns a signed tree head (STH) and inclusion proof; upon STH advancement, a consistency proof is validated under an MMD freshness policy.

Figure 5:
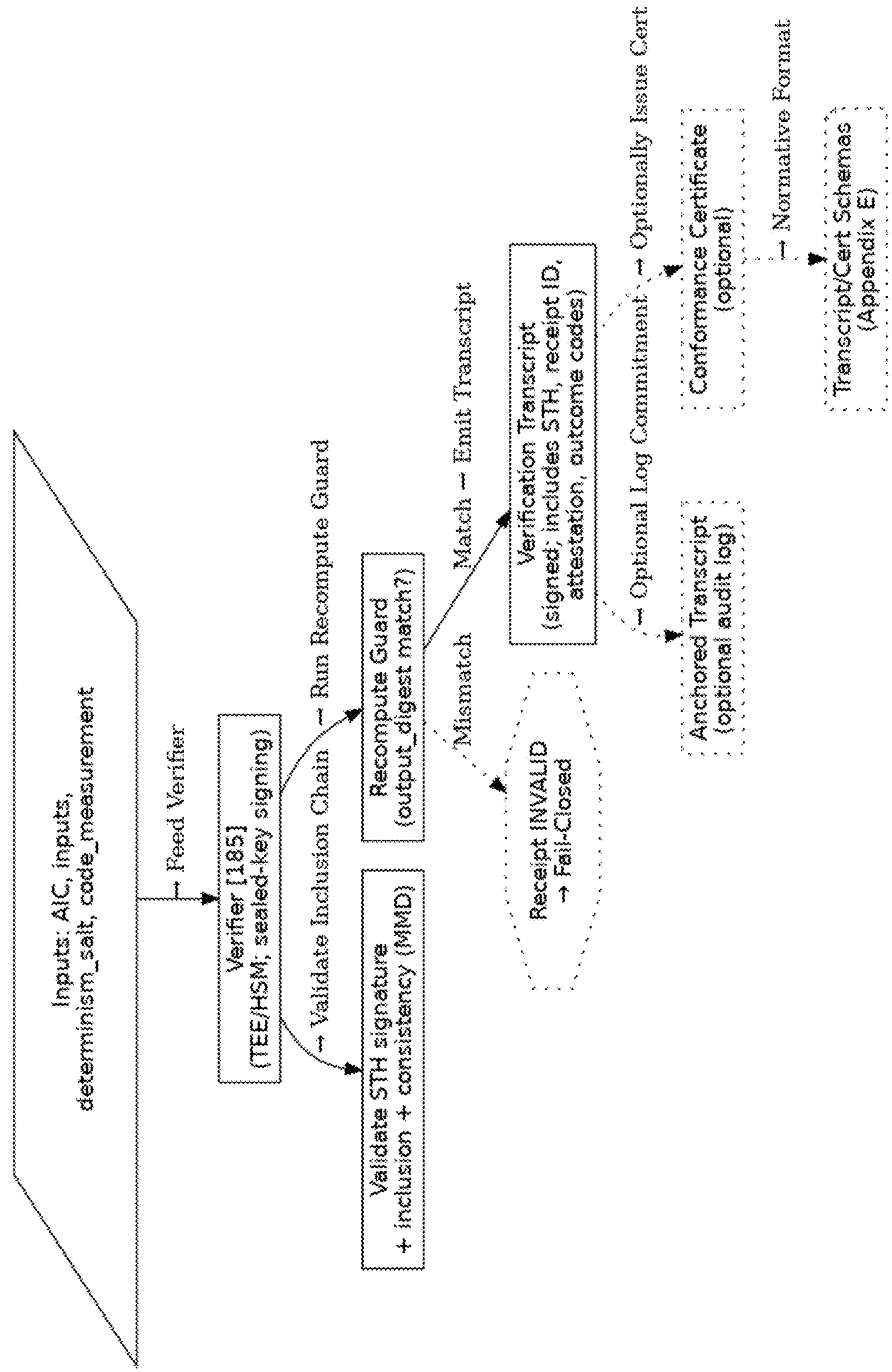

FIG. 5 is a block/sequence diagram of a verifier/server that verifies an STH signature, validates inclusion and consistency proofs under a freshness threshold (e.g., MMD), and emits a digitally signed verification transcript (optionally executing inside a TEE/HSM with a sealed-key signature and measurement in the response).

Figure 6:
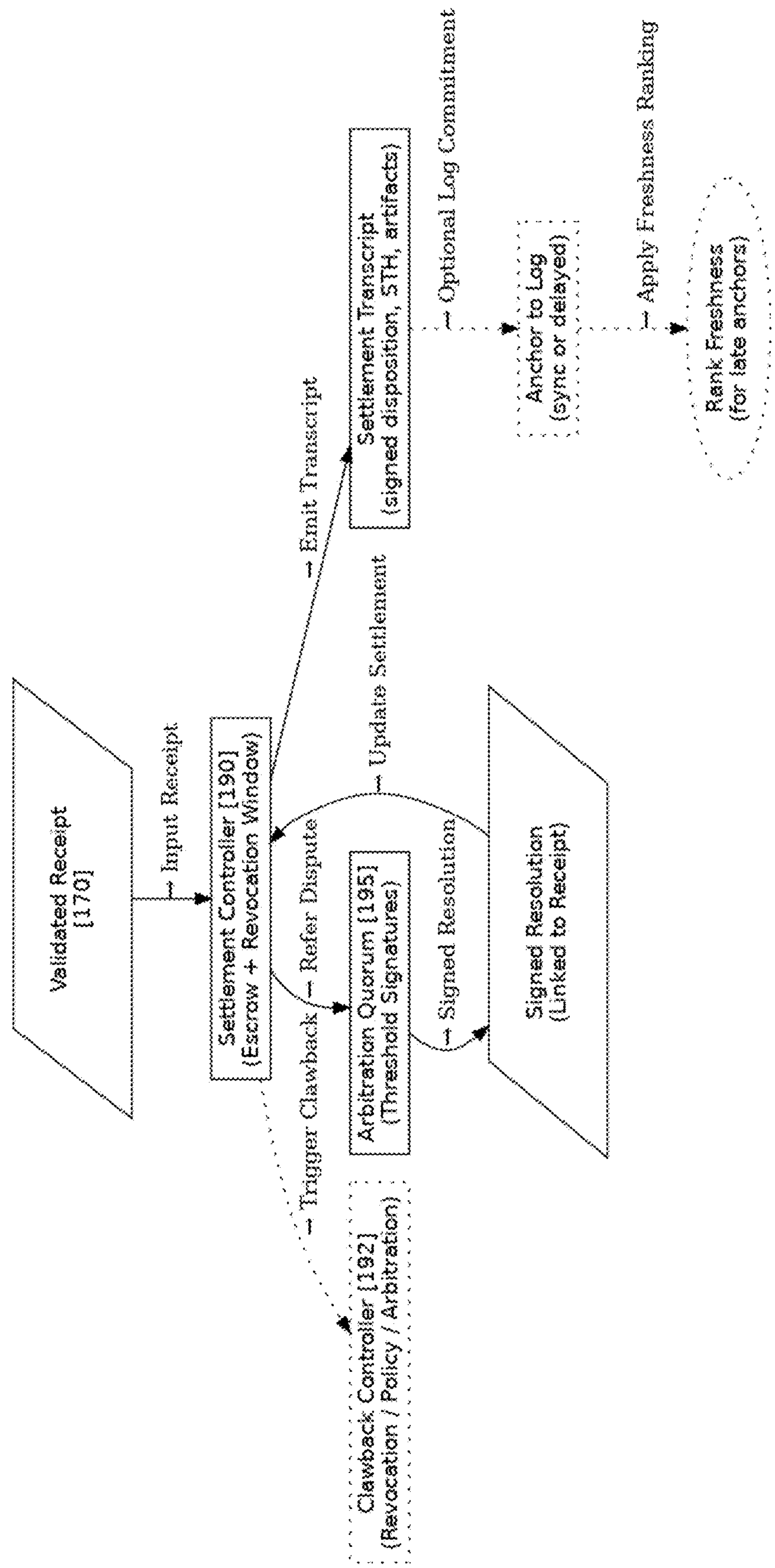

FIG. 6 is a block/sequence diagram of escrow settlement and programmable clawback, including validation against the anchored receipt, revocation-window logic, and m-of-n arbitration updating settlement state.

Figure 7:
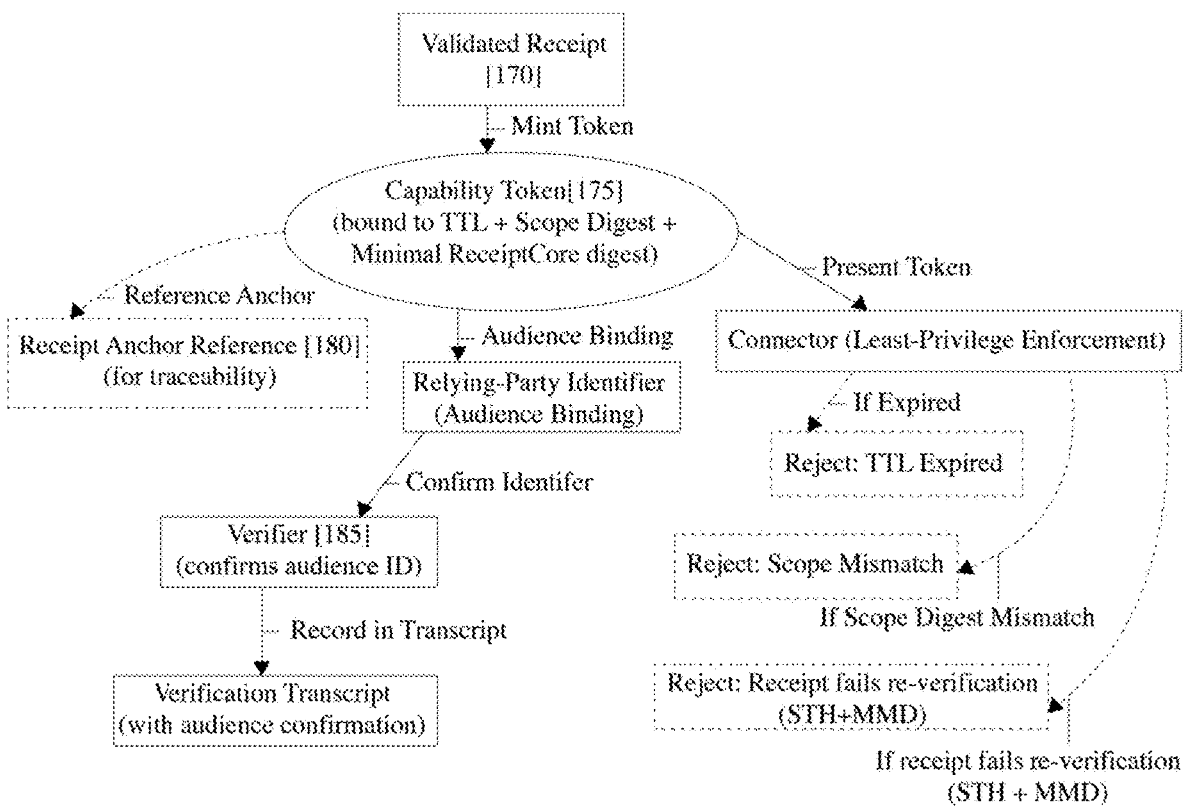

FIG. 7 illustrates capability-token derivation and enforcement from a validated receipt, including time-to-live (TTL), scope digest, and Minimal ReceiptCore digest bindings, audience-binding confirmation, and presentation to a follow-on service under least-privilege enforcement.

Figure 8:
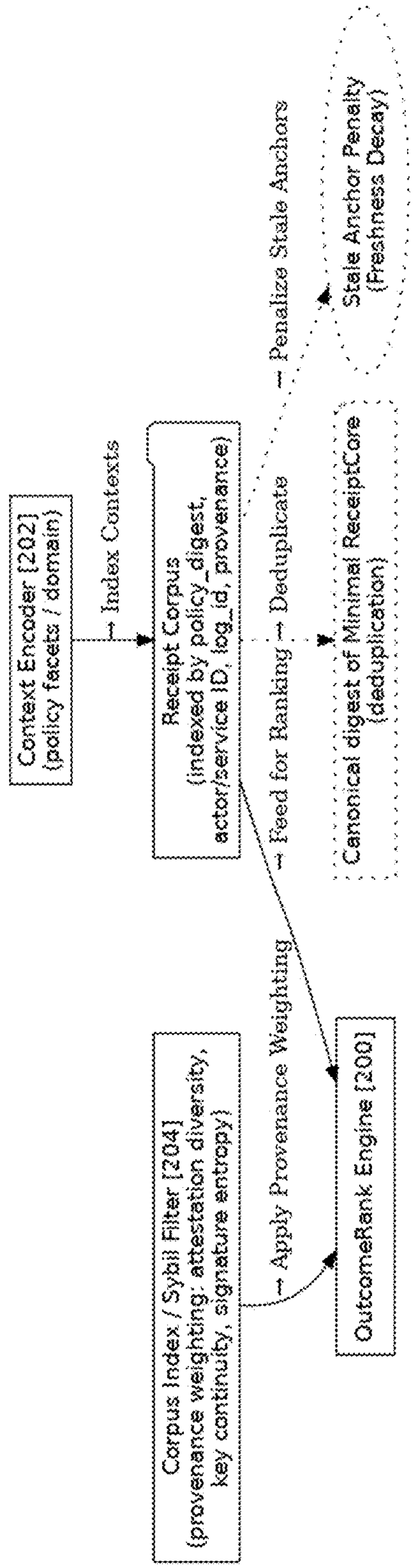

FIG. 8 is a system diagram of a receipt corpus and an OutcomeRank engine that encodes task/policy context and computes receipt-proven success scores for candidate tools or services.

Figure 9:
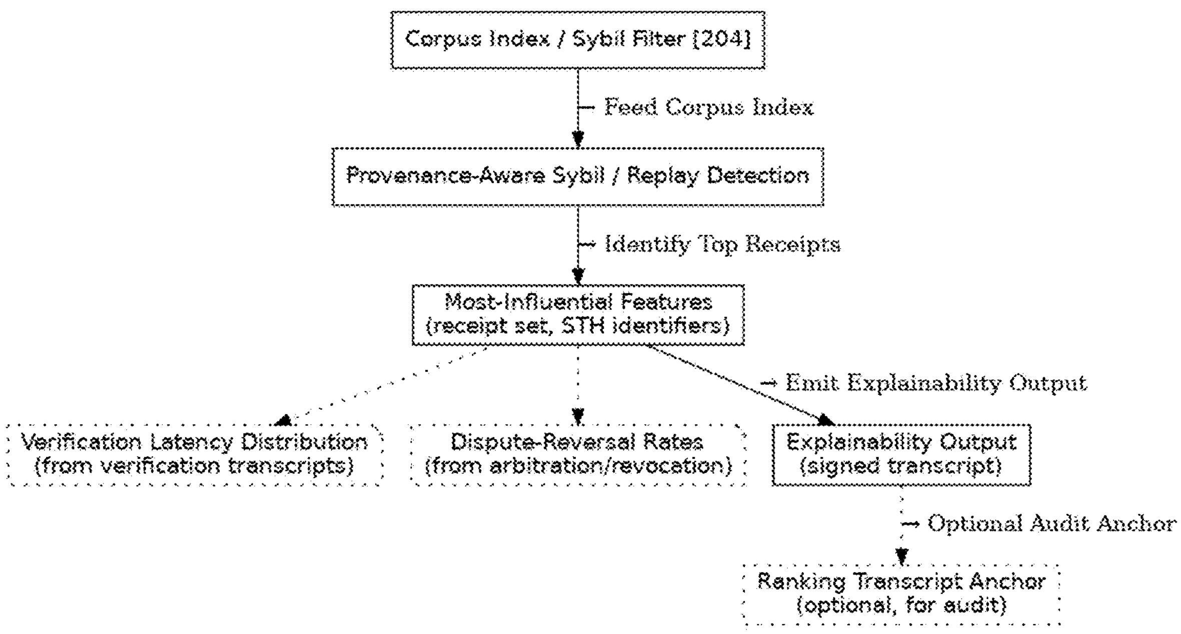

FIG. 9 is a flow for provenance-aware Sybil/replay detection and deduplication in ranking, with freshness decay, a signed explainability output, and a ranking transcript that may be anchored for audit.

Figure 10:
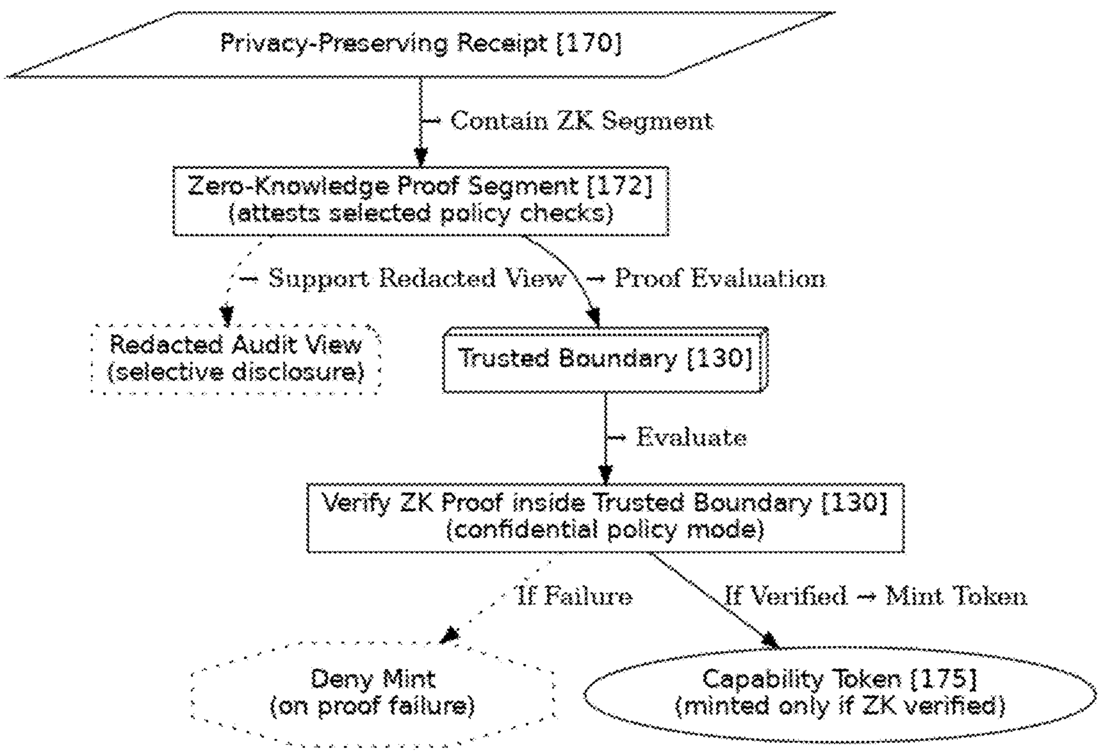

FIG. 10 shows privacy-preserving receipt variants in which selected policy checks are attested via zero-knowledge proofs without revealing underlying data, together with a verifier flow.

Figure 11:
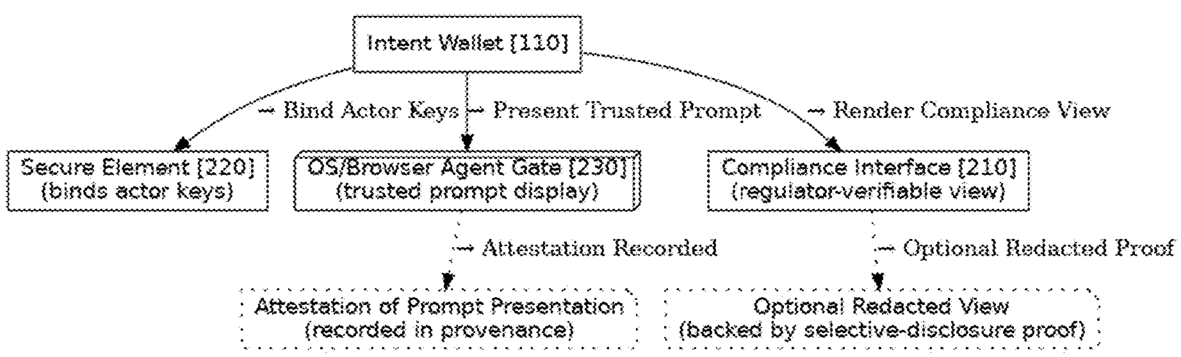

FIG. 11 depicts OS/browser integration of an intent wallet, including secure-element key custody, passkey/platform-authenticator prompts, and an agent-framework capability gate.

Figure 12:
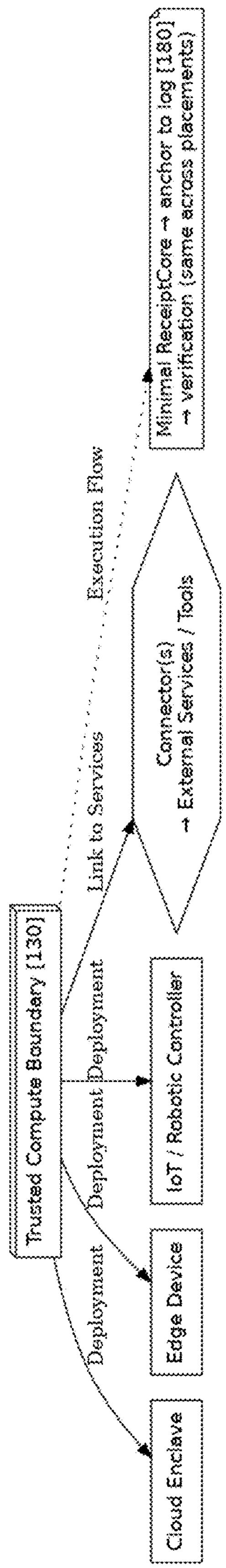

FIG. 12 is a deployment diagram of cloud/edge/IoT/robotic placements of the trusted compute boundary and connectors to external services/tools.

Figure 13:
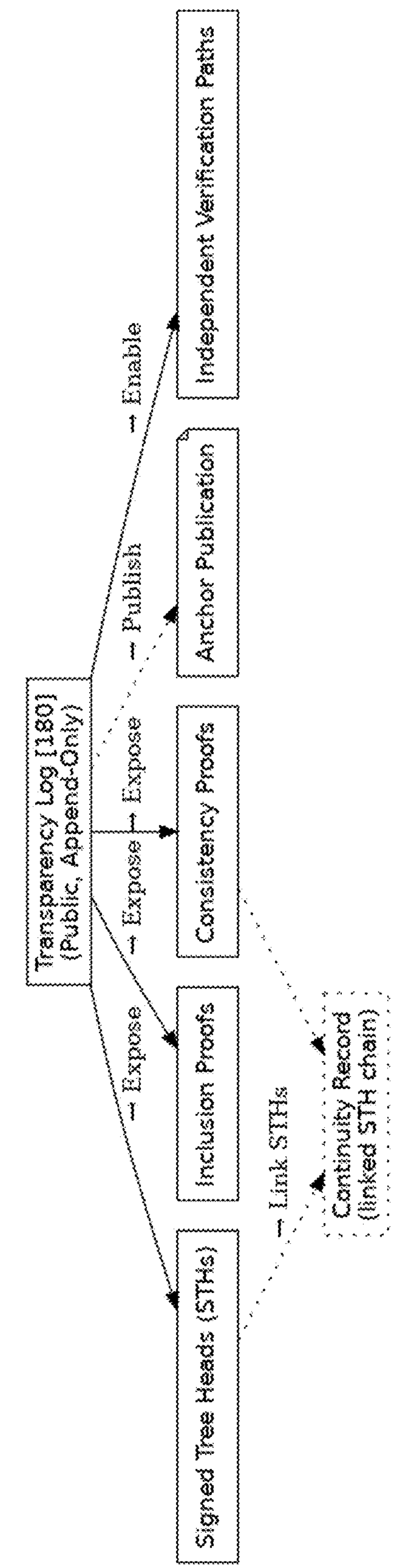

FIG. 13 shows a transparency-style, publicly verifiable append-only log (Merkle tree) with signed tree heads (STHs), inclusion/consistency proofs, anchor publication, and independent verification paths.

Figure 14:
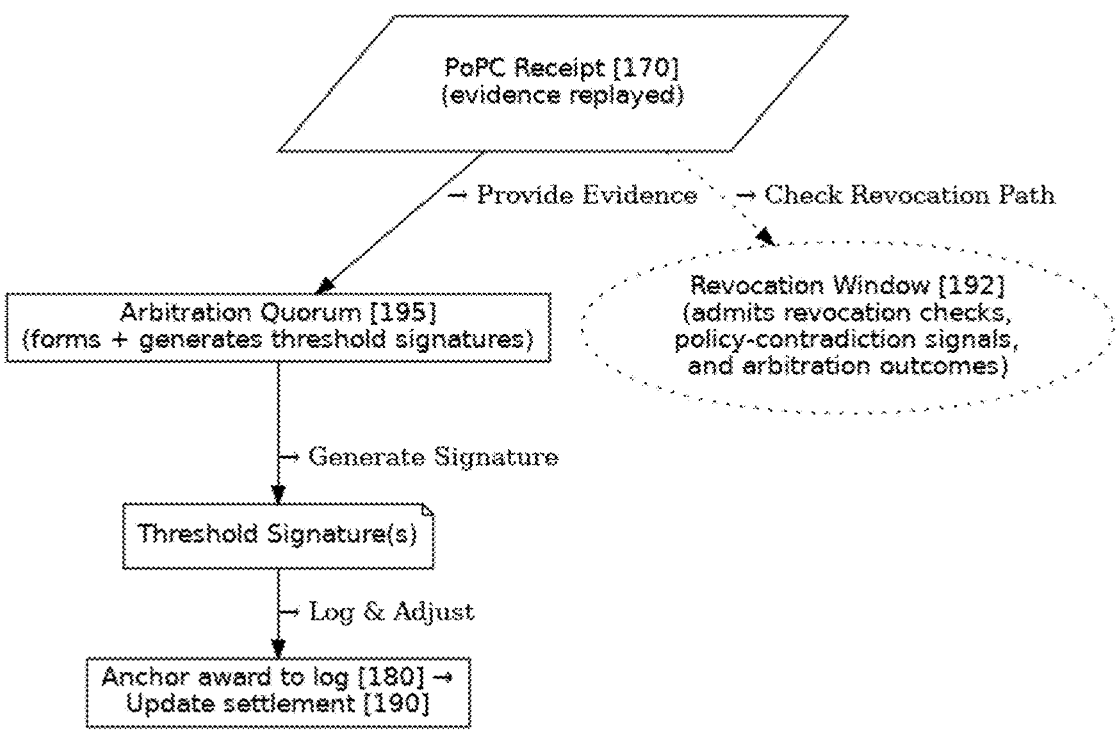

FIG. 14 is a sequence diagram of dispute and arbitration, including evidence replay from the receipt, threshold signatures by the quorum, and log-anchored updates affecting settlement state.

Figure 15:
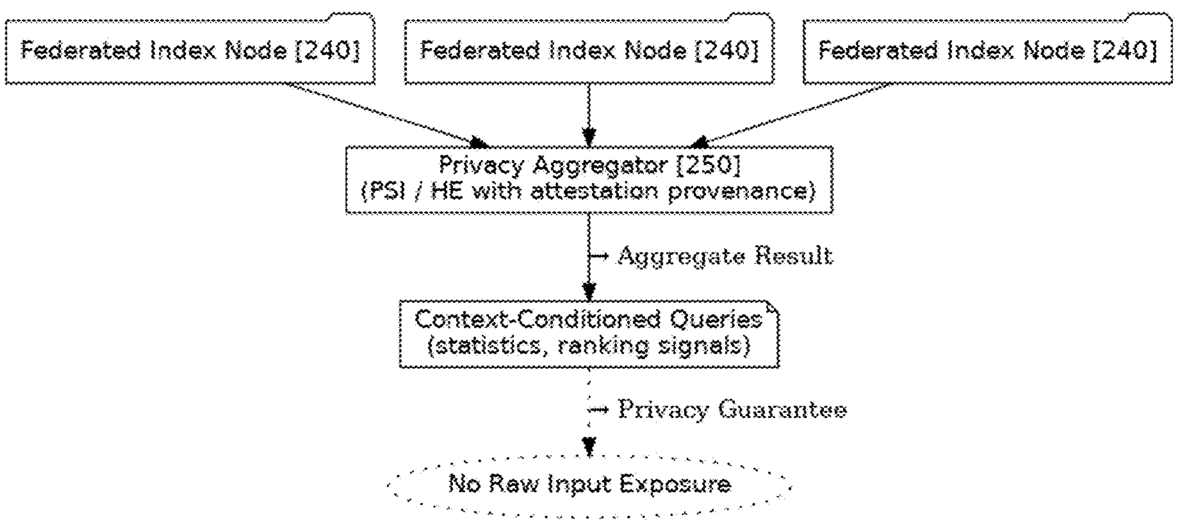

FIG. 15 illustrates federated indexing of receipts across organizations with privacy-preserving aggregation while retaining attestation provenance for ranking and audit.

Figure 16:
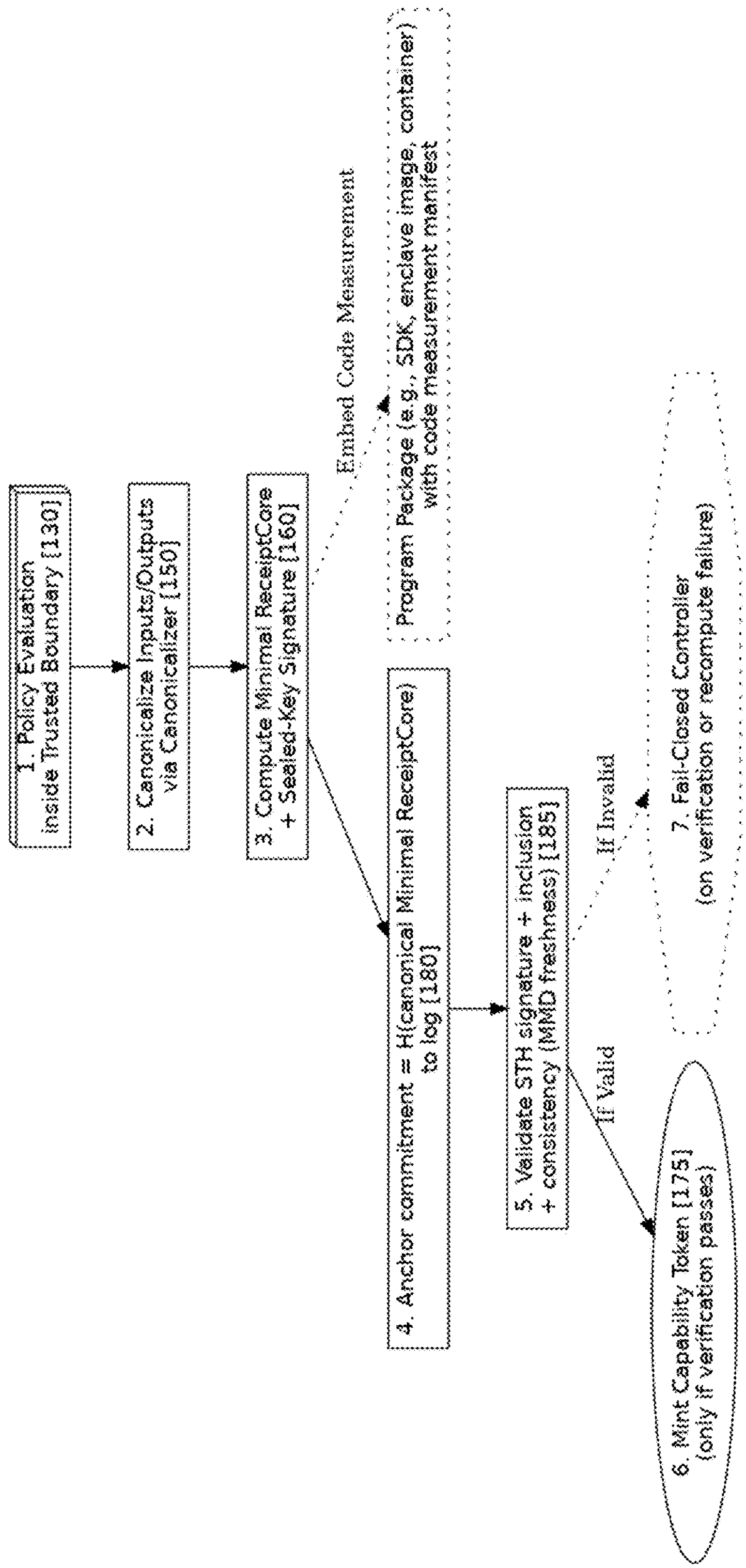

FIG. 16 is a flow diagram of a computer program product mapping computer-readable medium (CRM) instructions to policy evaluation, canonicalization, ReceiptCore/signature, anchoring, proof validation under freshness, token mint, and fail-closed control.

Figure 17:
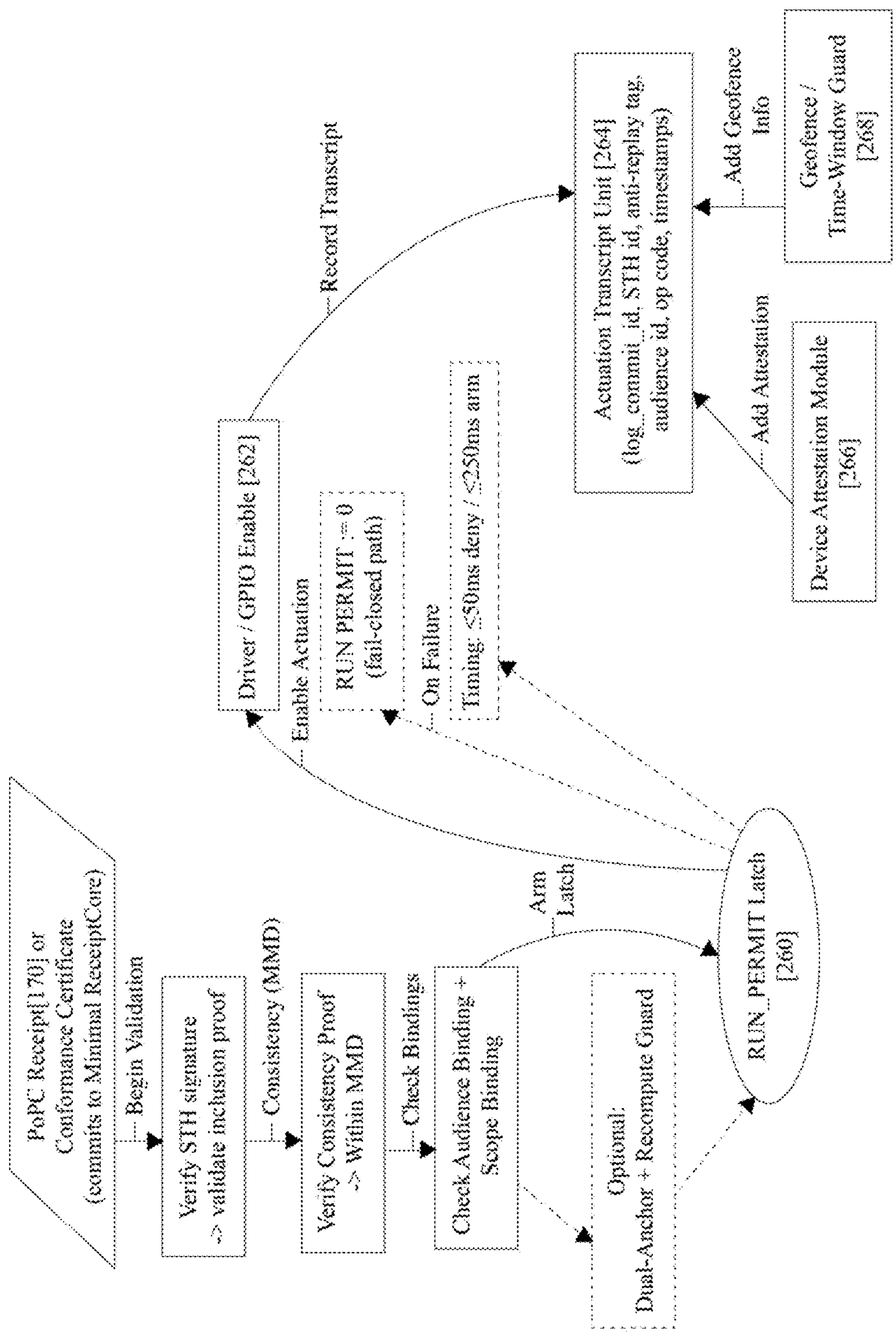

FIG. 17 is a block/wiring diagram of a device-side actuation latch showing receipt/certificate validation→RUN_PERMIT→driver/GPIO gating and deny/allow timing windows.

Figure 18:
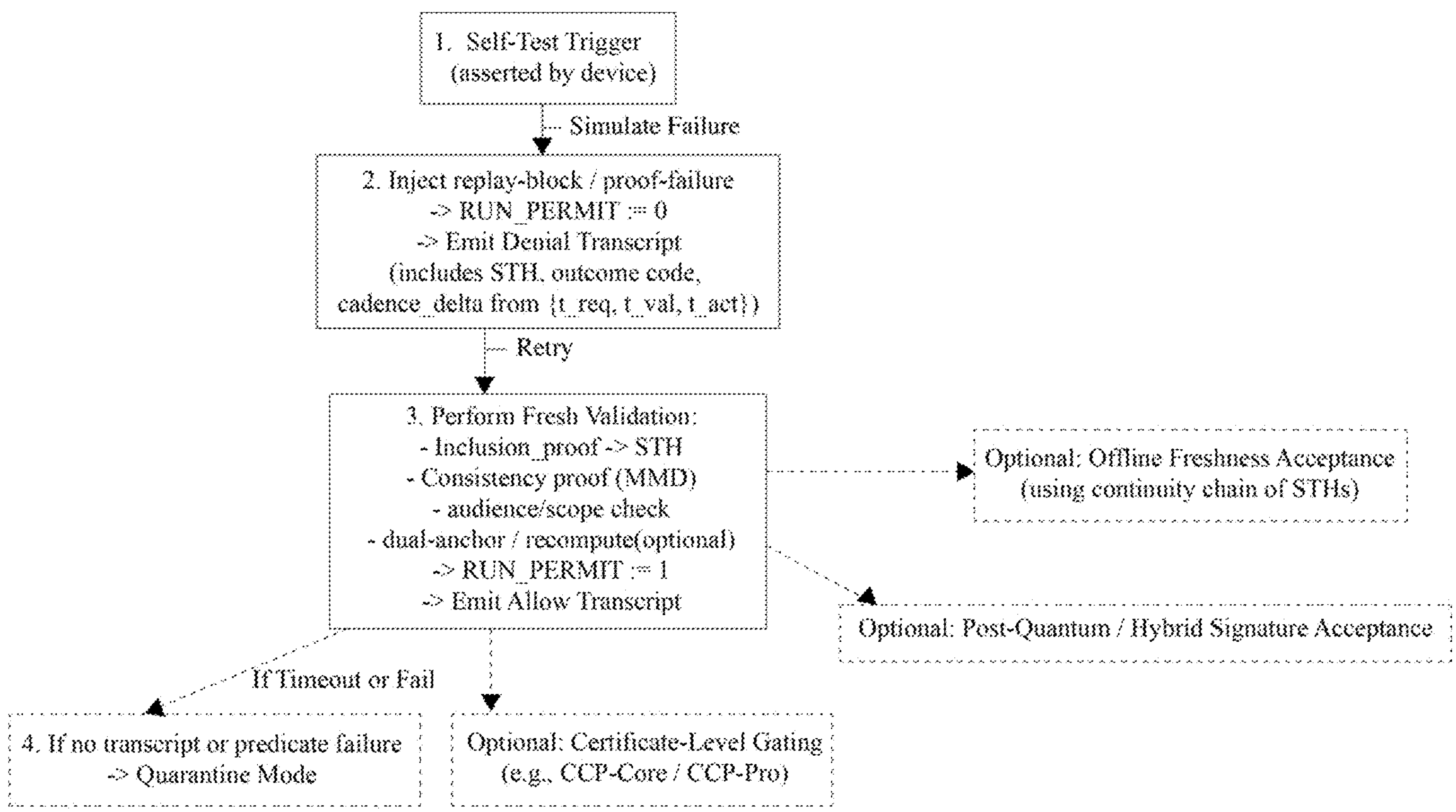

FIG. 18 is a sequence diagram of the self-test routine (synthetic allow→deny and deny→allow), evidence emission, and fail-closed behavior on timeout.

Reference Numerals (FIGS. 1-18)—100 Atomic Intent Contract (AIC); 110 Intent Wallet; 120 Policy VM/Policy Compiler; 130 Trusted Compute Boundary (TEE/HSM/Deterministic Sandbox); 132 Attestation Verifier; 140 Execution Engine (Service Connector); 150 Input/Output Canonicalizer/Digestor; 160 Receipt Generator; 170 PoPC Receipt; 172 Zero-Knowledge Proof Segment (optional); 175 Capability Token (least privilege); 180 Transparency-Log Subsystem (client log interface+publicly verifiable append-only log); 185 Verifier; 190 Settlement Controller; 192 Clawback Controller/Revocation Window; 195 Arbitration Quorum(m-of-n); 200 OutcomeRank Engine; 202 Context Encoder (task/policy vector); 204 Corpus Index/Sybil Filter; 210 Compliance Interface(Regulator View); 220 Secure Element/Passkey Module; 230 OS/Browser Agent Gate; 240 Federated Index Node; 250 Privacy Aggregator (privacy-preserving protocol); 260 RUN_PERMIT latch; 262 Driver/GPIO enable; 264 Actuation Transcript Unit; 266 Device Attestation Module; 268 Geofence/Time-Window Guard.

DETAILED DESCRIPTION OF THE INVENTION

Preamble and conventions. The following description illustrates example embodiments and is not intended to limit the scope of the claims. Like numerals refer to like elements across the drawings. Unless otherwise stated, terms have the meanings provided in the glossary and elsewhere in this specification. Protocol imperatives (e.g., MUST/SHOULD/MAY) denote conformance for implementations and do not limit claim scope; the claims control. Cross-references use paragraph numbers (e.g., see §§ [0044A]-[0044B], [0053]-[0055]).

Drawing convention. Reference 180 denotes the transparency-log subsystem. In some figures/text we say "log interface 180" (client adapter) and elsewhere "publicly verifiable log 180" (the log service); both are parts of the 180 subsystem unless a different numeral is expressly assigned.

Core constructs. A publicly verifiable append-only log (transparency-style) exposes signed tree heads (STHs) and provides inclusion and consistency proofs; freshness is enforced via a policy-configurable maximum-merge delay (MMD) (see §§ [0044], [0044A]). Unless expressly stated otherwise, "ReceiptCore" denotes the Minimal ReceiptCore (§ [0042A] and as cited in the claims): {policy_digest, boundary_measurement, input_digest, output_digest, monotonic_counter, trusted_timestamp}. The ReceiptCore used for the committed leaf excludes anchor, inclusion_proof, signatures (including post-quantum), zk_proofs, provenance, model_identity_digest, and extensions. Fields recorded outside the Core(Receipt Extensions) may include, for example, code_measurement, determinism_salt, io_canon, t_start, nonce, session_id, parent_receipt_id, and prompt_digest; such fields do not alter the canonical encoding used for the Minimal ReceiptCore commitment. For clarity, the trusted timestamp is t_end, and it resides inside the Minimal ReceiptCore (see § [0042A]).

Freshness threshold (MMD). Unless stated otherwise, references to a freshness threshold refer to a policy-configurable Maximum-Merge-Delay (MMD) for signed tree heads; verifiers enforce MMD when validating inclusion and, upon advancement, consistency.

A. System Overview (FIG. 1)

Referring to FIG. 1, the system includes an intent wallet 110, an execution engine 140 within a trusted compute boundary 130, a policy VM/compiler 120, a receipt generator 160, a transparency-log subsystem 180 (client log interface+public log), a verifier 185, a settlement controller 190 with clawback controller 192, a dispute/arbitration module 195, an OutcomeRank engine 200, and a compliance interface 210. The wallet 110 receives and stores an atomic intent contract (AIC) 100 that declares an actor, permitted operations, policy constraints, compensation, expiry, and dispute rules.

The policy VM 120 compiles the AIC policy into a machine-enforceable form (finite-state or declarative bytecode). The execution engine 140 enforces the compiled policy while performing permitted operations via connectors to external services/tools. The boundary 130 produces a boundary measurement and permits a sealed-key signature to be produced from within the boundary.

The receipt generator 160 computes a Minimal ReceiptCore {policy_digest, boundary_measurement, input_digest, output_digest, monotonic_counter, trusted_timestamp (t_end)} and records Receipt Extensions (e.g., code_measurement, determinism_salt, io_canon, t_start, nonce, session_id, parent_receipt_id) outside the Core; it then produces a sealed-key signature from within 130 and supplies the result via the log interface 180 for anchoring to a publicly verifiable append-only log (transparency-style) as a cryptographic commitment (leaf digest of the canonical Minimal ReceiptCore) with signed tree heads (STHs) and inclusion/consistency proofs under a freshness policy (see §§ [0042]-[0044A], [0053]-[0055]). Upon successful verification by 185, a capability token 175 is minted and cryptographically bound to the verified receipt; a fail-closed controller denies and withholds the token upon any verification defect.

The verifier 185 first verifies the STH signature under a public key associated with the log, then validates STH inclusion and, upon STH advancement, validates and records a cryptographic consistency proof under the freshness policy, and emits a digitally signed verification transcript used for token minting and settlement gating.

B. Method Flow (FIG. 2)

Referring to FIG. 2, method 200 includes steps S101-S112: S101 receive a signed Atomic Intent Contract (AIC) 100 in intent wallet 110; S102 verify remote attestation of the trusted compute boundary 130 via attestation verifier 132 and bind secrets to the resulting boundary_measurement; S103 deterministically canonicalize the inputs and outputs using canonicalizer/digestor 150 and compute input_digest and output_digest; S104 perform a permitted operation via a connector; S105 compute the Minimal ReceiptCore {policy_digest, boundary_measurement, input_digest, output_digest, monotonic_counter, trusted_timestamp (t_end)} and record any Receipt Extensions (e.g., code_measurement, determinism_salt, io_canon, t_start, nonce, session_id, parent_receipt_id) outside the Core; S106 produce a sealed-key signature over a canonical encoding of the ReceiptCore from within boundary 130.

S107 anchor the commitment (the digest of the canonical Minimal ReceiptCore) via log subsystem 180 (transparency-style) and obtain a Signed Tree/Set Head (STH/SSH) and an inclusion proof; S108 validate the STH/SSH signature and the inclusion proof and—where a newer head than anchor. tree_head is available within the freshness threshold (MMD)—validate a consistency proof (append-only growth), optionally across dual anchors (see §§ [0044]-[0044B]); S109 mint a capability token 175 only after successful verification (Mint-After-Verify, MAV); S110 release escrow 190 or S111 execute clawback per the revocation window and any arbitration outcomes; S112 emit a digitally signed Verification Transcript and, where applicable, a Settlement Transcript (see §§ [0053]-[0055], [0104]).

Replays and pipeline integrity are enforced using a one-time nonce, a session_id, and a parent_receipt_id pointer; validators confirm a contiguous chain of anchored receipts for multi-step pipelines (see §§ [0045]-[0046]).

In S108, the verifier first validates the STH/SSH signature under a public key associated with the log, then verifies inclusion of the commitment (receipt_id=H (canonical (Minimal ReceiptCore))), and—upon head advance within the MMD policy—validates and records a consistency proof. S110 and S111 depict the allow (release) and deny/hold (clawback) branches, respectively.

C. Policy VM and Canonicalization (FIG. 3)

Referring to FIG. 3, the policy VM/compiler 120 ingests rule sets (finite-state/declarative), evaluates them inside boundary 130, and drives runtime enforcement. Canonicalizer/digestor 150 produces input_digest and output_digest from a deterministic serialization declared in io_canon (e.g., JCS or CBOR), yielding a Minimal ReceiptCore independent of provider-specific encodings (see § [0043]).

The policy VM/compiler 120 executes inside the trusted compute boundary 130; the canonicalizer/digestor 150 computes input_digest and output_digest; the Minimal ReceiptCore (policy_digest, boundary_measurement, input_digest, output_digest, monotonic_counter, trusted_timestamp) is generated while code_measurement and determinism_salt are recorded as Receipt Extensions (outside the Core); determinism is validated by recomputing the output digest, and the Model Identity Digest is stored outside the Core.

The boundary measurement (platform/model/firmware/TCB) and code measurement (loaded EE bundle) bind execution context to the ReceiptCore. A determinism_salt scopes admissible entropy such that a run is reproducible if, given {AIC, inputs, determinism_salt, code_measurement}, the output_digest recomputes identically (see §§ [0048]-[0048A]).

A model_identity_digest may be recorded outside the ReceiptCore to identify model weights and/or code segments used; placing it outside the Core preserves the canonical commitment while enabling provenance.

D. Anchoring and Proofs (FIG. 4)

Referring to FIG. 4, the log interface 180 accepts/submits a cryptographic commitment (leaf digest of the canonical Minimal ReceiptCore); the log returns an STH and inclusion proof; subsequent consistency proofs link to newer STHs. The verifier 185 first validates the STH signature under a public key associated with the log, then validates inclusion and consistency within a freshness threshold (e.g., MMD), and may maintain a continuity record that references the STH chain over time (see §§ [0044], [0044A], [0055A]).

In dual-anchor deployments (see § [0044B]), the verifier 185 denies when inclusion proofs disagree on the committed leaf or when a consistency proof fails for either independent log within the applicable MMD.

E. Verifier/Server (FIG. 5)

Referring to FIG. 5, the verifier 185 first validates the STH signature under a public key associated with the log, then validates inclusion and consistency proofs within MMD, and emits a digitally signed verification transcript committing to the receipt identifier and STH/SSH identifiers used. In some embodiments the verifier executes inside a TEE/HSM and signs with a sealed key; the transcript includes the verifier's attestation measurement and an approved-service indicator.

A recompute guard may be applied: given {AIC, inputs, determinism_salt, code_measurement}, the verifier recomputes output_digest; a mismatch marks the receipt INVALID and triggers fail-closed behavior (see § [0048A]).

The verification transcript MUST include STH identifier(s) used, continuity (from,to) where validated, and approved-service indicators (anchor/consistency/recompute/PQ-presence); it MAY be anchored, with inclusion proof retained.

The transcript may incorporate approved-service indicators for cryptographic/verification services and include outcome codes from an error taxonomy to aid independent diagnosis;

optional continuity links document freshness observance (see §§ [0055A], [0107]; Appendix A [A030], [A045], [A047]). Illustrative deny codes include CONSENT_MISSING, ANCHOR_STALE, CONSISTENCY_REQUIRED, TIME_BUDGET_EXCEEDED, and OFFLINE_EXPIRED; unknown codes MUST be surfaced but MUST NOT unblock gating. The verifier MUST operate with sealed signing keys and SHOULD run inside a TEE/HSM in REG-01, recording its measurement in the transcript.

Terminology. A "verification transcript" (also referred to as a "verification response") is a digitally signed server artifact that commits to the receipt identifier(s), the STH/SSH (and any continuity), approved-service indicators, and outcome codes, and is suitable for independent audit.

Anchored transcript (audit). A verification transcript MAY be cryptographically committed and anchored to a publicly verifiable append-only log (transparency-style); the verifier SHOULD retain an inclusion proof for independent audit.

Conformance certificate (optional). A certification engine MAY produce a digitally signed conformance certificate attesting that a deployment satisfied a conformance policy (ReceiptCore integrity, STH inclusion, MMD freshness, and where applicable continuity, dual-anchor, recompute, and approved-service indicators), and MAY anchor a commitment of the certificate to a publicly verifiable log for audit. For example and without limitation, a certification engine MAY issue a "TRC-Core/Pro/Privacy" conformance result for runtime view-permit gating and label exposure; such a certificate is merely evidentiary and does not alter PoPC's Minimal ReceiptCore or claim scope.

Certificates MAY embed a policy identifier (Core|Pro) referencing § [A107]/§ [A041] to facilitate procurement/regulatory adoption.

OpenAPI reference. A representative OpenAPI subset for the verifier and settlement interfaces is provided in Appendix D [D061]; the routes and schemas are illustrative and do not limit claim scope.

Transcript and certificate schemas. Representative JSON schemas for verification transcripts, settlement transcripts, and additional certificates (e.g., conformance, measurement attestation, regulator-view, provenance) are provided in Appendix E (see [E010], [E020], [E030], [E070]-[E090]). These schemas are normative for interoperability and illustrative vis-à-vis claim scope.

Reference SLOs (illustrative). In a representative implementation, proof verification (STH signature, inclusion, and consistency checks) completes in milliseconds (p50≤2 ms, p99≤ 10 ms), and anchoring observes a policy grace period≤5 minutes. Figures are illustrative and non-limiting.

Conformance badges (illustrative). Deployments MAY advertise CCP-Core/CCP-Pro badges. Badge criteria reference: Minimal ReceiptCore integrity, STH inclusion/consistency within MMD, and, where applicable, continuity records, dual-anchor non-collusion, and recompute-guard pass status. Badges map to signed verification transcripts. Illustrative only; claims control.

Functional equivalence. References to STH/inclusion/consistency include their SSH/SCP equivalents; references to CPT include FOP; references to "token mint" include activation of any FOP. (See Appendix A [A013], [A091] for CPT/FOP definitions and [A093]-[A095] for STH/SSH and consistency/SCP equivalence.)

Verifier hardening and operational profiles (e.g., sealed-key usage, transcript contents, continuity cadence) are summarized in Appendix M (non-limiting).

High-assurance profiles may require platform-authenticator assertions (passkey/WebAuthn-class) verified inside the TEE/HSM and cryptographically bound to (i) a digest of the Minimal ReceiptCore and (ii) the capability-token scope, with a prompt-attestation bit and, optionally, a PromptDigest recorded in provenance (see §§ [0058A]-[0058B]).

Pointer. Canonical interop vectors and expected outcomes: Appendix J. Reference verifier/settlement surface: Appendix K. Verification transcript schema: Appendix E. Dual-anchor and continuity policies appear in Appendix A ([A041], [A042], [A048]).

F. Settlement, clawback, and dispute resolution (FIG. 6)

Referring to FIG. 6, settlement controller 190 holds escrow, enforces a revocation window, and updates disposition in response to validated receipts 170. A clawback reverses or adjusts consideration when revocation, policy-contradiction signals, or arbitration outcomes so require (see §§ [0054], [0049A]).

The settlement controller 190 holds escrow during a revocation window; emits a signed settlement transcript (optionally anchored to the log 180); and, upon a threshold-signed arbitration award from quorum 195, anchors the award and updates settlement; clawback 192 is triggered by revocation/policy/arbitration signals.

Disputes may be resolved by an arbitration quorum 195 whose threshold signatures are linked to the receipt and anchored to the publicly verifiable log; settlement updates state in accordance with the signed resolution.

A digitally signed settlement transcript may be emitted, committing to proofs verified, STH/SSH identifiers used, disposition applied, and any dispute artifacts (see Appendix A [A047]). External verification and settlement transcripts SHALL encode human-readable timestamps in RFC 3339 with explicit UTC offsets; when UTC is known, "Z" MUST be used; when the local offset is unknown, "−00:00" MUST be used. This does not affect the ReceiptCore's monotonic t_end.

Anchoring cadence may be synchronous with completion or within a policy grace period; late anchors can be discounted by ranking freshness (see § [0055]).

G. Capability Tokens and Audience Binding (FIG. 7)

Referring to FIG. 7, a capability token 175 derived from a validated receipt 170 is bound to time-to-live (TTL) and a scope digest over permitted parameters/resources and may reference the receipt's anchor for traceability.

In some profiles, tokens are audience-bound to a relying-party identifier and bound to a digest of the Minimal ReceiptCore and the token scope; the verifier 185 confirms the relying-party identifier for the requested operation and binds the confirmation into the signed verification transcript.

Connectors enforce least-privilege by rejecting tokens (a) presented outside TTL, (b) with a mismatched scope digest, or (c) whose referenced receipt fails re-verification.

FIG. 7 illustrates audience-bound capability tokens: a validated receipt 170 yields a capability token 175 bound to TTL, scope digest, and the Minimal ReceiptCore digest, optionally with a receipt-anchor reference (via log 180) for traceability. A relying-party identifier is confirmed by the verifier 185 and recorded in the verification transcript. The connector enforces least-privilege (TTL, scope, and receipt re-verification under the freshness policy), rejecting tokens on TTL expiry, scope digest mismatch, or failed re-verification. Tokens MAY carry verifiable caveats (audience, time-window, geofence, device-class, data-minimization) bound to the token scope and Minimal ReceiptCore digest; connectors MUST enforce caveats at presentation and fail-closed on violations. (See § [0061F].)

H. Receipt Corpus and Ranking (FIGS. 8-9)

Referring to FIG. 8, a receipt corpus indexed by context encoder 202, policy_digest, actor/service identifiers, anchor. log_id, and provenance attributes supports ranking and audit. Duplicates are eliminated via canonical digests; stale anchors are penalized by freshness decay. OutcomeRank operates over receipt-validated actions and does not rely on hyperlink or citation graphs; weights derive from anchored provenance (attestation diversity, key continuity, cross-party signature entropy) and freshness decay. See Appendix A [A012] and § [0184] for freshness-decay parameterization (half-life H); this is evidentiary (transcript-level) and does not affect ReceiptCore validity.

Provenance anti-gaming. Provenance controls ($\tau_e$, m, h, k_min, d_min; RPP-CLIQUE-01) are the receipt-corpus analogue of link-graph "spam" resistance and operate on independent attesters and counterparties, not hyperlinks. (Illustrative; claims control.)

The OutcomeRank engine 200 computes receipt-proven success frequencies in comparable contexts, applies cost/constraint satisfaction, and weights by a provenance score derived from attestation vendor/hardware diversity, key continuity, and cross-party signature entropy (see § [0064]; component 204).

FIG. 8 shows a receipt corpus indexed by policy_digest, actor/service identifiers, log_id, and provenance; a context encoder 202 generates context keys; a corpus index/sybil filter [204] applies provenance weighting (attestation diversity, key continuity, signature entropy). The corpus feeds the OutcomeRank engine 200, which deduplicates by canonical digest of the Minimal ReceiptCore and penalizes stale anchors via freshness decay.

Referring to FIG. 9, the system performs provenance-aware Sybil/replay detection and produces a signed explainability output enumerating most-influential receipts/features and committing to the exact receipt set and STH/SSH identifiers used; a ranking transcript may be anchored for audit; features may include verification latency distribution (derived from verification transcripts) and dispute-reversal rates (from revocation/arbitration anchors).

Provenance-aware sybil/replay detection (FIG. 9). Referring to FIG. 9, a corpus index/sybil filter [204] feeds a provenance-aware sybil/replay detector that identifies a set of top receipts for a given context. Provenance weighting may incorporate at least attestation vendor/hardware diversity, key continuity over time, and cross-party signature entropy. The detector selects a "most-influential" receipt set and feature list (e.g., receipt identifiers and STH/SSH identifiers) for the ranked subject; optional feature inputs include a verification-latency distribution derived from signed verification transcripts and dispute-reversal rates derived from anchored arbitration awards or revocation entries.

Explainability outputs and audit. The OutcomeRank engine 200 emits an explainability payload identifying the most-influential receipts and features that contributed to the score; the payload is signed as an explainability transcript and may be anchored for audit (ranking-transcript anchor). The explainability transcript can reference the exact receipt set and STH/SSH identifiers used and, where applicable, cite the source artifacts for latency and reversal statistics. Anchoring and transcript formats are illustrative and non-limiting; the claims control (see also § [0065]).

Reproducible evidence for ranking (illustrative). Ranking transcripts MAY commit to a Receipt Set Commitment (RSC) and, where applied, report independence/diversity metrics ($\tau_e$, m, h, d_min, k_min) and oracle-attestation counts; a Proof of Aggregation (PoA) MAY be included. High-assurance profiles MAY require such metrics for audit.

I. Privacy-Preserving Receipts and Regulator Views (FIGS. 10-11)

Referring to FIG. 10, the system supports privacy-preserving receipt variants 170 in which selected policy checks are attested via a zero-knowledge proof segment 172 without revealing underlying inputs or the predicates themselves (confidential policy). Selective-disclosure proofs can accompany redacted audit views to preserve verifiability while protecting sensitive data. In confidential-policy mode, the capability-token minter requires verification of a zero-knowledge proof inside the trusted boundary and denies mint upon proof failure.

FIG. 10 shows a privacy-preserving receipt 170 carrying a zero-knowledge proof segment 172; the proof is verified inside the trusted boundary 130 in confidential-policy mode. On proof failure, mint is denied; on success, a capability token 175 is minted. The dotted redacted-view path depicts selective-disclosure for regulator audits.

Referring to FIG. 11, intent wallet 110 binds actor keys to secure elements 220 and presents trusted prompts in an OS/Browser agent gate 230; an attestation of prompt presentation may be recorded in provenance for high-assurance flows (see §§ [0058]-[0058B]). The compliance interface 210 renders regulator-verifiable views that preserve verifiability of at least the policy digest, boundary measurement, signatures, and timeline, optionally with redactions backed by selective-disclosure proofs.

FIG. 11 illustrates prompt-attestation: the intent wallet 110 binds actor keys to a secure element 220, presents a trusted OS/browser prompt 230, records a prompt-attestation bit and may include a PromptDigest in provenance, and renders a regulator-verifiable compliance view 210 with optional selective-disclosure proof.

J. Deployment Placements and Transparency Logs (FIGS. 12-13)

Referring to FIG. 12, placements of the trusted compute boundary 130 include cloud enclaves, edge devices, and IoT/robotic controllers; connectors link to external services/tools. The same ReceiptCore→anchor→verification sequence applies across placements.

The trusted compute boundary 130 may be deployed in a cloud enclave, edge device, or IoT/robotic controller; in all placements the execution sequence is identical: Minimal ReceiptCore→anchor to log 180→verify via STH signature, inclusion, and consistency under the MMD policy.

Referring to FIG. 13, a transparency-style, publicly verifiable append-only log 180 exposes STHs, inclusion/consistency proofs, anchor publication, and independent verification paths. A continuity record can link successive STHs to document freshness adherence over time (see § [0055A]).

The transparency log 180 exposes signed tree heads (STHs) with inclusion and consistency proofs and publishes anchors; verifiers may construct continuity records linking successive STHs and enforce a freshness (MMD) policy.

K. Dispute and Arbitration (FIG. 14)

Referring to FIG. 14, evidence from PoPC receipt 170 is replayed, a quorum 195 forms, threshold signatures are generated, and log-anchored updates adjust settlement state. The revocation window 192 admits revocation checks, policy-contradiction signals, and arbitration outcomes (see § [0054]).

A PoPC receipt 170 is replayed as evidence; within the revocation window the arbitration quorum 195 forms and generates threshold signatures; the award is anchored to the log 180 and the settlement is updated accordingly by the settlement controller 190.

L. Federated Indexing (FIG. 15)

Referring to FIG. 15, federated index nodes 240 cooperate via a privacy aggregator 250 to perform privacy-preserving aggregation (e.g., PSI/HE) while retaining attestation provenance for ranking and audit. The corpus can be queried for context-conditioned statistics and ranking signals without exposing raw inputs.

Multiple federated index nodes 240 contribute to a privacy aggregator 250 (PSI/HE) that retains attestation provenance; only context-conditioned aggregates are emitted-no raw input exposure.

M. Computer-Program-Product Mapping (FIG. 16)

Referring to FIG. 16, a computer program product embodiment maps instructions to operations executed by one or more processors: (1) policy evaluation inside a remotely attestable boundary 130; (2) deterministic canonicalization of inputs/outputs via 150; (3) ReceiptCore computation and sealed-key signature by 160; (4) anchoring a commitment of the Minimal ReceiptCore to log 180; (5) proof validation (inclusion/consistency) under freshness (MMD) by verifier 185; (6) capability-token mint 175 only after verification; and (7) fail-closed control upon any verification or recompute failure.

FIG. 16 maps the computer program product: policy evaluation inside the trusted boundary 130; deterministic canonicalization 150; compute Minimal ReceiptCore+ sealed-key signature 160; anchor commitment=H (canonical Minimal ReceiptCore) to log 180; validate STH signature+ inclusion+consistency under the MMD policy 185; mint the capability token 175 only if verification passes; otherwise a fail-closed controller denies.

The program may be packaged as a library/SDK, enclave image, container layer, kernel module, or application package; a packaging manifest can embed the code measurement referenced by receipts. Deterministic builds enable independent reproduction of the code measurement.

N. Device-Side Actuation Latch (FIG. 17)

Referring to FIG. 17, a device-side actuation latch validates a policy-compliance artifact—e.g., a PoPC receipt 170 or a conformance certificate—that commits to the canonical Minimal ReceiptCore before actuation. The verifier first checks the STH signature under a public key associated with the log, validates the inclusion_proof to that STH, and—upon observing a newer STH within a policy maximum-merge delay (MMD)—validates a consistency proof. The system then confirms audience binding (to a device or relying-party identifier) and scope binding (to an operation class/parameter envelope). Optional dual-anchor agreement and a recompute guard may be applied. If all checks pass within policy timeouts, a RUN_PERMIT latch 260 drives the driver/GPIO enable 262 to allow actuation; otherwise RUN_PERMIT:=0 and the path fails closed. The diagram also indicates deny/allow latency windows (e.g., ≤50 ms to drop to deny after a predicate failure and ≤250 ms to arm after fresh validation), and an Actuation Transcript Unit 264 recording at least {log_commit_id, STH identifier(s), anti-replay tag, audience id, operation code, RFC 3339 timestamps for {t_req, t_val, t_act}}. A Device Attestation Module 266 and Geofence/Time-Window Guard 268 are shown for high-assurance profiles. Timings are illustrative and non-limiting. See Appendix L for an illustrative RUN_PERMIT reference board and timing examples.

For model-gated features, a device MAY also verify a training-lifecycle certificate (e.g., BIC/IFC) under the same freshness/continuity policy prior to asserting RUN_PERMIT; acceptance remains evidentiary and does not alter ReceiptCore semantics.

Higher-hazard or child-accessible actuations MAY require a two-person rule and/or guardian co-sign before asserting RUN_PERMIT.

O. Protected Self-Test Sequence (FIG. 18)

Referring to FIG. 18, a protected self-test routine asserts: (1) a self-test trigger; (2) a synthesized deny transition by injecting a replay-block or proof-failure condition, causing RUN_PERMIT:=0 and emission of a denial transcript (including STH identifier, outcome code, and a cadence_delta derived from the timing triplet {t_req, t_val, t_act}); and (3) a fresh validation sequence (inclusion_proof→STH, consistency within MMD, audience/scope checks, and any dual-anchor/recompute requirements) that asserts an allow transition(RUN_PERMIT:=1) within the allow latency budget and emits a corresponding allow transcript. (4) Failure to produce either transcript within configured latency bounds, or failure of any predicate, places the device in quarantine until a new validation succeeds. The sequence also depicts optional certificate-level gating (e.g., CCP-Core/CCP-Pro), post-quantum/hybrid signature acceptance, and offline freshness-window acceptance using a continuity chain of STH/SSH identifiers. Timings and options are illustrative and non-limiting.

P. Alternatives and Extensions

Oracle-gated settlement (optional). Outcome-contingent release MAY require, in addition to receipt verification, an oracle attestation that commits to the same receipt_id and outcome label; such attestations MAY be anchored and referenced by settlement transcripts (see § [0102]; Appendix D [D061]/oracle/attest, /oracle/anchor). Deployments MAY accept external bounded-impact certificates (training-lifecycle 'BIC') and Index-Forgetting Certificates (IFC) as oracle-style evidentiary inputs for settlement or regulator views, when such certificates are transparency-anchored and verifiable under the same freshness/continuity predicates. (see Appendix A [A119] and [A120]).

Dual-anchor coordination (optional). A coordination service MAY validate anchors from two or more independent logs, issue a signed non-collusion or conflict result, and optionally anchor that result; receipt acceptance MAY be conditioned on a non-collusion outcome (see § [0044B], § [0055A]).

Federated analytics (optional). Aggregate, context-conditioned metrics MAY be computed across parties using privacy-preserving methods (e.g., PSI/HE) and emitted as a digitally signed aggregate transcript, optionally anchored (see Appendix D [D061]/analytics/aggregate and Appendix E [E060]).

Attested transport (optional). Deployments MAY use attested-TLS (aTLS), binding session acceptance to a boundary measurement in addition to mutual TLS, alongside or in place of mTLS (see Appendix A [A044A]).

PQ cutover profiles (optional). After a configured cutover time, validators MUST enforce post-quantum or hybrid signatures per the deployment policy (see § [0057]).

Key-continuity policy (optional). Validators MAY record key-continuity evidence for signing keys and discount or deny where continuity falls below a threshold (see Appendix A [A039]).

Conformance certification (optional). A certification engine MAY issue a digitally signed conformance certificate upon policy satisfaction and anchor a commitment of the certificate for audit (see §§ [0100C], Appendix E [E030]).

All items in and [0122A]-[0122F] are illustrative and non-limiting; embodiments remain standard-agnostic.

Q. Computing Environment

Program logic may execute in user space, kernel space, TEEs/HSMs, secure elements, GPUs/NPUs or other accelerators, FPGAs, or ASIC logic. Storage media include non-transitory computer-readable media such as ROM, flash, EEPROM, SSD, optical or magnetic media. Network endpoints may operate in single-tenant or multi-tenant deployments with appropriate isolation; transports may use mTLS and, where configured, attested-TLS (aTLS). Key material MAY be generated or derived inside a trusted compute boundary and MAY be rotated per deployment policy.

Closing. The embodiments convert opaque actions into verifiable transactions by binding intent→policy→attested execution→anchored proofs→fail-closed gating→ settlement→ranking. Numerous variations, equivalents, and combinations will be apparent in view of this disclosure. The claims define the scope of the invention.

TECHNICAL EFFECTS AND COMPUTER SECURITY IMPROVEMENTS

Overview of technical effects. Implementations of the disclosed intent-execution-receipt-settlement rail produce concrete improvements to computer functionality, system security, and auditability by: (i) enforcing machine-checkable policy inside a trusted compute boundary during execution; (ii) emitting non-replayable, independently verifiable receipts that bind policy digest, boundary/code measurements, and canonical I/O digests in a ReceiptCore signed by a sealed key; and (iii) conditioning capability-token mint, settlement/clawback, and ranking on proof-validated artifacts. These mechanisms operate at the computer-architecture level to reduce replay/staleness attack surface and to enforce automated, policy-bound, fail-closed gating before any follow-on capability is enabled, thereby improving the functioning of the computer itself.

Threat-predicate mapping (illustrative). Appendix I maps representative threats (e.g., replay, staleness, equivocation, consent spoofing) to the rail's enforcement predicates (nonce/session/counter, MMD/continuity, dual-anchor, prompt-attestation, recompute). The mapping is illustrative and non-limiting.

Integration invariant. The joint requirement of (i) canonical Minimal ReceiptCore commitment, (ii) freshness-and-consistency validation by an independent verifier, and (iii) mint-after-verify fail-closed gating produces a concrete reduction of replay/staleness and token-laundering surface compared with any one or two of these techniques alone.

Threat model and attack surfaces. The rail mitigates at least: (a) actor impersonation and over-delegation; (b) execution drift outside a declared policy envelope; (c) provider-log tampering/repudiation; (d) authorization replay and token laundering; (e) cross-tenant data misuse; and (f) ranking manipulation via Sybil/self-deal artifacts.

Beyond pre-execution ACLs. Compiling declarative rules or finite-state machines into bytecode and enforcing them inside the attested boundary transforms access control from static pre-execution checks into continuous runtime enforcement over real inputs and egress.

Attestation-bound execution integrity. Secrets and connectors are provisioned only after fresh remote attestation; the resulting boundary measurement is bound into the ReceiptCore so verifiers can cryptographically confirm binary/measurement/epoch and apply revocation or version pins during a revocation window, enabling programmatic clawback.

Approved-service indicators. Each approved cryptographic or verification service SHALL emit an unambiguous indicator (e.g., return-code field or signed-transcript flag) denoting approved execution; indicators are included in verification/settlement transcripts to enable independent audit. (Illustrative; claims control.)

Replay immunity and least-privilege continuation. Receipts and derived capability tokens include monotonic counters, explicit TTL, scope digest, and AIC/anchor references. Connectors reject tokens that are stale, out of scope, or lacking a committed anchor; audience-binding can require a relying-party identifier match.

Deterministic canonicalization and recompute. Normalizing inputs/outputs prior to digesting enables cross-platform recomputation of canonical digests and third-party validation without shipping raw data. A recompute guard detects divergence: given {AIC, inputs, determinism_salt, code_measurement}, the output_digest must reproduce identically; otherwise the receipt is INVALID and the system fails closed.

Transparency-style anchoring and independent verification. Anchoring a commitment of the canonical Minimal ReceiptCore to a publicly verifiable append-only log (transparency-style) with STHs and inclusion/consistency proofs provides tamper-evident persistence; freshness (MMD) and optional dual-anchor non-collusion profiles harden against log or operator bias.

Mint-after-verify gating. A capability token is minted only after successful verification of inclusion/consistency under freshness; any failure (proof mismatch, staleness, recompute failure, revocation) triggers fail-closed denial and withholds the token.

Programmable escrow and dispute resolution. A settlement controller acts on machine-verifiable receipt fields and threshold-signed arbitration outcomes; revocation-window checks and policy-contradiction signals drive automated clawback. Signed transcripts document dispositions for independent audit.

Privacy-preserving compliance. Optional zero-knowledge segments attest predicate satisfaction (e.g., residency, age, budget caps) without revealing inputs; selective-disclosure proofs preserve verifiability for redacted regulator views.

OutcomeRank signal. OutcomeRank computes receipt-proven success rates under comparable context vectors and discounts Sybil/self-deal clusters using attestation provenance and key continuity; signed ranking transcripts with explainability payloads provide an auditable, provenance-aware ordering.

OS/browser integration and consent integrity. Binding the intent wallet to secure elements/passkeys and presenting trusted OS/browser prompts (platform-authenticator assertions) reduces consent spoofing and binds human confirmation to the ReceiptCore digest+token scope.

Trusted channel indicator (optional). Where a deployment requires manual key entry or output, implementations MAY use a trusted channel; transcripts SHOULD include an indicator when such a channel was used. (Illustrative; no standard required.)

Network/compute efficiency. Receipts and anchors replace ad-hoc screenshots and log pulls with compact, cacheable proofs; verifying digests and proofs is cheaper than re-executing workflows or shipping raw evidence across domains.

Resilience. Independently verifiable anchors and cached inclusion/consistency proofs permit validation under partial connectivity or provider outage; continuity records document STH evolution over time.

EXEMPLARY IMPLEMENTATIONS(REFERENCE BUILDS)

Overview. The following reference builds demonstrate concrete, machine-executable embodiments of the rail in cloud enclaves, OS/browser endpoints, and robotic/IoT controllers. Names and components are illustrative and non-limiting; claims control.

I. Cloud Enclave Rail (Confidential-Compute Build)

Architecture. A cloud-native pipeline binds policy enforcement to a hardware-attested runtime and emits receipts anchored in a publicly verifiable append-only log (transparency-style). Representative TEEs include Intel SGX/TDX and AMD SEV-SNP; confidential-container stacks are supported.

Components. Policy Compiler (PC); Attested Runtime (AR); Intent Wallet (IW); Connector Gateways (CG); Transparency Log (TL); Settlement & Clawback (SC); OutcomeRank Aggregator (OR).

Execution flow (Illustrative).

(1) Policy load (PC→AR).

(2) Remote attestation (AR returns quote; IW verifies; secrets sealed to boundary measurement).

(3) Intent bind (IW signs intent; AR binds to policy digest/ReceiptCore).

(4) Guarded execution (policy enforced in-boundary; egress passes an egress filter).

(5) Receipt emission(ReceiptCore+sealed-key signature; optional ZK; provenance).

(6) Anchor (commitment of the canonical Minimal ReceiptCore to a publicly verifiable append-only log; fetch inclusion/consistency proofs).

(7) Verification & settlement (validate proofs under MMD; disburse or claw back).

(8) Ranking (OR ingests validated receipts with provenance-aware discounts).

Capability-token format (illustrative). CPT:=Sig_AR ({sub, scope_digest, ttl, aic_id, nonce, policy_digest, receipt_id}). Gateways verify the AR signature chained to the boundary measurement, TTL, anchor presence, and scope match; tokens are single-use via nonce. (Hereinafter, 'capability token' is abbreviated CPT).

Security properties. Time-of-check/time-of-use (ToC/ToU) immunity via in-boundary enforcement; tamper evidence via TL anchoring; replay resistance via nonces/monotonic counters; least-privilege via scoped CPTs; automated dispute via SC and threshold-signed arbitration.

Representative performance (illustrative). Attestation (cached endorsements)≤150 ms; receipt creation≤10 ms; inclusion/consistency verification ≈2 ms+proof check; receipt size~1-3 KB excluding proofs.

II. OS/Browser Intent Wallet (Endpoint-Mediated Build)

Architecture. A device build binds capability prompts to platform authenticators and a local policy VM, issuing network-portable receipts without exposing raw data.

Components. Intent Wallet UX, Local Policy VM, Network Guard, Remote Verifier, Key Vault.

Execution flow (illustrative). Intent→compile policy→trusted intent sheet (passkey confirm)→LPVM runs tools through Network Guard (CPT-gated)→device-bound receipt with device attestation→anchor/verify→federated OutcomeRank updates.

Trusted UI & phishing resistance. Passkey-gated OS surfaces prevent consent spoofing by untrusted overlays; a prompt-attestation bit is recorded in receipt provenance.

Privacy-preserving compliance. Deterministic redaction with ZK attestations; receipts carry proof transcript only; regulator views use selective-disclosure.

Offline mode. Queued receipts with counter-chained placeholders; stricter budgets; anchor on reconnect; counter gaps invalidate queued CPTs.

III. Robotic/IoT Controller (Hard Real-Time Build)

Architecture. A deterministic controller enforces policy within a real-time scheduler and emits cycle-accurate receipts for actuation under safety envelopes.

Components. Safety & Policy Scheduler (SPS); Device Identity (DI); Fieldbus Guard (FG); Sensor Canonicalizer (SCn); Actuation Receipt Unit (ARU); Edge Anchor (EA).

Execution flow (illustrative). Boot attestation→policy load→guarded loop per cycle k (canonicalize sensors, compute action within envelope, evaluate policy predicates, update the ReceiptCore with jitter/budget/envelope indicators)→anchor & verify within the cycle's compliance window.

Safety/compliance guarantees. Envelope enforcement; cycle-accurate receipts; fieldbus allow-listing; auditability without raw payloads.

Fail-safe behavior. On attestation failure, policy drift, or anchor/verification timeout, revert to Safe Halt/Degraded Mode; drop non-compliant traffic; seal a final cycle receipt with a fault code.

Latch enforcement. In high-assurance placements the controller delegates actuation gating to the device-side actuation latch(RUN_PERMIT) described in § [0120] (N. Device-side actuation latch, FIG. 17), applying cadence, freshness, audience/scope, and certificate requirements prior to motion or dose.

Non-limiting nature. The foregoing technical effects and reference builds illustrate example embodiments and do not limit the scope of the claims. Variations, equivalents, and combinations will be apparent in view of this disclosure; the claims define the scope.

IV. Device-Side Actuation Latch (Generalized Placement)

Overview. A device MAY enforce receipt-conditioned actuation by driving a run-permit latch(RUN_PERMIT) that defaults to deny. RUN_PERMIT SHALL be asserted (1/allow) only after receipt/certificate validation succeeds per §§ [0044]-[0044B], [0053]-[0055], and SHALL be cleared (0/deny) on any predicate failure (see also §§ [0098]-[0101]). Where the FOP is a view-permit latch, an equivalent fail-closed/re-arm state machine applies; a self-test transcript SHOULD record ms_fail_close and ms_rearm. (Illustrative.)

Validation inputs. The device SHALL accept a policy-compliance receipt or conformance certificate that (i) commits to the canonical Minimal ReceiptCore and carries inclusion_proof to a signed tree head (STH); (ii) validates a consistency proof when advancing to a newer STH obtained within MMD; (iii) binds audience to a device or relying-party identifier; and (iv) binds scope to an operation class and parameter envelope for the requested actuation. Dual-anchor profiles per § [0044B] MAY be required.

RUN_PERMIT wiring and latency. RUN_PERMIT MAY gate a GPIO/driver enable line and MUST default deny on boot and on any validation failure. Devices SHOULD assert RUN_PERMIT:=0 within ≤50 ms after a failure and permit arming within ≤250 ms only after fresh validation completes within policy timeouts.

Cadence divergence (CDT). Let t_req=request time, t_val=validation time, t_act=actuation time(RFC 3339 UTC paired with a monotonic source). Define s1:=t_val-t_req, s2:=t_act-t_val, and cadence_delta:=|s1−s2|. Devices SHALL deny when cadence_delta>CDT, where CDT is a policy-configured Cadence Drift Threshold. The denial transcript SHOULD record cadence_delta.

Actuation transcript. On allow/deny, devices SHOULD persist a signed actuation transcript containing at least: receipt_version, log_commit_id, STH identifier(s), anti-replay tag, device audience id, operation code, and RFC 3339 timestamps for {request, validation, actuation}, plus any continuity record (§ [0055A]) used.

Self-test (factory/field). A protected self-test SHALL synthesize an allow and a deny transition of RUN_PERMIT and require emission of the corresponding evidence (actuation transcripts) within the latency bounds in § [0156B]. Self-test MUST fail-closed upon any predicate miss or late evidence.

Offline acceptance. Devices MAY accept cached receipts within a bounded freshness window shorter than the deployment's MMD, provided a continuity chain of STHs is present. Outside the window, devices SHALL deny and require online re-validation.

Hazard classes. For higher-hazard operations, devices SHOULD map a risk tier to stricter MMD, CDT, and latency budgets; exceedance SHALL deny.

Two-person rule (optional). For designated operation classes, devices MAY require two independent receipts/certificates, each with distinct audiences/keys, prior to asserting RUN_PERMIT:=1. In CSP-01, one party MAY be a guardian credential.

Privacy-preserving proofs and certification. Devices MAY accept receipts bearing zero-knowledge proofs (§§ [0030], [0112]) and/or conformance certificates (§ [0100C]) without raw inputs; invalid or stale proofs/certificates SHALL deny.

J Geofence/time-window and device attestation. Devices MAY require geofence and/or time-window constraints bound into the ReceiptCore and SHALL verify a device-attestation quote against allow-listed measurements for high-assurance flows; violations deny.

INDUSTRIAL APPLICABILITY (PCT RULE 5)

Policy/regulatory alignment (illustrative; nonlimiting). Many emerging frameworks—e.g., the International Scientific Report on the Safety of Advanced AI (2025) and state-level measures such as New York's RAISE Act—call for auditable safety-plan reporting, incident logging, and post-market oversight for powerful AI systems. The PoPC rail emits independently checkable artifacts—anchored receipts, signed verification and settlement transcripts, and revocation entries—that can simplify such reporting and oversight while remaining technology- and jurisdiction-agnostic. These references are provided solely for context; they do not narrow the claims and no external document is incorporated by reference.

Applicability. The disclosed systems and methods are industrially applicable across computing, communications, finance, healthcare, manufacturing, logistics, advertising/search, and governmental compliance. Implementations convert opaque actions into verifiable transactions by binding intent→policy→attested execution→anchored proofs→fail-closed gating→settlement→ranking, enabling portable audits, least-privilege continuations, and receipt-conditioned settlement at scale.

Representative deployments (illustrative, non-limiting). Examples include FinTech/Payments (receipt-conditioned disbursement/chargeback), Healthcare/PHI (redacted regulator views with selective-disclosure proofs), Cloud/SaaS Marketplaces (verifier APIs and outcome-based discovery), Robotics/Industrial Control (cycle-accurate receipts under safety envelopes), Advertising/Search (receipt-attested outcome ranking), and the Public Sector (policy-verifiable action trails).

Biopharma (illustrative). The rail supports GxP and clinical workflows in which software agents must furnish regulator-verifiable audit artifacts; PoPC receipts and signed transcripts can be presented to sponsors and authorities as independently checkable evidence.

Autonomous agents (illustrative). The rail likewise supports autonomous agent workflows across unregulated and regulated domains—e.g., manufacturing, retail, finance, logistics, customer service, human resources, and cybersecurity—where independently verifiable receipts and fail-closed continuations are desirable; examples are illustrative and do not limit claim scope.

Interoperability & access (non-limiting). Deployments may adopt FRAND licensing for verifier/receipt interoperability and royalty-free terms for public-interest use (e.g., safety/health, low-income regions). These business arrangements are illustrative only and do not limit claim scope.

Ethical use (non-limiting). Recommended safeguards and prohibited uses appear in Appendix G; these guidelines are non-limiting and do not affect claim scope.

Ethical-use posture (illustrative; nonlimiting). Business-level posture MAY include FRAND/humanitarian licensing; defensive termination for clearly prohibited uses (e.g., persecution, mass surveillance, coercive social-credit scoring, or deceptive consent mimicry); and minors protection. Prohibited uses include exploitation of minors, manipulative consent mimicry targeting minors, and surveillance or profiling of minors outside lawful, verifiable safety purposes. These examples are illustrative and do not limit claim scope.

Operator diversity (illustrative). Deployments may target≤33% anchoring capacity per operator and publish operator rosters/uptime to reduce capture; guidance is illustrative and does not limit claim scope.

Commercial fit (illustrative). The disclosed systems satisfy machine-verifiable guardrails for AI-safety policies, data-residency and locality, budget controls, age/region gating, medical/industrial safety envelopes, and evidence-based billing, thereby enabling trustworthy automation at Internet scale. (Illustrative; does not limit claim scope.)

SLM-first/heterogeneous agents (illustrative). Deployments may adopt small-model-first agent stacks in which specialized, on-device or edge-hosted small language models (SLMs) handle repetitive, scoped tool-calls, with optional fall-back to general-purpose LLMs. The disclosed rail applies unchanged: each step emits a PoPC receipt, anchors a Minimal ReceiptCore commitment to a publicly verifiable log, enforces MMD freshness and, upon STH advance, consistency proofs, and gates follow-on privileges via mint-after-verify. (Illustrative; claims control.)

BEST MODE IMPLEMENTATIONS AND PARAMETER RANGES

Overview. This section discloses best-mode selections and representative parameter ranges for implementations of the rail. Values are illustrative, not limiting; substantially equivalent algorithms and settings may be substituted without departing from the claims.

A. Cryptography and Encodings

Digests(ReceiptCore & I/O). Best mode: SHA-256. Alternatives: SHA-512/256, SHA-3-256, BLAKE3 (where available and policy-approved).

Receipt signatures. Best mode: Ed25519. Legacy interop: ECDSA P-256. Post-quantum (hybrid) option: CRYSTALS-Dilithium-2/-3 or Falcon-512 in dual-signature mode.

Arbitration quorum signatures. Best mode: BLS12-381 threshold (e.g., 3-of-5). Ranges: $m \in [2 \ldots 7]$, $n \in [3 \ldots 15]$, selected per risk domain.

Anchoring (transparency-style log). Merkle tree with signed tree heads (STHs) and inclusion/consistency proofs; MMD≤1 h (configurable 5 min-24 h).

Canonicalization. JCS(RFC 8785) for JSON; CBOR canonical encoding for binary/compact structures; fixed-width encodings for hard-real-time receipts (rtPRC).

Randomness/DRBG. NIST SP 800-90A DRBG seeded from a platform TRNG; enclave/secure-element sources preferred; seed/nonce provenance recorded in provenance fields.

B. Time, Counters, and Nonces

Timestamps. UTC(RFC 3339) plus monotonic time; clock tolerance±1 s (preferred), up to ±5 s where necessary.

Monotonic counters. uint64; step by 1 per receipt and per capability token; anti-rollback storage where available. Validators MUST reject a receipt whose monotonic_counter is ≤the last accepted value for the same boundary_measurement (counter rollback or stall).

Nonces. ≥128-bit uniformly random, unique per scope; single-use for token mint and high-assurance flows.

C. Revocation, Settlement, and Dispute

Revocation windows (profiles). Commerce/ads: 24-72 h. Health/finance: 7-30 d. Robotics/OT: 0-15 min.

Settlement milestones. Two-stage 60/40 or 70/30 keyed to multiple anchored receipts; partial refunds pro rata based on verified outcomes.

Clawback triggers. Mandatory: attestation key revocation, enclave/measurement ban, policy-contradiction evidence, safety incident, or quorum decision. Optional: model/data-use breach attested via zero-knowledge proof.

Arbitration thresholds. 2-of-3 to 5-of-7, tuned to counterparty count, value at risk, and sector.

D. Receipt Format and Sizes

Payload sizes (typical). Without ZK: 1-3 KB (cloud/OS), 0.5-1.5 KB (rtPRC). With ZK: 3-12 KB, proof-system dependent.

Field encodings. Hex or base64url for binary fields; CBOR/JSON for structured fields; anchors carry leaf commitment (digest of canonical Minimal ReceiptCore), STH and an inclusion-proof array.

E. Policy and Egress Controls

Budget caps. Absolute spend, rate caps, byte caps; per-connector allow-lists; violations fail-closed and annotate receipts.

Geographic/residency. Egress IP geofencing+vendor jurisdiction tags; receipts include vendor region evidence for audit.

Safety filters. Allow-list of vetted tools; ML guardrail checks; optional ZK proof-of-execution for safety predicates.

F. Platform Integrations

OS/Browser wallet. WebAuthn (passkeys); Secure Attention UI; keys in Secure Enclave/StrongBox/TPM; network gating via Network Extension/LSM/eBPF/WFP.

Cloud enclave. AMD SEV-SNP or Intel TDX; quotes verified against endorsements; secrets sealed to boundary measurement.

Robotic/IoT controller. RTOS: Zephyr or PREEMPT_RT; device identity via TPM 2.0/DICE; fieldbus guard on CAN/EtherCAT/PROFINET; cycle 1-10 ms; jitter proven in rtPRC.

G. OutcomeRank Parameters

Context similarity. Cosine similarity over embeddings; $\tau \in [0.7\text{-}0.9]$ (domain-specific).

Freshness decay. Half-life $H \in [7\text{-}60]$ d; operations/robotics may use $H \leq 3$ d.

Sybil/self-deal discounts. Penalize shared-runtime spikes with correlated counterparties, reciprocal-pair dominance, and sub-threshold reputation; weight clipping $w \in [0.1\text{-}1.0]$.

Confidence intervals. Wilson or Agresti-Coull with per-context floor $k\_min \in [5\text{-}50]$.

H. Networking and APIs

Transports. HTTP/3 (QUIC) or gRPC with mTLS; TLS 1.3; cipher suites TLS_AES_128_GCM_SHA256 or TLS_CHACHA20_POLY1305_SHA256.

Representative API endpoints. /policy/compile, /attest, /exec, /anchor, /verify, /settle, /dispute, /rank/report, /transcript/anchor, /certify, /cert/anchor, /oracle/attest, /oracle/anchor.

I. Security Posture

Key management. Rotate signing keys≤90 d; record key IDs in receipts; support CRLs/OCSP; wallet keys in secure elements; runtime keys derived inside the enclave/TEE.

Denial controls. Hard denials for policy violations, failed attestation, expired CPTs, budget overruns, missing anchors; soft denials with queue semantics for transient log unavailability (re-verify on reconnect).

Privacy defaults. Prefer ZK proofs; default to canonical digests instead of raw I/O; compliance interface 210 redacts PII while preserving verifiability via selective disclosure.

J. Worked Best-Mode Example (Concise)

Commerce integration (illustrative). An AIC policy (budget≤$1200, region {EU, US}, vendor allow-list) is compiled to bytecode and executed in an SEV-SNP confidential VM. The receipt is Ed25519-signed and contains policy_digest, enclave measurement, canonical I/O digests (SHA-256), a 64-bit monotonic counter and nonce, monotonic time t_end (Core; human-readable RFC 3339 appears only in transcripts), and a ZK proof that spend≤$1200. The receipt is anchored to a transparency-style log (MMD 1 h). Escrow disburses 70/30 across two milestones. Revocation window: 72 h. Arbitration quorum: 3-of-5 (BLS12-381). OutcomeRank: cosine-similarity threshold t=0.8, freshness half-life 30 d, Sybil penalties on reciprocal pairs.

Non-limiting clause. The foregoing parameter values reflect best-mode selections and engineering-reasonable ranges as of the filing date. Implementations may adopt different algorithms, sizes, intervals, and thresholds that provide substantially equivalent security and verifiability characteristics without limiting the claims.

COMPUTER PROGRAM PRODUCT (CRM)

Computer-Readable Medium (CRM). As used herein, a computer-readable medium (CRM) is a non-transitory physical medium storing instructions (e.g., ROM, flash, EEPROM, SSD, optical disk, magnetic disk, NVRAM) executable by one or more processors. Signals per se (e.g., propagated electromagnetic or carrier waves) are excluded. The terms computer-readable medium, non-transitory computer-readable medium, and computer program product (CPP) are used interchangeably herein for international compatibility.

Program form and execution context. Program instructions may be compiled or interpreted, modular or monolithic, and may execute on a single machine or across distributed processes. Execution within a trusted compute boundary (e.g., TEE/HSM or verifiably deterministic audited sandbox) is remotely attestable as disclosed herein; when executed, the instructions cause the machine to perform the receipt, anchoring, verification, capability-token minting, and fail-closed operations described in this specification.

Computer program product—further technical effect. When executed, the program produces a further technical effect beyond normal computer operation: attested, deterministic execution with publicly verifiable proofs (STH/inclusion/consistency under freshness, e.g., MMD) that enable mint-after-verify gating, fail-closed control, and receipt-conditioned settlement, thereby improving computer security and verifiable auditability.

A. CRM Operations Mapping

Policy evaluation in an attestable boundary. Load a compiled, machine-readable atomic intent contract (AIC) and evaluate it within a remotely attestable trusted execution boundary; bind a boundary measurement (code and configuration) to the evaluation context (see §§ [0047], [0049]).

Deterministic canonicalization. Deterministically canonicalize inputs and outputs and compute canonical input and canonical output digests. Determinism is enforced by fixed encodings, stable sort orders, and numeric normalization rules (see § [0043]).

ReceiptCore and signature. Compute a ReceiptCore comprising: (i) a measurement of the trusted compute boundary, (ii) a policy digest, (iii) a canonical input digest, (iv) a canonical output digest, (v) a monotonic counter value, and (vi) a trusted timestamp; produce a digital signature from within the boundary over at least the ReceiptCore (see § [0042A]).

Anchoring to a publicly verifiable log. Commit a representation of the receipt to at least one publicly verifiable append-only log (transparency-style) and obtain a signed tree head (STH) and an inclusion proof (see § [0044]).

Proof and freshness validation. Validate the inclusion proof with respect to the STH and validate a consistency proof to a more-recent STH obtained within a maximum-merge-delay (MMD) freshness threshold; deny stale or inconsistent chains (see §§ [0044A], [0055]).

Capability-token minting. Mint a scoped capability token cryptographically bound to the verified receipt (e.g., embedding a receipt identifier, scope, and expiry); refuse to mint when validation fails (see §§ [0060]-[0061]).

Fail-closed control. Deny the operation and withhold the capability token upon any freshness, replay, attestation, recompute, or proof-verification failure; optionally record the denial to a verifiable log (see §§ [0048A], [0054]).

B. Variants and High-Assurance Profiles

Dual-anchor non-collusion. In some embodiments the CRM causes anchoring to two or more independent publicly verifiable logs and fails closed if (i) inclusion proofs disagree on the committed leaf or (ii) any log's consistency proof fails within respective MMD thresholds (see § [0044B]).

Recompute guard. In some embodiments, the CRM stores instructions to recompute the canonical output digest given {AIC, inputs, determinism_salt, code_measurement}; a mismatch is treated as replay/tamper and triggers fail-closed behavior (see § [0048A]). A verifier MAY record the recomputation status in the digitally signed verification transcript as an approved-service indicator (see §§ [0100A], [0127A]; Appendix A [A045], [A047]).

OS/browser prompt binding. In some embodiments, capability-token minting requires a trusted prompt bound to a platform passkey in a secure element; a prompt-attestation bit is recorded in provenance, and receipts lacking such attestation MAY be rejected in high-assurance modes (see §§ [0058A]-[0058B]).

C. Packaging, Distribution, and Updates

Packaging and distribution. The CRM may be distributed as a library/SDK, enclave image, container layer, kernel module, or application package. A packaging manifest (e.g., SBOM, build metadata) MAY embed or reference the code_measurement recorded in the ReceiptCore. Deterministic builds are preferred so independent parties can reproduce the code measurement.

Update policy. Updates SHALL preserve canonicalization and ReceiptCore semantics. A material change to the trusted boundary, policy engine, or canonicalization rules yields a new boundary measurement; validators MAY reject receipts whose measurements fail configured policy.

D. Privacy and Industrial Applicability

Privacy minimization. Unless expressly needed, raw inputs/outputs SHOULD be redacted from persistent artifacts; receipts persist digests and proofs sufficient for independent verification, thereby reducing exposure of sensitive data.

Industrial applicability and access (non-limiting). The CRM enables interoperable verification, traceable settlement, and outcome-based ranking across cloud services, OS/browser ecosystems, regulated finance/healthcare, and safety-critical automation. Deployments MAY adopt FRAND licensing for log/verifier interoperability and royalty-free terms for public-interest use (e.g., safety/health, low-income regions). These business arrangements are illustrative only and do not limit claim scope.

CLAIM CONSTRUCTION AND INTERPRETATION

General. Headings and figure captions are for convenience only and do not limit the claims. Examples are illustrative and non-limiting; where a conflict exists, the claims control.

Inclusive language. As used in the claims and this specification, "comprise," "include," and variants mean inclusive ("including but not limited to"). "Or" is inclusive unless otherwise stated. The singular includes the plural and vice versa unless context dictates otherwise.

Ranges and approximations. Numerical ranges include endpoints and intermediate values. A range disclosed with exemplary values also supports sub-ranges and "about" those values unless precision is explicitly required by policy or algorithm selection.

Order of operations. Unless a particular order is expressly required, steps/method operations need not occur in the order stated, and additional, fewer, or parallel steps may be performed within the scope of the claims.

Functional language. Terms such as "configured to," "operative to," "adapted to," and "cause(s)" denote functional capabilities and do not require a particular mechanism unless expressly recited. Software and/or hardware may satisfy such functionality.

Processor, memory, and media. A "processor" may include one or more processors or processing cores, local or distributed. "Memory" or "computer-readable medium" refers to non-transitory storage unless expressly stated otherwise; signals per se are excluded (see § [0194]).

Means-plus-function. No claim element is intended to invoke 35 U.S.C. § 112(f)(means-plus-function) unless the explicit phrase "means for" (or "step for") is used. Terms such as engine, module, controller, gateway, verifier, wallet denote software and/or hardware logic executed by one or more processors (see glossary/Appendix A).

Protocol literals and brands. References to particular protocols, encodings, standards, vendors, or ciphers are illustrative and non-limiting; substantially equivalent mechanisms that provide comparable attestation, canonicalization, proof verification, or cryptographic strength are within scope.

Groupings and lists. Phrases like "at least one of A, B, and C" encompass any selection of one or more of the listed items, including any combination thereof.

Stored structures and identifiers. Identifiers (e.g., AIC IDs, receipt IDs, STH IDs, relying-party IDs) MAY be implemented as hashes/digests, UUIDs, or other unique tokens; unless a specific format is claimed, any unique representation suffices.

Equivalents. The invention covers all structural and functional equivalents of the elements and operations described herein, as well as combinations and sub-combinations thereof, that achieve substantially the same technical effect.

Ordinal terms. Ordinal terms such as "first," "second," etc. are used to distinguish like elements and do not require any particular order, priority, or number unless expressly stated.

"Consists essentially of." Where the phrase "consists essentially of" is used (e.g., in connection with ReceiptCore), it permits the presence of additional elements or steps that do not materially affect the basic and novel characteristics of the recited subject matter.

"And/or" and "based on." The phrase "and/or" means A, B, or both. The phrase "based on" means based at least in part on, unless context clearly indicates otherwise.

No disclaimer. Unless expressly stated, no statement in this specification is intended to disclaim scope; headings and examples are illustrative and non-limiting, and no admission regarding prior art is made.

APPENDICES

Appendix A—Definitions and Nomenclature

[A001] Interpretation & Reserved Words. Definitions in this Appendix are non-limiting and clarify, not narrow, claim scope. Unless the context dictates otherwise, the singular includes the plural and vice versa. Normative terms MUST, MUST NOT, SHOULD, SHOULD NOT, MAY are used as defined in RFC 2119 and RFC 8174.

[A001A] § 112(f) Non-Invocation. Terms such as "engine," "module," "controller," and "gateway" denote software and/or hardware logic executed by one or more processors; no element is intended to invoke 35 U.S.C. § 112(f) absent the explicit phrase "means for" or "step for."

[A001B] FRAND (for context only; non-limiting). "FRAND" means fair, reasonable, and non-discriminatory licensing terms. Any mention of FRAND herein is business guidance only and does not limit the claims or define required license terms.

[A002] Cryptographic Notation.
H(x) denotes a cryptographic hash/digest function (e.g., SHA-256, SHA-512/256, BLAKE3). Sig_k(m) denotes a digital signature over message m under private key k.
Enc_k(m)/Dec_k (c) denote encryption/decryption.
A hybrid signature is a tuple of classical (e.g., Ed25519, ECDSA P-256) and post-quantum (e.g., CRYSTALS-Dilithium-2/-3, Falcon-512) signatures over the same message. Encodings are hex or base64url unless otherwise specified.

[A003] Atomic Intent Contract (AIC). A machine-readable artifact that encodes: (i) actor/principal identifier; (ii) permitted operation(s) and resource scope; (iii) machine-enforceable policy (constraints, caps, locales, safety predicates, time windows); (iv) compensation/settlement terms; (v) expiry/TTL; and (vi) dispute rules. An AIC MAY be serialized as JSON, CBOR, Protobuf, or equivalent and is signed by the actor and/or counterparty.

[A004] Policy; Policy VM; Policy Digest. "Policy" denotes constraints compiled to bytecode or an FSM executed by a Policy VM inside a trusted boundary to enforce data minimization, budgets, locality, safety, allow-lists, and timing. A Policy Digest is a canonical digest of the compiled policy representation (and MAY include parameters) used in receipts and verification.

[A005] Trusted Compute Boundary (TCB). A hardware-anchored or verifiably deterministic execution environment capable of producing attestation evidence (e.g., Intel SGX/TDX, AMD SEV-SNP, ARM TrustZone), a hardware security module (HSM), or an audited deterministic sandbox with external attestors and authenticated logging.

[A006] Remote Attestation; Boundary Measurement. A cryptographic assertion (quote/report) that a specific binary/configuration executed on a specific platform at a time. Boundary Measurement refers to code/configuration digests in the attestation (e.g., SGX MRENCLAVE/MRSIGNER; SEV-SNP measurement) and MAY include vendor/model/firmware and PCR-style values.

[A007] Deterministic Audited Sandbox; determinism_salt; code_measurement.
Where a deterministic audited sandbox is used, the runtime's outputs are reproducible given recorded parameters. determinism_salt is a recorded seed ensuring replayable determinism. code_measurement is a digest of the loaded binaries/configuration. Together with the AIC and canonicalized inputs, they enable reproducible computation of canonical I/O digests.

- Code Measurement (code_measurement)—a digest over the loaded binaries and configuration for the execution (e.g., enclave image or container bundle).
- Determinism Salt (determinism_salt)—a recorded, variable-length (≥128-bit) seed used as the sole admissible entropy for the run. The salt MAY be derived (e.g., via a KDF) from one or more of: boundary_measurement, a verifier-issued challenge nonce bound to a signed-head identifier (STH/SSH), aic_id, and/or input_digest; the chosen derivation SHOULD be recorded or referenced (see [A051]; §§ [0048]-[0048A]).
- Recomputation property—a run is reproducible iff (if and only if), given {AIC, canonicalized inputs, determinism_salt, code_measurement}, the canonical output_digest recomputes identically. Any mismatch implies IO_DIGEST_MISMATCH and SHALL fail closed in high-assurance profiles (see [A077]; § [0048A]).
- Non-determinism capture rule—sources of non-determinism (e.g., wall clock, network, RNG) MUST either be included in canonical inputs (so they are covered by input_digest) or be derived solely from determinism_salt; otherwise they are disallowed for the run.
- Attestation linkage—the sandbox MUST record boundary_measurement and support attested presentation of code_measurement and determinism_salt provenance; optional build-time evidence MAY be furnished via a Measurement Attestation Certificate (MAC) (Appendix E [E070]).

Default profile. Derive determinism_salt via HKDF-SHA256 using both the boundary_measurement and an STH-bound challenge_nonce (IKM:=boundary_measurement||aic_id||input_digest; info:="drt:"||STH_id||challenge_nonce). See Appendix O [O010].

Notes (alignment). Terms with spaces in prose (e.g., "determinism salt") are equivalent to the underscored JSON field name determinism_salt used in schemas and transcripts. This section is normative for the deterministic-sandbox profile and does not alter the Minimal ReceiptCore semantics in § [0042A]; the claims control.

[A008] Canonicalization; ReceiptCore; Digests. Canonicalization produces a deterministic serialization of inputs/outputs—e.g., JCS(RFC 8785) for JSON, CBOR canonical encoding, or fixed-width binary encodings—prior to computing digests (e.g., SHA-256, SHA-512/256). ReceiptCore means the receipt excluding anchors, proofs, signatures, provenance, model/code identity digests (see [A110], Model Identity Digest, "MID"; MID is outside the Core per [A109]), and extensions; it is the object whose leaf commitment equals the digest of the canonical Minimal Receipt- Core used by the transparency-style log. Unless expressly stated otherwise, "ReceiptCore" as used herein refers to the Minimal ReceiptCore (the committed set defined in § [0042A] and claim 2); fields recorded outside the Core are referred to as Receipt Extensions.

[A009] PoPC Receipt; Identifiers. A Proof-of-Policy-Compliance (PoPC) receipt is a non-replayable, independently verifiable record binding AIC→policy digest→boundary measurement→canonical I/O digests→time/counters→participant signatures, optionally with ZK proofs and a public anchor. Receipt ID uniquely identifies a receipt; a Parent-Receipt Pointer links to the previous step in a pipeline; a Log-Anchor Pointer references the public anchor of the receipt.

[A010] Publicly Verifiable Append-Only Log; Anchor; Inclusion/Consistency Proofs; STH. A publicly verifiable append-only log (transparency-style or ledger) provides inclusion proofs (leaf-to-root paths) and consistency proofs (root-to-root) against a Signed Tree Head (STH). An Anchor includes the leaf commitment (digest of the canonical Minimal ReceiptCore), STH, log identifier, and proofs; multiple anchors MAY be used.

[A011] Receipt Corpus; Federation. The set of anchored receipts maintained locally or across organizations. Federation MAY use private-set-intersection (e.g., OPRF/DH-PSI) and/or homomorphic encryption (Paillier/CKKS) to compute aggregates while retaining attestation provenance.

[A012] OutcomeRank; Context Vector; Provenance Score; Freshness Decay; Proof-of-Contribution; Sybil/Self-Deal.

- OutcomeRank: a ranking signal computed from validated receipts, conditioned on a Context Vector (task, policy facets, domain/safety class, cost envelope).
- Provenance Score: weight derived from (i) attestation vendor/hardware diversity, (ii) key continuity over time, (iii) cross-party signature entropy (independence of signers).
- Freshness Decay: time-based down-weighting (e.g., exponential half-life).
- Proof-of-Contribution: a signed, minimal subset of receipts whose aggregate weight exceeds a configured fraction of the score, with anchors.
- Sybil/Self-Deal: adversarial patterns (fake identities or reciprocal pairs) discounted via provenance heuristics and graph analysis.

[A013] Capability Token (CPT); Scope Digest; TTL; Capability Gate; Connector Session ID. A short-lived, least-privilege token derived from a validated receipt that authorizes a follow-on operation. A Scope Digest commits to permitted parameters/resources; TTL bounds time; a Capability Gate verifies the token and policy bindings; a Connector Session ID binds authorization to a specific connector session. Tokens are typically single-use via nonces/monotonic counters.

[A014] Settlement Controller; Escrow; Revocation Window; Clawback. A Settlement Controller validates receipts/inclusion proofs and drives escrow. A Revocation Window is a programmable period after initial validation during which Clawback may be initiated upon attestation revocation, policy-contradiction, safety incident, or arbitration ruling.

[A015] Dispute Subsystem; Arbitration Quorum; Threshold Signatures. Independent entities form an Arbitration Quorum whose m-of-n threshold signatures (e.g., BLS, Ed25519 multisig) authorize settlement updates and/or log entries. Threshold parameters are domain-dependent.

[A016] Secure Element; Passkey; Key Continuity. A Secure Element (TPM 2.0, Secure Enclave, StrongBox) protects private keys and monotonic counters. A Passkey is a FIDO2/ WebAuthn credential bound to such elements. Key Continuity is cryptographic evidence that keys have remained stable/rotated under policy rather than being freshly minted for manipulation.

[A017] Post-Quantum (PQ) Cutover; Dual Signature; Cutover-T. A migration policy whereby receipts carry both classical and PQ signatures during a window, after which PQ presence is required (Cutover-T). Verifiers accept dual signatures before Cutover-T and MUST enforce PQ presence thereafter.

[A018] Monotonic Time; Counters. A monotonic time source (e.g., TPM clock or enclave counter) that never decreases. Receipts carry the trusted timestamp t_end as a numeric time64 and a monotonic counter to mitigate replay/rollback and support deterministic ordering. Human-readable RFC 3339 timestamps MAY appear only in transcripts or non-Core extensions; the Minimal ReceiptCore uses t_end (numeric time64).

[A019] Receipt Validity States. One of {INVALID, VALID (receipt and anchor verified), PENDING (awaiting anchor/settlement), REVOKED (invalid attestation or contradiction), DISPUTED (under arbitration), SETTLED (funds released), CLAWED_BACK}.

[A020] Egress Filter; Connector; OS/Browser Agent. A Connector mediates calls to external APIs/tools. An Egress Filter enforces policy (budget/locale/rate/safety/tool allowlists) and validates CPTs prior to network transmission. An OS/Browser Agent is an endpoint component presenting trusted consent prompts and injecting CPTs only upon verified consent.

[A021] Selective-Disclosure Proof; ZK Segment. A Selective-Disclosure Proof (e.g., Merkle inclusion or ZK membership) shows that a redacted audit view derives from committed receipt fields (policy digest, boundary measurement, timelines, signatures). A ZK Segment contains proofs that policy predicates (age, residency, budget, guardrails) were satisfied without revealing raw inputs.

[A022] Equivalents Clause. Any algorithm, protocol, data structure, or component performing substantially the same function in substantially the same way to achieve substantially the same result is an equivalent unless expressly excluded.

[A023] Abbreviations. CT=Certificate Transparency; STH=Signed Tree Head; SSH=Signed Set Head; SCP=Set Consistency Proof; MMD=Maximum-Merge Delay; PSI=Private Set Intersection; HE=Homomorphic Encryption; OPRF=Oblivious Pseudorandom Function; TCB = Trusted Compute Boundary; TEE=Trusted Execution Environment; HSM=Hardware Security Module; SE=Secure Element; CPT=Capability Token; FOP=Follow-On Privilege; MAV=Mint-After-Verify; OR=OutcomeRank; mTLS=mutual TLS; aTLS=Attested-TLS; SLO=Service Level Objective; SBOM=Software Bill of Materials; QE=Quoting Enclave; VCEK=Verified Chip Endorsement Key; SLM=Small Language Model; rtPRC=Real-Time PoPC Receipt; C_RC=Cryptographic commitment over the canonical Minimal ReceiptCore; ALB=Allow Latency Budget; CDT=Cadence Drift Threshold; RSC=Receipt Set Commitment; PoA=Proof of Aggregation; NCC=Non-Collusion Certificate; MAC=Measurement Attestation Certificate; RVT=Regulator-View Transcript; PVC=Provenance Certificate; RT=Revocation Transcript; CTx=Continuity Transcript; AAP=Anchor Admission Policy; HITL=Human-in-the-Loop; PID=Prompt-Injection Defense;

DRT=Deterministic Recompute Transcript; TCS=TimeConfidenceScore; CLM=Composable License Manifest; LCP=License Consumption Proof; LER=License Event Record; LBTC=License/Business Trust Controller; SEL=Sovereign Execution Ledger; $R^2$UA=Receipt-Referenced Unlearning & Attribution; UT=Unlearning Transcript; UC=Unlearning Certificate; AC=Attribution Certificate; IFC=Index-Forgetting Certificate; BIC=Bounded-Impact Certificate.

[A024] Formal Receipt Tuple & Validity. A receipt is the tuple R:=(receipt_id, aic_id, policy_digest, boundary_measurement, input_digest, output_digest, t_start, t_end, monotonic_counter, nonce, session_id, anchor, signatures, zk_proofs?, provenance?). Validity requires: (i) VerifySignatures(R.signatures, ReceiptCore(R))=true; (ii) VerifyAnchor(R.anchor, ReceiptCore(R))=true; (iii) VerifyAttestation (R.boundary_measurement)=true with non-revoked status during the revocation window; (iv) policy_digest=H(Compile (policy)); (v) canonicalization determinism: input_digest=H(Canon (inputs)), output_digest=H(Canon (outputs)); (vi) uniqueness: (nonce, session_id) unseen for the (log_id, aic_id) namespace; (vii) optional VerifyZK (R.zk_proofs)=true.

[A025] Security Invariants (MUST hold).

I1 Policy-Bound Execution. Only operations enforced by the Policy VM MUST yield receipts whose policy_digest matches the compiled policy used at runtime.

I2 Attestation-Gated Secrets. Secrets MUST be provisioned only if remote attestation verifies; the boundary_measurement MUST bind to the same runtime that executed the operation.

I3 Replay Immunity. For a given (aic_id, log_id), (nonce, session_id) MUST be unique; monotonic_counter MUST increase per wallet or device key.

I4 Determinism. For identical (AIC, inputs, determinism_salt, code_measurement) the resulting output_digest MUST be identical.

I5 Anchor Audibility. Inclusion proofs MUST verify against a valid STH with Maximum-Merge Delay (MMD) not exceeding the configured policy.

I6 Capability Minimization. Every CPT's scope MUST be a strict subset of the AIC scope; CPTs MUST include TTL and scope digest; connectors MUST verify both.

I7 Privacy Preservation. ZK proofs, if present, MUST be sound and zero-knowledge w.r.t. the asserted predicates; selective-disclosure views MUST correspond to committed receipt fields.

[A026] Conformance Profiles.

P1 Cloud Enclave. REQUIRED: SGX/TDX/SEV-SNP quote or report; attestation endorsements; anchor within 5 min grace; CPT single-use; escrow integration.

P2 OS/Browser Wallet. REQUIRED: device attestation (TPM/SE); passkey-gated consent UI; network guard enforcing CPTs; device-bound counter.

P3 Robotic rtPRC. REQUIRED: cycle counter k; jitter bounds; fieldbus guard; local edge anchor with eventual sync.

[A027] Attestation Profiles (Minimum Fields).

- Intel SGX/TDX: MRENCLAVE, MRSIGNER, QE cert chain, TCB level.
- AMD SEV-SNP: measurement, VCEK, platform certificate chain, TCB level.
- ARM TrustZone: TEE OS UUID/version, secure-world hash/cert.
- HSM: module serial, firmware version, slot attestation cert.
- ARM CCA(RME): realm attestation token fields (implementation-specific), platform/vendor identity, TCB level.
- AWS Nitro Enclaves: attestation document (PCR-like measurements and public-key binding) with a platform certificate chain.

Named profiles are illustrative and non-limiting; substantially equivalent attestation artifacts and fields are acceptable.

[A028] Transparency Log Properties. Append-only Merkle tree with signed STHs; MMD default ≤1 hour (policy-configurable 5 min-24 h). VerifyAnchor computes the leaf from ReceiptCore and checks inclusion path and STH signature; consistency proofs are verified on STH updates. Consistency proofs MUST be validated when advancing from an older STH to a newer STH; continuity records may reference the STH chain to document freshness adherence.

[A028A] Authenticated data structures for append-only logs include Merkle trees, RSA accumulators, and vector-commitment schemes; any equivalent structure that publishes a signed commitment (e.g., an STH) and supports publicly verifiable inclusion and append-only proofs is contemplated. Functionally equivalent zero-knowledge anchored proofs (e.g., STARK/SNARK-based anchor attestations) are contemplated when satisfying the freshness and consistency predicates in §§ [0044]-[0044E].

[A029] Schema Constraints & Sizes. Receipt payload targets: 1-3 KB (no ZK), 3-12 KB (with ZK); field encodings: hex/base64url; receipt_id collision MUST NOT occur within a log; canonicalization MUST specify algorithm+ params in io_canon.

[A030] Error Taxonomy(Representative). The following identifiers are stable, uppercase strings intended for interop in codes [ ] across receipts, transcripts, certificates, and evidence bundles. Codes are normative; HTTP mappings are illustrative.

- E001 INVALID_ANCHOR—anchor or inclusion proof invalid
- E002 POLICY_MISMATCH—compiled/enforced policy mismatch
- E003 ATTESTATION_REVOKED—attestation key or TCB revoked/banned
- E004 NONCE_REUSE—nonce reuse detected
- E005 SESSION_REUSE—session_id reuse detected
- E006 COUNTER_ROLLBACK—monotonic counter rollback/stall
- E007 CPT_SCOPE_MISMATCH—capability scope mismatch
- E008 TTL_EXPIRED—token or proof expired
- E009 ZK_INVALID—zero—knowledge proof invalid
- E010 SIGNATURE_INVALID—signature invalid
- E011 INSUFFICIENT_THRESHOLD—quorum/threshold not met
- E012 DUPLICATE_RECEIPT_ID—duplicate receipt_id within namespace
- E013 STALE_STH—STH older than MMD
- E014 DUAL_ANCHOR_NONCOLLUSION—dual—anchor non-collusion check failed
- E015 IO_DIGEST_MISMATCH—recompute/output digest mismatch
- E016 SCHEMA_INVALID—schema/field validation failure
- E017 CLOCK_SKEW—time skew beyond tolerance
- E018 AUDIENCE_MISMATCH—audience/RPID mismatch E019 PQ_REQUIRED—post-quantum signature required by policy E020 ANCHOR_NOT_FOUND—anchor missing E021 TIME_CONFIDENCE_LOW—Tri-Source trusted-time confidence below Tt (see [A112] REG-01/TCS)

E022 CONTINUITY_MISSING—required continuity proof(s) absent/invalid (see [A074])

E023 NCC_MISSING—Non-Collusion Certificate missing/invalid (dual-anchor profile)

E024 ALB_EXCEEDED—allow-latency budget exceeded, i.e., t_act-t_val>ALB (see [A078])

E025 CDT_EXCEEDED—cadence_delta>CDT per device profile (see [A056])

E026 CONSENT_WITHDRAWAL_ANCHORED—consent withdrawal anchored during the revocation window (see [E100]/[E110])

E027 UNLEARNING_REQUIRED—unlearning required (certificate pending)

E028 UNLEARNING_PROOF_INVALID—unlearning certificate invalid

E029 ATTRIBUTION_MISMATCH—attribution evidence mismatch

E030 CPT_MISSING—capability token absent where required

E031 CONSENT_MISSING—required consent or prompt-attestation not present

E032 POA_INVALID-proof of aggregation invalid or unverifiable

HTTP mapping (suggested only). 400 (policy/ZK invalid) ·401/403 (auth/consent)·408/422 (E024/E025)·409 (nonce/session reuse)·412 (counter rollback; E021/E022)·424 (anchor/attestation failure)·428 (E030)·499+ (client cancel)·5xx (log/unexpected). †Non-standard.

[A031] Receipt Lifecycle State Machine.

States: PENDING→VALID→SETTLED or DISPUTED; VALID→REVOKED within window; DISPUTED→SETTLED or CLAWED_BACK; ANY→INVALID (terminal on verification failure).

Transitions are triggered by anchor arrival, validation success, revocation signals, arbitration decisions. All transitions SHOULD be idempotent via (receipt_id, transition_id).

[A032] Provenance Score(Reference).

Let w_p=vendor/hardware diversity factor; w_k=key-continuity factor; w_e=cross-party signature entropy; normalize each to [0,1]. Define Prov(R)=$\alpha \cdot$w_p+$\beta \cdot$w_k+$\gamma \cdot$w_e, with $\alpha+\beta+\gamma=1$ and domain-specific defaults (e.g., $\alpha=0.4$, $\beta=0.3$, $\gamma=0.3$). Apply clipping to [w_min, 1.0].

[A033] OutcomeRank(Reference Math). For subject service S, context C, window W: OR(S,C,W)=(Σ_i w_i·y_i)/(Σ_i w_i) where each receipt i satisfies: Valid(R_i)/\Sim(Context (R_i), C)≥τ.

y_i∈{0,1} (success label); w_i=Prov(R_i). Fresh(Δt_i)·Div (R_i)·Rep(R_i) with Fresh(Δt)=exp(−λ·Δt) and diversity/reputation factors in [0,1]. Confidence bounds via Wilson or Agresti-Coull; sample floor k_min to prevent overfitting.

Deployments MAY apply additional multiplicative factors ϕ_ind, ϕ_div, ϕ_rpp, ϕ_age ∈[0,1] for independence, diversity floors, reciprocal-pair penalty, and affiliate-graph exclusions, respectively; factors are profile-defined and illustrative.

[A034] Policy Grammar (EBNF, Sketch).

Policy ::=Rule {";" Rule}

Rule ::=Predicate|Budget|Locale|Safety|ToolAllow|Time Window

Budget ::="budget_usd_max" "=" Number|"rate_per_min" "=" Number

Locale ::="region" "IN" "{"Region {"," Region}"}"

Safety ::="safety_filters" "INCLUDE" "{"Filter {"," Filter}"}"

ToolAllow ::="allow_tools" "IN" "{"Tool {"," Tool}"}"

Time Window ::="time_window" "IN" Interval

Compilation yields bytecode and policy_digest=H (bytecode||params).

[A035] ZK Claim Types (Non-Limiting). Range proofs (budget caps), set-membership (region/jurisdiction), Boolean circuits (guardrail conformance), cardinality constraints (rate caps). Each proof MUST bind to policy_digest and, where relevant, to ReceiptCore.

[A035A] Illustrative ZK claims for interop include BIO_ORIGIN_MEMBER, LICENSE_TIER_MEMBER, and QUORUM_DECISION. Each MUST bind to policy_digest and, where relevant, to the ReceiptCore commitment. Labels are illustrative and non-limiting.

[A036] Privacy Budgets (Optional). When differentially private analytics are used, ε, δ MAY be published per corpus and applied to OutcomeRank aggregates; receipts SHOULD NOT contain per-user DP noise parameters.

[A037] Registries & Namespaces.

Algorithm identifiers (e.g., sha-256, ed25519, dilithium2), attestation vendors (intel-sgx, amd-sev-snp), and log identifiers (ct: example.org) SHOULD be drawn from a deployment registry with versioning and deprecation rules.

[A038] Trusted Time Sources. Acceptable sources include TPM clock, TEE monotonic counters, and OS monotonic clocks authenticated via the TEE; wall-clock MUST be paired with a monotonic source.

[A039] Key Continuity Evidence. Receipts MAY embed rolling key digests or certificate chains; verifiers compute continuity as H (K_t||K_{t−1}|| . . . ) or via notary timestamps; discontinuities reduce provenance.

[A040] Interop Test Vectors (Pointers). A minimal suite should include: (i) JSON AIC; (ii) canonicalized input sample+digest; (iii) sample PoPC receipt (no ZK) and with ZK; (iv) inclusion proof and STH; (v) failing cases for E004/E006/E010. Test vectors MAY be published in a public repo and referenced by log ID.

[A041] Maximum-Merge Delay (MMD). A policy-configurable freshness threshold for transparency-style logs; validators MUST reject inclusion proofs that reference an STH older than the MMD relative to the operation's end time (see Freshness Policy [A054]).

[A042] Continuity Record. A signed record that links successive STHs via validated consistency proofs to document freshness adherence over time for a receipt set or transcript.

[A043] Platform-Authenticator Assertion; Prompt-Attestation. An assertion (e.g., WebAuthn/passkey-class) produced by a platform-resident authenticator and verified inside a TEE/HSM; prompt-attestation denotes a provenance bit that the trusted UI/consent prompt was presented and confirmed.

[A044] Audience-Bound Token; Relying-Party Identifier (RPID). A capability token that encodes a relying-party identifier for a destination service and is bound to (i) a digest of the Minimal ReceiptCore and (ii) the token scope; the verifier binds RPID confirmation into the signed verification transcript.

[A044A] Attested-TLS (aTLS). A mutually authenticated transport in which a client or device certificate is cryptographically bound to a trusted compute boundary (boundary measurement) so that session acceptance (and resumption) is contingent on the attested measurement; used as an optional transport profile alongside mTLS. (Illustrative; non-limiting.)

[A045] Approved-Service Indicator. An unambiguous indicator (e.g., return code or transcript flag) that a cryptographic or verification service executed in approved mode; indicators are included in verification/settlement transcripts for audit.

[A046] Real-Time PoPC Receipt (rtPRC). A compact receipt variant for hard real-time controllers that records cycle-accurate timing, jitter bounds, and envelope bits under fixed-width encodings.

[A047] Verification Transcript; Settlement Transcript. Verification transcript: a digitally signed record identifying the receipt_id(s) verified, the STH/SSH identifier(s), and any continuity record used; settlement transcript: a digitally signed record of release/clawback disposition and supporting artifacts (e.g., arbitration signatures). Verification transcripts MAY include DRT (recompute) status per [A116] and TimeConfidenceScore (TCS) per [A112]. (Illustrative; non-limiting.)

[A048] Dual-Anchor Profile; Non-Collusion Check. A validation profile requiring anchors to at least two independent logs; the verifier MUST deny when anchors disagree on the committed leaf or when a consistency proof fails for either STH chain within MMD.

[A049] Conformance Certificate; Conformance Policy. A Conformance Certificate is a digitally signed artifact attesting that a deployment satisfied a conformance policy comprising ReceiptCore integrity, STH inclusion and consistency under MMD, and, where applicable, continuity, dual-anchor, recompute, and approved-service indicators. A Conformance Policy names the required checks (e.g., Core, Pro) and freshness parameters. (Certificates/transcripts may be anchored to a publicly verifiable log for audit.)

[A050] Cryptographic Commitment over the Canonical Minimal ReceiptCore (C_RC).
A digest value computed from the canonical Minimal ReceiptCore; used as the leaf commitment in a transparency-style log and as the binding for capability tokens, audience-binding, and platform-authenticator assertions. (Shorthand: C_RC.)

[A051] Challenge Nonce (STH-Bound).
A verifier-issued nonce bound to an STH identifier and optionally incorporated into determinism_salt so that recomputation is uniquely keyed to the verified context.

[A052] Conformance Status.
Certificate status E {PASS, FAIL, REVOKED}; independent of receipt validity states in [A019].

[A053] Privacy-Preserving Certificate (Optional).
A conformance certificate whose contents commit to proof results without revealing raw inputs or confidential policy predicates; may be accompanied by zero-knowledge and/or selective-disclosure proofs.

[A054] Freshness Policy.
A parameter set that includes MMD thresholds and any continuity/dual-anchor requirements used during verification/certification.

[A055] RUN_PERMIT(Run-Permit Latch). A fail-closed actuation interlock that is 1 (allow) only while receipt/certificate validation predicates hold and is 0 (deny) on boot and on any predicate failure or timeout.

[A056] Cadence Drift Threshold (CDT); cadence_delta. With timestamps {t_req, t_val, t_act}, define s1:=t_val-t_req, s2:=t_act-t_val, and cadence_delta:=|s1−s2|. A validation profile specifies CDT; devices/verifiers SHALL deny when cadence_delta>CDT.

[A057] Actuation Transcript. A digitally signed record of device-side allow/deny decisions containing at least: receipt_version, log_commit_id, STH/SSH identifiers (and continuity if present), anti-replay tag, device audience id, operation code, and RFC 3339 timestamps for {request, validation, actuation}.

[A058] Hazard Class. A policy label mapping an operation to specific budgets (MMD, CDT, latency) that tighten deny thresholds for safety-critical actuation.

[A059] Quarantine Mode. A device state entered after denial in which further actuation is suppressed until a fresh validation event succeeds; a quarantine transcript SHOULD include a relevant error code (see [A030]) and STH reference.

[A060] Oracle Attestation. A third-party signed statement committing to a receipt_id and outcome label; may be anchored for audit.

[A061] Outcome Event. A machine-verifiable label or tuple (e.g., delivered( ), charged( ), reconciled( ) referenced by settlement.

[A062] Conflict Certificate. A signed artifact noting receipt-commitment disagreement or missing consistency proof among independent logs; may be anchored.

[A063] Aggregate Transcript. A signed record of context-windowed metrics derived from validated receipts under a named method (PSI/HE), optionally anchored.

[A064] Non-Collusion Certificate (NCC).
A digitally signed artifact stating that anchors from two or more independent logs agree on the ReceiptCore commitment and that required consistency proofs were validated under the configured freshness (MMD); may be anchored for audit.

[A065] Receipt Set Commitment(RSC).
A cryptographic commitment (e.g., Merkle/accumulator/vector-commitment root) to a set of receipt identifiers used for an aggregate or report; may be included in aggregate or ranking transcripts to enable independent verification.

[A066] Proof of Aggregation (PoA).
A proof that a published aggregate (e.g., counts/ratios) is derived from the committed receipt set under a named aggregation method (e.g., PSI/OPRF/HE) and window; may bind to RSC, freshness policy, and continuity.

[A067] Measurement Attestation Certificate (MAC). A digitally signed statement committing to a code_measurement and build manifest; may be anchored.

[A068] Build Manifest (SBOM). A machine-readable list of components and metadata referenced by MAC.

[A069] Regulator-View Transcript(RVT). A signed redaction+proof artifact, optionally anchorable.

[A070] Provenance Certificate (PVC). A signed artifact that commits to a provenance score, policy, window; optionally anchorable.

[A071] Score Policy. Identifies the feature set and parameters applied during provenance computation.

[A072] Policy Bytecode. Deterministic compiled form of a policy executed inside the boundary; digested as policy_digest.

[A073] RevocationTranscript (RT). A signed record of revocation status for a receipt during the revocation window; optionally anchorable.

[A074] ContinuityTranscript (CTx). A signed record linking successive STHs via validated consistency proofs; optionally anchorable.

[A075] Evidence Bundle (EB).
A signed or unsigned container that packages the minimal artifacts required to independently verify a receipt or corpus claim (e.g., RECEIPT, ANCHOR, CONSISTENCY, VERI- FICATION_TRANSCRIPT, SETTLEMENT_TRANSCRIPT, CONFORMANCE_CERTIFICATE, ORACLE_ATTESTATION, NONCOLLUSION_CERT/CONFLICT_CERT, AGGREGATE_TRANSCRIPT, RSC, PoA), conforming to Appendix H.

[A076] Conformance Badge (illustrative). A non-technical label (e.g., "CCP-Core", "CCP-Pro") indicating that a deployment satisfied a named conformance policy based on signed verification transcripts/certificates; badges are illustrative and do not limit the claims.

[A077] Recompute Guard. A validation control in which the verifier (or device) recomputes input_digest and/or output_digest from canonicalized inputs/outputs under the attested code_measurement and confirms equality with the ReceiptCore digests given {AIC, inputs, determinism_salt, code_measurement}. Failure transitions the decision to DENY and, for devices, sets RUN_PERMIT:=0. (Illustrative; non-limiting.)

[A078] Allow Latency Budget (ALB). A policy parameter specifying the maximum permitted time between validation success and actuation (e.g., $t\_act - t\_val \leq ALB$). Devices/verifiers MUST deny when ALB is exceeded; for higher Hazard Classes, ALB is tightened. (Illustrative; non-limiting.)

[A079] Anti-Replay Tag. A tag bound to at least {receipt_id, monotonic_counter, key_id of device/wallet} (and optionally session_id) used to detect replay within the namespace. Verifiers MUST reject allow/settlement attempts that present a previously seen Anti-Replay Tag. (Illustrative; non-limiting.)

[A080] Similarity Function & Threshold (Sim, t). Sim (Context(R_i), C)$\in$[0,1] denotes a normalized similarity between a receipt's context and the scoring context C. A receipt participates in OR (S, C, W) only if Sim$\geq\tau$, where $\tau\in(0,1]$ is policy- or domain-configured. (Reference math; non-limiting.)

[A081] Diversity Factor (Div(R)). A weight in [0,1] increasing with heterogeneity of attestation vendors/hardware, geographic regions, counterparties, and logs for the contributing receipt/corpus, with caps to prevent gaming. (Reference math; non-limiting.)

[A082] Reputation Factor(Rep(R)). A weight in [0,1] derived from long-run performance, dispute/chargeback rate, arbitration outcomes, and revocation history associated with keys/services contributing to R; defaults MAY be domain-configured and decline on adverse events.(Reference math; non-limiting.)

[A083] Minimum Weight & Freshness Rate (w_min, $\lambda$). w_min $\in[0,1)$ is a floor applied to provenance components to avoid zeroing; $\lambda>0$ is the exponential decay rate for $Fresh(\Delta t)=\exp(-\lambda\cdot\Delta t)$ with units inverse to $\Delta t$ (e.g., 1/hour). (Reference math; non-limiting.)

[A084] Namespace. A collision domain for uniqueness checks; unless stated otherwise, (log_id, aic_id) defines the namespace for (nonce, session_id) uniqueness and receipt_id deduplication. (Illustrative; non-limiting.)

[A085] Log Commit ID. An identifier for the anchor context used in verification/settlement/actuation transcripts to pin proofs to a specific signed tree head (STH) or signed set head (SSH). It MAY be represented as STH_id/SSH_id per [A114] or as the tuple {log_id, root_hash, tree_size, timestamp}. (Illustrative; non-limiting.)

[A086] Grace Window (Anchor Freshness). A policy parameter allowing short anchor-arrival slack (e.g., ≤5 minutes) after operation end time before marking a receipt PENDING or STALE; superseded by stricter MMD where applicable. (Illustrative; non-limiting.)

[A087] Audience Identifier(RPID/Device). A stable identifier (relying-party identifier or device audience id). When used with audience-bound tokens, the verifier MUST record the confirmed audience in the signed verification transcript. (Illustrative; non-limiting.)

[A088] PromptDigest (optional). A digest over the trusted consent surface (prompt text and UI metadata) captured by the platform-authenticator flow and recorded outside the ReceiptCore. Verifiers MAY require PromptDigest presence for high-assurance profiles; raw UI is not stored. (Illustrative; non-limiting.)

[A089] Anchor Admission Policy (AAP). A policy describing admission SLA, retry/backoff, and fallback anchors. Implementations SHOULD (i) queue commitments with idempotent tokens, (ii) fail-closed for minting while allowing settlement HOLD, and (iii) attempt a secondary anchor per [A048] when primary admission exceeds AAP.SLA. (Illustrative; non-limiting.)

[A090] Continuity Gossip (optional). Verifiers MAY exchange signed STH/consistency tuples with peers and anchor periodic gossip summaries; conflicts trigger issuance of a Conflict Certificate per [A062]. (Illustrative; non-limiting.)

[A091] Terminology Equivalence. As used herein, Capability Token (CPT) is an umbrella term for any follow-on authorization artifact, including without limitation session tokens, macaroons, assertions, ephemeral credentials, and delegated authorization tickets. Likewise, Receipt Anchor/Anchor denotes any act that records the Minimal ReceiptCore commitment into a publicly verifiable structure for independent validation. (Illustrative; non-limiting.)

[A092] Follow-On Privilege (FOP). FOP means any follow-on authorization that becomes available only after validation (e.g., token, session, streaming grant, resource entitlement). Mint-After-Verify (MAV) applies equally to all FOP issuance/activation, not only CPT minting. (Illustrative; non-limiting.)

[A093] Signed Set Head (SSH). A generalized form of a Signed Tree Head (STH) for append-only authenticated data structures beyond Merkle trees, including accumulators and vector-commitments. An SSH is a signed commitment over the set state at an epoch/size. (Illustrative; non-limiting.)

[A094] Set Consistency Proof (SCP). A generalized append-only consistency proof between two SSHs. Merkle consistency proofs and accumulator/vector-commitment append-only proofs are instances of SCP. (Illustrative; non-limiting.)

[A095] Anchor (Generalized). Anchoring means recording the Minimal ReceiptCore commitment (C_RC) into any SSH-issuing, publicly verifiable ADS (e.g., Merkle log, accumulator, vector-commitment log, public chain), together with inclusion proof(s) and, upon advance, SCP for append-only verification. (Illustrative; non-limiting.)

[A096] Follow-On Gate. Connectors, networks, OS/browser agents, and device latches SHOULD treat any FOP path as subject to MAV, MMD freshness, (optionally) dual-anchor non-collusion, and recompute guard; high-assurance profiles SHALL enforce these gates and MUST fail-closed on violation. (Illustrative; non-limiting.)

[A096A] Safety-latch FOP (actuation). For actuation, FOP tokens SHALL encode a hazard class and a short expiry T_s; device latches MUST require a fresh, locality-bound verifier transcript before motion or dose.

[A097] Independence Constraint (IC). Receipts used for ranking SHOULD exhibit signer independence; weight is down-weighted or excluded when cross-party signature entropy falls below a threshold $\tau_e$ (e.g., repeated reciprocal pairs or shared custody). High-assurance profiles SHALL enforce $\tau_e$. (Illustrative; non-limiting.)

[A098] Counterparty Diversity Floor (CDF). OutcomeRank SHOULD require at least m distinct counterparties and h distinct attestation vendors/hardware across the contributing receipt set for a context window; below this floor, weights are clipped or excluded. High-assurance profiles SHALL enforce CDF. (Illustrative; non-limiting.)

[A099] Reciprocal-Pair Penalty(RPP). Mutual-reinforcement patterns (A↔B) and dense cliques are penalized via a factor in [0,1]; repeated reciprocal paths beyond δ occurrences within window W SHOULD be excluded. High-assurance profiles SHALL exclude them. (Illustrative; non-limiting.)

[A100] Affiliate Graph Exclusion (AGE). Receipts from declared affiliates (economic linkage/ownership attestations) within a context window MAY be capped or excluded to prevent self-deal laundering. Privacy-preserving declarations are permitted. (Illustrative; non-limiting.)

[A101] Outcome Oracle Level (OOL). For monetary or high-value outcomes, acceptance MAY require an oracle attestation whose anchor references the same receipt_id and outcome label; absence lowers weight or holds settlement. (Illustrative; non-limiting.)

[A102] Challenge Transcript (CTx-Chal). Verifiers MAY issue randomized recompute challenges (nonce-bound) and anchor challenge transcripts; missing/failed challenges reduce reputation or invalidate the batch. (Illustrative; non-limiting.)

[A103] Confidence & Diversity Floors (k_min, d_min). Ranking SHOULD enforce a sample floor k_min and a diversity floor d_min (distinct counterparties) per context; below floors, only provisional scores MAY be shown or excluded. High-assurance profiles SHALL enforce floors. (Illustrative; non-limiting.)

[A104] Human-in-the-Loop Flag (HITL)—provenance bit that says human approval was required before mint.

[A105] Prompt-Injection Defense (PID) Profile-policy profile for input sanitization/allow-listed tool calls; on fail→POLICY_MISMATCH→no mint.

[A106] Red-Team Transcript(RTT)—signed summary of adversarial tests; MAY be anchored.

[A107] Mint-After-Verify (MAV).

A mandatory fail-closed gating rule: no Follow-On Privilege (FOP)—including capability tokens, session enablement, settlement release, or device RUN_PERMIT—may be issued or activated unless all of the following verify:

(1) receipt_id==anchor.commitment (commitment over the canonical Minimal ReceiptCore, C_RC);

(2) a valid inclusion proof to a Signed Tree Head (STH/SSH) that is fresh within MMD; and (3) upon STH/SSH advance, a valid append-only consistency proof (SCP).

On any failure, the FOP is denied/held (fail-closed). Policy MAY additionally require dual-anchor non-collusion. See §§ [0044]-[0044B], [0055], [0061]-[0061C], [0131].

[A108] Profile REG-01(Regulated-Mode; finance/safety). Verifiers and connectors operating under REG-01 MUST:

require dual-anchor inclusion proofs . . . (per §§ [0044B], [0044D]);

record a ContinuityTranscript (CTx) and deny on any missing/invalid consistency proof during the revocation window (see § [0055A], Appendix A [A074]);

set MMD≤3600 s (or stricter);

enable Tri-Source Trusted Time with threshold T. (see § [0053A]);

enable recompute guard when determinism metadata is present (§ [0048A]);

enforce PQ cutover on/after "Cutover T" (§ [0057]).

[A109] Receipt Extensions (clarified).

"Receipt Extensions" are fields recorded outside the Minimal ReceiptCore and therefore do not affect the canonical commitment C_RC. Examples include: code_measurement, determinism_salt, io_canon, t_start, a readable RFC 3339 wall-clock mirror of trusted_timestamp, nonce, session_id, parent_receipt_id, prompt_digest, model_identity_digest, provenance, and extensions (TLV). Extensions MAY be persisted for audit/UX but SHALL NOT alter the Minimal ReceiptCore or its commitment.

[A110] Model Identity Digest (MID).

A digest over model weights and/or code segments (and optional metadata/version) used during execution. MID is recorded outside the Minimal ReceiptCore for provenance and reproducibility and MAY be referenced by verification or ranking transcripts; absence of MID does not affect receipt validity.

[A111] Key Identifier (key_id).

A stable fingerprint of a signing or attestation key (e.g., certificate hash or JWK thumbprint) used in receipts, transcripts, and Anti-Replay Tags. key_id participates in key-continuity checks and MAY be rotated per policy with continuity evidence per [A039].

[A112] TimeConfidenceScore (TCS) & Tri-Source Trusted Time.

TCS ∈[0,1] aggregates concordance from three sources: (i) an attested monotonic clock/counter within the trusted boundary; (ii) an external signed time-oracle transcript (e.g., Roughtime/NTP with signatures); and (iii) the anchor context (C_RC under a fresh STH/SSH within MMD). Deployments MAY require TCS≥$\tau_1$; REG-01 SHALL require it (see § [0053A] and [A107]). Transcript/non-Core timestamps SHOULD be RFC-3339 with explicit UTC offsets; the Minimal ReceiptCore uses the numeric time64 value t_end (see § [0042A]).

[A113] Receipt Schema Version.

A small unsigned integer carried in the version field of the receipt object denoting the wire-format/schema version. Versioning is registry-tracked per [A037]; changes that would alter Minimal ReceiptCore semantics MUST advance the major schema.

[A114] STH/SSH Identifier (STH_id/SSH_id).

A canonical identifier for a log epoch, consisting of at least {log_id, root_hash, tree_size, timestamp}. Verification and settlement transcripts SHOULD include the identifier(s); Log Commit ID [A085] MAY embed STH_id/SSH_id.

[A115] Audience Bindings (device vs. RPID).

"Audience" means either a device audience id (for actuation latches) or a relying-party identifier (RPID) (for network/services). Audience confirmation MUST be recorded in the signed verification transcript when audience-bound tokens are used. (See also [A044], [A087], and §§ [0061A]-[0061B].)

[A116] Deterministic Recompute Transcript (DRT).

A signed verification artifact that records the result of a recompute guard ({AIC, canonicalized inputs, determinism_salt, code_measurement}→output_digest) for a receipt set. A failing DRT implies IO_DIGEST_MISMATCH and SHALL transition to DENY in high-assurance profiles.

[A117] Human-in-the-Loop Required (hitl_required). A boolean indicator that a high-risk profile mandated human approval for the verified operation; recorded in verification transcripts when applicable.

[A118] Prompt-Injection Defense Active (pid_active). A boolean indicator that a prompt-injection defense profile was active during the verified operation; recorded in verification transcripts when applicable.

[A119] Bounded-Impact Certificate (BIC).
A digitally signed training-lifecycle certificate attesting that a model's impact from a designated data subset is bounded per a declared policy. A BIC is outside the Minimal ReceiptCore; it is accepted as oracle-style evidence only when its commitment is transparency-anchored and verifiable under the same freshness (MMD) and continuity predicates as receipts (see [A041], [A042]). (Illustrative; non-limiting.)

[A120] Index-Forgetting Certificate (IFC).
A digitally signed certificate attesting that specific indices (e.g., training examples or ranges) have been unlearned/erased to a stated guarantee. An IFC is outside the Minimal ReceiptCore; it is treated as oracle-style evidence only when transparency-anchored and verifiable under MMD and continuity (see [A041], [A042]). (Illustrative; non-limiting.)

[A121] PROMPTCAPS (Prompt Capability Capsule).
A signed or verified capsule summarizing the trusted-UI prompt context used to authorize an action. A capsule MAY include: (i) a prompt capsule hash PC_H over canonical prompt text+UI metadata; (ii) a PromptCaps Level (PC_LEVEL); (iii) RPID/audience; (iv) timestamps; and (v) a platform-authenticator assertion or device attestation. PROMPTCAPS artifacts MAY be bound to a C_RC (canonical Minimal ReceiptCore commitment) and/or a CPT scope. (Illustrative; non-limiting.)

[A122] PromptCaps Hash (PC_H).
A digest (bytes32 hex) over a canonical representation of the prompt capsule (JCS for JSON or canonical CBOR). PC_H binds the prompt capsule to receipts, CPTs, transcripts, or evidence bundles without exposing raw UI content.

[A123] PromptCaps Level (PC_LEVEL).
An assurance indicator for consent rigor. Examples (illustrative, not limiting):
PC0 none; PC1 OS-surfaced prompt confirmed; PC2 platform-authenticator (passkey) confirmation; PC3+PID (prompt-injection defense) active; PC4 dual-party/HITL co-approval. Profiles MAY define additional levels.

[A124] PromptCaps Attestation (PCA).
A digitally signed record asserting PC_H, PC_LEVEL, and (optionally) a platform-authenticator assertion bound to {C_RC, scope, RPID}. PCA MAY be anchored and referenced by receipts/transcripts. (Illustrative; non-limiting.)

[A125] PromptCaps Policy Hook.
A policy predicate requiring PC_LEVEL≥L and, where configured, a match between PC_H and a verifier-echoed value bound to {C_RC, scope, RPID}. Failure SHALL deny mint (MAV) in high-assurance profiles.

[A126] PromptCaps Reference (pc_ref).
A reference (digest/URI/UUID) to a PromptCaps Attestation carried in Receipt Extensions and/or transcripts; pc_ref is non-core and does not affect the Minimal ReceiptCore commitment.

[A127] PromptCaps Header (HTTP).
Recommended request/response headers carrying pc_ref and (optionally) PC_LEVEL for connector interop. Header names are advisory; equivalent metadata mechanisms are contemplated.

[A128] Non-limiting nature.
PROMPTCAPS artifacts, levels, and hashes are interop conveniences; functionally equivalent consent capsules fall within scope. Presence/absence of PROMPTCAPS does not alter ReceiptCore semantics.

[A129] Intent Portability Key (IPK). A digest over invariants/budgets/tests/CoI version (IntentCaps).

[A130] CoI (Contract-of-Intent): A negotiated, signed snapshot of the intent graph.

[A131] IntentCaps Transcript (ICT). A digitally signed transcript (see Appendix E [E112]) that links a PoPC receipt to an IntentCaps context (e.g., ic_ipk, coi_digest, optional air_digest) and reports linkage status. ICT is outside the Minimal ReceiptCore and is evidentiary only.

[A132] Attested Intent Receipt (AIR). An external, intent-stack artifact attesting to a contract-of-intent snapshot and lifecycle (plan/provider, budgets/tests/status). When referenced (e.g., by air_digest), AIR is linkage evidence outside the Minimal ReceiptCore; acceptance does not alter PoPC validity, which remains governed by Core→anchor→freshness→MAV.

[A133] Context Prior (prior_ref). Optional evidentiary reference (e.g., to a cohort or policy prior) used to initialize OutcomeRank weights. Recorded only in RankingTranscript metadata; it has no effect on ReceiptCore validity, anchoring, or verification.

[A134] FRAND (fair, reasonable, and non-discriminatory).
See A001B. Business-policy guidance; claim scope remains technical (Minimal ReceiptCore→anchor→freshness/consistency→MAV)

[A135] Defensive termination (licensing; illustrative).
A business term under which a license may terminate upon clearly prohibited uses (e.g., coercive surveillance, deceptive consent mimicry). Illustrative; does not affect claim scope or technical requirements.

[A136] Humanitarian royalty-free tier (illustrative).
A licensing posture offering royalty-free or concessional terms for bona fide public-interest deployments (e.g., safety/health). Illustrative; claims control.

[A137] view-permit latch. An illustrative Follow-On Privilege (FOP) at an OS/compositor boundary that gates overlay rendering; governed by Mint-After-Verify and freshness.

[A138] RPCT. Right-of-Publicity Consent Token; a privacy-preserving consent artifact (selective-disclosure/zero-knowledge capable) for faces/voices.

[A139] scene_digest. An illustrative canonical input binding (e.g., pose/time/depth/feature hash) used to anchor an overlay to captured reality via io_canon; remains outside the Minimal ReceiptCore.

[A140] Child Safety Profile (CSP01) (illustrative; non-limiting).
A deployment profile for child-facing contexts that optionally layers stricter predicates (e.g., age-mode, guardian co-signature, ad-frequency caps, content-class filters) onto the Mint-After-Verify rail; CSP01 governs Follow-On Privileges (e.g., view/act tokens) but is outside the Minimal ReceiptCore. (See Appendix M [M41].)

[A141] $R^2$UA—Receipt-Referenced Unlearning & Attribution.
"RUA" denotes a family of unlearning and attribution artifacts that reference PoPC receipts and are transparency-anchorable for audit. $R^2$UA artifacts are outside the Minimal ReceiptCore and are evidentiary only; they DO NOT alter receipt validity, the Core commitment, anchoring, freshness (MMD), or MAV gates.
Target-set commitment. $R^2$UA artifacts bind to a designated data subset via a set commitment (e.g., Merkle/accumulator root) target_set_commit∈bytes32 and MAY reference a Receipt Set Commitment(RSC) [A065].

Model identity binding. Pre/post model states bind via model_identity_digest (MID) [A110]; $R^2$UA artifacts SHOULD record mid_pre and mid_post (bytes32).

Proof hooks (optional). $R^2$UA MAY carry proof blobs and verifying-key references—e.g., selective-disclosure, ZK, or verifiable-compute proofs—without changing the Core.

Anchoring & freshness. When anchored, $R^2$UA artifacts follow the same publicly verifiable append-only log semantics (STH/SSH, inclusion/consistency, MMD) as receipts [A028], [A041], [A093]-[A095].

Oracle use (optional). When policy requires third-party confirmation, an oracle attestation [A060] may commit to the same target_set_commit and MID pair(s).

[A141A] $R^2$UA Unlearning Transcript (UT).

A digitally signed process log for a specific unlearning run that records at least: ut_id, target_set_commit, mid_pre, mid_post, t_start, t_end, and codes[ ] (Appendix A [A030]); optional proof_blob and vk_ref. An optional anchor MAY be included or referenced. (Illustrative shape; interop governed by Appendix H.)

[A141B] $R^2$UA Unlearning Certificate (UC).

A digitally signed statement that the designated indices (target_set_commit) have been unlearned/erased to a declared guarantee. A UC SHOULD reference mid_pre, mid_post, and any proof/verifier metadata. UC is an evidentiary artifact complementary to IFC/BIC and MAY be anchored; it remains outside the Minimal ReceiptCore.

[A141C] $R^2$UA Attribution Certificate (AC).

A digitally signed statement associating contribution records (e.g., DATA_CONTRIBUTION_RECORD items) with attribution weights or bounds for a model snapshot, binding to mid_post and optionally RSC/PoA [A065], [A066]. ACs MAY be anchored and are evidentiary only.

Relationships (clarified; claim-neutral).

$R^2$UA is an umbrella label coordinating the IFC (Index-Forgetting Certificate) [A120] and BIC (Bounded-Impact Certificate) [A119] concepts with unlearning/attribution artifacts; equivalently named mechanisms remain within scope [A022].

APPENDIX B—NORMATIVE SCHEMAS & API SKELETON

[B001] Scope & conformance. This appendix defines normative field sets and canonical bindings to facilitate interoperability. The JSON objects shown are illustrative outlines; the canonical wire schemas are provided in the JSON Schemas/OpenAPI in Appendix D/E. MUST/SHOULD/MAY are per RFC 2119/8174. Schemas are implementation guides and do not limit claim scope. Unless stated otherwise, encodings follow Appendix A (e.g., algorithm registries in [A037]).

[B002] Types & encoding conventions.

(a) bytes32: 32-byte value, encoded base64url or hex (lowercase, even length).

(b) time64: UNIX seconds (int64)+optional RFC 3339 UTC in a parallel field.

(c) uuid: RFC 4122 string (lowercase).

(d) alg identifiers: from the deployment registry ([A037], e.g., sha-256, ed25519, dilithium2).

(e) Proof objects: arrays of fixed members; order significant.

(f) CBOR: canonical encoding; JSON: stable key order per JCS(RFC 8785).

(g) Time representations. For the Minimal ReceiptCore, the trusted timestamp is the monotonic t_end value (§ [0042A]); external human-readable timestamps in RFC 3339 May be carried in transcripts or extensions. Only t_end participates in the Minimal ReceiptCore commitment.

B.1 AIC-Atomic Intent Contract (normative outline)

[B003] AIC (JSON).

```
{
  "version": 1,
  "aic_id": "bytes32",
  "actor_id": "uuid-or-did",
  "operations": ["op://service/verb", " . . . "],
  "scope": {"resources": [" . . . "], "params": { }},
  "policy": {"bytecode": "base64url", "grammar":
    "ebnf-ref", "params": { }},
  "compensation": {"currency": "USD", "terms": { }},
  "expiry_utc": "2025-12-31T23: 59:59Z",
  "dispute": {"arbitration": {"m": 3, "n": 5, "scheme":
    "bls12-381"}},
  "signatures": {"actor": "base64url", "counterparty":
    "base64url?"}
}
```

[B004] AIC constraints.

(1) aic_id MUST be unique within issuer namespace.

(2) policy.bytecode MUST compile to the Policy VM (see [A004]).

(3) expiry_utc MUST be RFC 3339 UTC.

(4) At least one party signature MUST be present.

(5) For CBOR, the map SHOULD use canonical keys; a compact CBOR profile MAY assign integer labels:{1: version, 2:aic_id, 3:actor_id, 4:operations, 5:scope, 6:policy, 7:compensation, 8:expiry_utc, 9:dispute, 10:signatures}.

B.2 Receipt—PoPC Receipt (normative outline)

[B005] Receipt (JSON).

```
{
  "version":1,
  "receipt_id": "bytes32",
  "aic_id": "bytes32",
  "policy_digest": "bytes32",
  "boundary_measurement": {
    "vendor": "intel-sgx|intel-tdx/amd-sev-snp|arm-
      tz|hsm|sandbox",
    "model": "string",
    "fw": "string",
    "tcb": "string",
    "quote": "base64url",
    "measurement": "bytes32"
  },
  "code_measurement": "bytes32",
  "determinism_salt": "bytes*", //≥128-bit recom-
    mended (see Appendix D—determinism & canoni-
    calization)
  "io_canon": {"alg": "jcs|cbor", "params": { }},
  "input_digest": "bytes32",
  "output_digest": "bytes32",
  "t_start": 1732147200,
  "t_end": 1732147205, //trusted_timestamp inside
    Minimal ReceiptCore
  "monotonic_counter": 123456,
  "nonce": "hex*", //lowercase hex, ≥128-bit (per
    Appendix D [D030])
  "session_id": "hex*". //lowercase hex (per Appendix D
    [D030])
  "parent_receipt_id": "bytes32?",
  "anchor": {
    "log_id": "string",
    "tree_head": "base64url",
    "commitment": "bytes32"
```

},
"inclusion_proof": [
{"sib":
"0123456789abcdef0123456789abcdef0123456789abcdef0123456789abcdef", "pos": "L"}
],
"signatures": {"engine": "base64url", "actor": "base64url?", "service": "base64url?"},
"pq_signatures": {"dilithium2": "base64url?"},
"zk_proofs": [{"type": "zk-range|zk-set|zk-boolean", "proof": "base64url"}],
"provenance": {"platform_attest": "base64url?", "prompt_attestation": true},
"model_identity_digest": "bytes32?",
"extensions": {
"pcrs": {"pcr0": "bytes32"}, //optional example of non-core evidence
"k": "bytes?"
}
}

Note. STH/SSH identification is conveyed by anchor.tree_head and echoed in VerificationTranscript.sth_id (Appendix E [E010]). inclusion proof is carried in the receipt; consistency proofs are obtained and validated during verification and may be conveyed in Anchor artifacts (Appendix D [D050]) or referenced by the transcript. Consistency is required when a newer STH/SSH is available within MMD (see § [0044A]).

[B006] ReceiptCore canonicalization.

(1) ReceiptCore MUST exclude anchor, inclusion_proof, signatures, pq_signatures, zk_proofs, provenance, model_identity_digest, and extensions (see [A008], [0042A]).

(2) receipt_id MUST equal H (canonical (Minimal ReceiptCore)) with H from [A002]; anchor.commitment MUST equal the same digest (leaf commitment).

(3) io_canon.alg MUST identify the canonicalization algorithm; params capture stable sort/normalization where applicable.

(4) t_end≥t_start; monotonic_counter MUST increase per wallet or device key ([A025] I3).

[B007] Anchors & proofs.

(1) anchor.log_id identifies a transparency-style publicly verifiable append-only log per [A028].

(2) STH signature MUST be valid; inclusion proofs MUST verify to anchor.tree_head; consistency proofs MUST verify on STH updates; MMD enforcement per [A041].

(3) Dual-anchor profile per [A048].

[B008] Recompute & invalidity. A verifier MAY recompute output_digest from {AIC, inputs, determinism_salt, code_measurement}; mismatch MUST mark INVALID and fail-closed (see [0048A], [A025] I4).

B.3 Verifier & Settlement API (representative)

[B009] Transport & security. HTTPS/TLS 1.3; mTLS between platform/verifier (with optional aTLS per [A044A]); content types: application/json (or application/cbor); Idempotency-Key header recommended for POSTs.

[B010] Endpoints(minimal skeleton).

1. POST/policy/compile→compile policy
   Request: {"policy_src":"string|ebnf", "params":{ }}
   Response: 201 {"policy_digest":"bytes32", "bytecode": "base64url"}
   Errors: 400 POLICY_INVALID.
2. POST/attest→submit/validate boundary evidence
   Request: {"quote":"base64url", "vendor":" . . . ", "model":" . . . ", "fw":" . . . ", "tcb":" . . . " }
   Response: 200 {"measurement":"bytes32", "endorsed": true}
   Errors: 424 (codes: ["E003 ATTESTATION_REVOKED" ]).
3. POST/exec→run/generate receipt (profile-specific)
   Request: {"aic_id":" . . . ", "inputs":{ . . . }, "connector": "op:// . . . " }
   Response: 201 {"receipt": { . . . Receipt . . . }}
   Errors: 403 POLICY_MISMATCH, 409 NONCE_REUSE.
4. POST/anchor→anchor receipt
   Request: {"receipt_id":"bytes32", "commitment": "bytes32" }
   Response: 201

{
"log_id": "string",
"commitment": "bytes32",
"tree_head": "base64url",
"inclusion_proof": ["hex32","hex32" ],
"consistency_proof": ["hex32","hex32" ]// optional
}

Errors: 424 (codes: ["E001 INVALID_ANCHOR","E020 ANCHOR_NOT_FOUND" ]).
5. POST/settle→release or claw back
   Request: {"receipt_id":"R", "action":"release|clawback", "evidence":{ }}
   Response: 200

{
"receipt_id": "hex64",
"disposition": "SETTLED |CLAWED_BACK|HOLD",
"settlement_tx":"base64url",
"codes": ["EOxx","EOyy" ]// optional; Appendix A [A030]
}

Errors: 409 DISPUTE_OPEN, 422 INSUFFICIENT_THRESHOLD.
6. POST/dispute→submit dispute/arbitration
   Request: {"receipt_id":"R", "evidence":"base64url" }
   Response: 202 {"status":"DISPUTED", "quorum":{"m": 3,"n":5}}
7. POST/rank/report→update/emit ranking
   Request: {"context":{ . . . }, "window":"P30D", "emit_explain": true}
   Response: 200 {"ranking":[{"service":"sl","score": 0.87}], "transcript":"base64url" }
8. GET/verify?receipt_id=→verify receipt
   Response: 200

{
"receipt_id": "0123456789abcdef . . . <64 hex total>",
"status":
"PENDING|VALID|REVOKED|DISPUTED|INVALID|SETTLED|CLAWED_BACK",
"codes": ["E001","E004" ],
"sth_id": {
"log_id": "ct:example.org",
"root_hash":
"aaaaaaaaaaaaaaaaaaaaaaaaaaaaaaaaaaaaaaaaaaaaaaaaaaaaaaaaaaaaaaa",
"tree_size": 12345,
"timestamp": "2025-08-14T12:34:56Z"
},
"continuity": {"from": " . . . ", "to": " . . . " }, // present if STH/SSH advanced
"transcript": "<base64url(VerificationTranscript JSON)>"// optional signed transcript
}

Errors:
   404 NOT_FOUND
   409 NONCE_REUSE

412 COUNTER_ROLLBACK|TIME_CONFIDENCE_LOW|CONTINUITY_MISSING

424 ANCHOR/ATTESTATION_FAILURE

Additional endpoints (see Appendix D [D061]): /transcript/anchor, /certify, /cert/anchor, /oracle/attest, /oracle/anchor, /coord/certify, /analytics/aggregate.

[B011] Error taxonomy (mapping). API MUST use the Appendix A [A030] codes in codes[ ] or error bodies—e.g., E013 STALE_STH, E021 TIME_CONFIDENCE_LOW, E022 CONTINUITY_MISSING, E023 NCC_MISSING, E024 ALB_EXCEEDED, E025 CDT_EXCEEDED. Suggested HTTP mappings follow [A030](e.g., 409 NONCE_REUSE, 412 COUNTER_ROLLBACK/TIME_CONFIDENCE_LOW/CONTINUITY_MISSING, 424 ANCHOR/ATTESTATION FAILURE).

[B012] Transcripts. Verification responses SHOULD include a signed verification transcript (receipt IDs, STHs, continuity), and settlement responses SHOULD include a signed settlement transcript (see [A047]).

B.4 Conformance Profiles & Test Vectors

[B013] Profiles. Minimal server behavior per [A026]:

P1 Cloud Enclave: /attest, /exec, /anchor, /verify, /settle REQUIRED; dual-anchor RECOMMENDED.

P2 OS/Browser Wallet: /exec (device-bound), /anchor, /verify; prompt-attestation flag RECOMMENDED ([A043]).

P3 Robotic rtPRC: compact receipt (rtPRC in [A046]), fixed-width canonicalization, cycle counters.

[B014] Test vectors (pointer). A minimal suite SHOULD include: (i) JSON AIC; (ii) canonicalized input sample+digest; (iii) PoPC receipt (no ZK) and with ZK; (iv) inclusion proof +STH; (v) failing cases for E004, E006, E010. Publication may follow [A040] with repository URL and log_id reference.

B.5 Filing Notes (non-limiting; not part of claimed invention)

[B015] Numbering. Ensure bracketed paragraph numbers are sequential at filing.

[B016] Figures. Supply FIGS. 1-18 with matching numerals and captions; each figure is referenced at least once in the Detailed Description.

[B017] Appendix packaging. Include this Appendix and schema/API examples in the application PDF(s); examples are illustrative and non-limiting.

[B018] Claim scope. Summaries and schemas herein do not limit the claims; functional claim language governs legal scope.

APPENDIX C—DISCLOSURE SUPPORT MAPPING LEDGER

[C001] Purpose (non-limiting). Identifies disclosure support for exemplary aspects andleter-presented claim language, including supporting paragraphs (spec), figures, and Appendix A terms.

[C002] Notation. "§ "=paragraph; "FIG"=figure; "Appendix A"=Appendix A entry. Core lexicon: ReceiptCore, STH, inclusion/consistency, MMD, mint-after-verify/fail-closed, dual-anchor, recompute, platform-authenticator assertion, audience-bound token, transcripts.

[C003] Numbering tolerance. If paragraph numbers are adjusted at filing, update indices [C090]-[C093] only; structure remains valid.

[C004] Single feature statement (for convenience only): the principal aspects described herein share or build upon (i) a Minimal ReceiptCore, (ii) public-log inclusion/consistency under MMD freshness, and (iii) Mint-After-Verify fail-closed gating, as mapped below.

C.1 Principal Aspects—Primary Support

[C010] System aspect—policy-compliant execution rail.

Trusted compute boundary; policy VM; execution engine→§§ [0087]-[0089], [0093]; Appendix A [A004]-[A006]→FIGS. 1 and 3.

Deterministic canonicalization & digests→§§ [0093]-[0094], [0043]→FIG. 3.

ReceiptCore (fields) & sealed-key signature→§§ [0089], [0093]-[0095], [0042A]→FIG. 3.

Anchor to PV log; STH; inclusion/consistency→§§ [0096], [0044]-[0044A]; Appendix A [A028]→FIGS. 4 and 13.

Freshness (MMD); continuity→§§ [0044A], [0055]-[0055A]; Appendix A [A041],[A042]→FIGS. 5 and 14.

Mint-after-verify; fail-closed→§§ [0091], [0100]-[0101], [0060]-[0061]; Appendix A [A107]→FIGS. 5 and 7-8.

[C011] Verifier/server aspect.

Validate inclusion/consistency under MMD; sign verification response→§§ [0098]-[0101], [0055A]; Appendix A [A028],[A041],[A047]→FIG. 5.

Verifier in TEE/HSM; sealed-key signature; include measurement→§ [0098]; Appendix A [A005]-[A006]→FIG. 5.

Batch/continuity/revocation freshness (where claimed)→§§ [0098]-[0101], [0044A], [0055A]→FIG. 5.

[C012] Settlement-controller aspect.

Escrow; revocation window; clawback; arbitration→§§ [0102]-[0105], [0054]; Appendix A [A014]-[A015]→FIGS. 6 and 14.

Dual-anchor release (if required)→§§ [0102], [0044B]→FIGS. 6-7.

Settlement transcript→§ [0104]; Appendix A [A047]→FIG. 6. [C013] OutcomeRank aspect.

Corpus; context vector; dedup; provenance weighting; freshness decay→§§ [0109]-[0111]; Appendix A [A012],[A033]→FIGS. 8-9.

Explainability & signed ranking transcript→§ [0111]; Appendix A [A047]→FIGS. 9 and 12.

C.2 System-Level Refinements

[C020] Minimal ReceiptCore profile—"consists essentially of" support.→§§ [0042A], [0093]-[0095]→FIG. 3.

[C021] Deterministic canonicalization & determinism_salt refinement.→§§ [0093]-[0094], [0043]; Appendix A [A007], [A051]; Appendix O [O010]→FIG. 3.

[C022] Audience-bound token refinement (RPID bound to ReceiptCore digest+scope).→§§ [0107], [0061A]-[0061B]; Appendix A [A044]→FIGS. 7-8.

[C023] Counter/timestamp/attestation freshness rejection refinement.→§§ [0049], [0053]-[0055], [0088]-[0089]→FIGS. 1-2 and 14.

[C024] Inclusion/freshness validation before mint.→§§ [0091], [0096], [0044A](fresh STH/SSH inclusion), [0044E](STH/SSH equivalence), [0061C]-[0061D](MAV gate); Appendix A [A041](MMD), [A107](MAV)→FIGS. 4-5, 7.

[C025] Consistency proof on advancement.→§§ [0096], [0044A](consistency on advance), [0044E](SSH/SCP equivalence), [0055A](continuity); Appendix A [A042](ContinuityTranscript)→FIGS. 4-5, 13.

[C026] Platform-authenticator assertion bound to ReceiptCore digest+scope.→§§ [0058A]-[0058B], [0101]; Appendix A [A043]→FIGS. 5 and 11.

[C027] ZK segment in receipt (confidential policy predicates).→§§ [0112]-[0113], [0030]; Appendix A [A021]→FIGS. 10-11.

[C028] Additional system-level refinements (e.g., determinism/context hooks).→see §§ [0093]-[0095].

[C029] Model-identity digest outside ReceiptCore.→§ [0095]→FIG. 3.

[C030] Confidential policy ZK-gated mint (zero-knowledge inside boundary).→§§ [0112]-[0113], [0101]; Appendix A [A021]→FIGS. 10-11.

C.3 Verifier/Server Refinements

[C031] Batch verification endpoint.→§ [0098](API exposure); Appendix D [D061](OpenAPI).

[C032] STH rotation/key-roll; publish continuity record.→§§ [0100], [0055A]; Appendix A [A042],[A047] →FIG. 5.

[C033] Dual signatures (PQ+classical).→§§ [0057], [0100]; Appendix A [A017]→FIG. 5.

[C034] Revocation anchoring/API status return.→§§ [0102], [0049A], [0054]→FIGS. 6 and 14.

[C035] Freshness threshold enforcement (reject stale STH).→§§ [0098], [0044A]→FIGS. 5 and 14.

[C036] Verifier in TEE/HSM; sealed-key signature; include measurement.→§ [0098]; Appendix A [A005]-[A006]→FIG. 5.

C.4 Settlement Controller Refinements

[C040] Time-box/SLA (cancel/hold on timeout).→§ [0102](controller), § [0055] (cadence).

[C041] Counterparty bond; fail-closed retention.→§ [0102](policy signals), § [0054](window).

[C042] Threshold-signed arbitration; anchor award.→§ [0103]; Appendix A [A015],[A047]→FIGS. 6 and 14.

[C043] Two independent anchors required for release.→§§ [0102], [0044B]→FIGS. 6-7.

C.5 OutcomeRank Refinements

[C050] Confidence interval for score.→§ [0111]; Appendix A [A033].

[C051] Explainability payload (top contributors).→§ [0111]; Appendix A [A047]→FIGS. 9 and 12.

[C052] Provenance diversity constraint.→§§ [0109]-[0111]; Appendix A [A012].

[C053] Regulator-mode report flags (score/reversal thresholds).→§§ [0111]-[0113].

[C054] Anchoring ranking transcript.→§§ [0111](anchor option)+Appendix D [D061](/transcript/anchor)+Appendix E [E095](RankingTranscript with anchor)+Appendix A [A028](log properties)→FIGS. 9 & 13.

C.6 Appendix A Anchor Index (quick lookup)

[C060] Core terms→Appendix A [A004]-[A013](Policy VM, TCB, Attestation, Deterministic sandbox, Canonicalization, ReceiptCore, Receipt, PV log, Corpus, OutcomeRank, CPT, Settlement/Revocation/Clawback).

K-O pointers: Verifier API & continuity (K), device latch (L), conformance vectors (F, J), evidence bundles (H), regulator mode (H-bis), threat model (I), security hardening (M), $R^2$UA/DRT schemas (N/O).

[C061] Security invariants→Appendix A [A025]I1-I7.

[C062] Freshness & dual-anchor→Appendix A [A041], [A048].

[C063] Platform-auth & audience-binding→Appendix A [A043], [A044].

[C064] Transcripts→Appendix A [A047].

[C065] Error taxonomy→Appendix A [A030].

[C066] Registries, time, vectors→Appendix A [A037], [A038], [A040].

C.7 Figure Index (what each figure proves)

[C070] FIG. 1 System actors; mint-after-verify gate.

[C071] FIG. 2 Full method (S101-S112).

[C072] FIG. 3 ReceiptCore vs non-core; canonicalization.

[C073] FIG. 4 Anchoring; leaf=digest(Minimal ReceiptCore).

[C074] FIG. 5 Verifier checks; MMD; transcripts; recompute.

[C075] FIG. 6 Settlement; escrow; transcripts.

[C076] FIG. 7 Capability-token derivation and enforcement.

[C077] FIG. 8 Receipt corpus and OutcomeRank engine (context encoding; success frequencies; provenance weighting).

[C078] FIG. 9 Sybil/provenance; signed explainability.

[C079] FIG. 10 ZK variants; privacy.

[C080] FIG. 11 OS/browser wallet; platform-auth.

[C081] FIG. 12 Deployments (placements).

[C082] FIG. 13 Transparency log (STH/proofs).

[C083] FIG. 14 Dispute & arbitration; revocation window; threshold signatures.

[C084] FIG. 15 Federated indexing (privacy-preserving).

[C085] FIG. 16 CRM/CPP mapping (program-product).

[C086] FIG. 17 Device-side actuation latch (RUN_PERMIT): validate commitment to the Minimal ReceiptCore; verify STH inclusion and consistency within MMD; audience/scope binding; deny/allow timing windows.

[C087] FIG. 18 Protected self-test sequence: synthetic deny→allow and allow→deny transitions; denial/allow transcripts; cadence_delta and CDT checks; quarantine on failure.

C.8 Examiner Keys (crib)

[C090]§ 101 technical effects→§§ [0124]-[0137].

[C091] Mint-after-verify rule (token gating)→§§ [0091], [0131].

[C092]"ReceiptCore consists essentially of . . . "→§§ [0042A], [0093]-[0095]; FIG. 3.

[C093] Standards-agnostic posture→§§ [0003], [0012E]-[00121]; Appendix A [A022].

APPENDIX D—NORMATIVE SCHEMAS, PROTOCOLS, AND VERIFIER ALGORITHM

[D001] Purpose. This appendix provides machine-implementable specifications for: the Atomic Intent Contract (AIC), the Proof-of-Policy-Compliance (PoPC) Receipt, Capability Tokens (CPT), Receipt Log Anchors, and a minimal Verifier/Settlement API. It also defines canonicalization rules, a compact policy grammar, and a reference verifier algorithm. Schemas use JSON Schema 2020-12; equivalent encodings (CBOR/Protobuf) are contemplated. MUST/SHOULD/MAY follow RFC 2119/8174. Logs are "publicly verifiable append-only logs (transparency-style)."

D.A Canonicalization Rules (Normative)

[D010] Canonical JSON (JCS style). (a) UTF-8, NFC; (b) no insignificant whitespace; (c) object members sorted by Unicode code point; (d) integers serialized without leading zeros; (e) IEEE-754 numbers in minimal decimal form; (f) strings escaped per RFC 8259; (g) byte arrays as base64url (no padding).

[D011] Canonical CBOR (Deterministic). (a) Major-type rules per RFC 8949 § 4.2; (b) definite lengths; (c) map keys sorted by length then lexicographic; (d) preferred integer encodings; (e) byte strings hashed over raw bytes.

[D012] Digest inputs. For each field group (e.g., AIC, inputs, outputs), compute H(canonical(obj)) with the selected digest (best mode: SHA-256). Implementations MUST record canonicalization metadata in io_canon (see Appendix A [A008]).

D.B JSON Schemas (Normative)

All schemas set $schema to https://json-schema.org/draft/2020-12/schema (omitted below for brevity). Field names and types are normative. Hex digests are lowercase.

D.B.1 Atomic Intent Contract (AIC)

[D020] AIC (JSON Schema).

```
{
  "$id": "https://spec.popc.dev/schema/aic.json",
  "title": "Atomic Intent Contract",
  "type": "object",
  "required":
["version","aic_id","actor_id","operations","scope","policy","expiry_utc","signatures"],
  "properties": {
    "version": { "type": "integer", "minimum": 1, "default": 1 },
    "aic_id": { "type": "string", "pattern": "^[a-f0-9]{64}$" },
    "actor_id": { "type": "string", "minLength": 3, "description": "DID or wallet ID" },
    "operations": { "type": "array", "items": { "type": "string" }, "minItems": 1 },
    "scope": { "type": "object", "additionalProperties": true },
    "policy": {
      "type": "object",
      "required": ["digest","bytecode"],
      "properties": {
        "digest": { "type": "string", "pattern": "^[a-f0-9]{64}$" },
        "bytecode": { "type": "string", "contentEncoding": "base64url", "contentMediaType":
"application/cbor" },
        "grammar": { "type": "string" },
        "params": { "type": "object", "additionalProperties": true }
      },
      "additionalProperties": false
    },
    "compensation": { "type": "object", "additionalProperties": true },
    "dispute": { "type": "object", "additionalProperties": true },
    "expiry_utc": { "type": "string", "format": "date-time" },
    "signatures": {
      "type": "object",
      "properties": {
        "actor": { "type": "string", "contentEncoding": "base64url", "contentMediaType":
"application/cose" },
        "counterparty": { "type": "string", "contentEncoding": "base64url", "contentMediaType":
"application/cose" }
      },
      "minProperties": 1
    },
    "meta": { "type": "object", "additionalProperties": true }
  },
  "additionalProperties": false
}
```

[D021] Interoperability note. policy.params MAY carry intent-link fields such as ic_ipk and coi_digest (from an IntentCaps contract-of-intent) to aid downstream audit; these are optional and do not change the AIC policy digest semantics.

D.B.2 PoPC Receipt

[D030] Receipt (JSON Schema).

```
{
  "$schema": "https://json-schema.org/draft/2020-12/schema",
  "$id": "https://spec.popc.dev/schema/receipt.json",
  "title": "PoPC Receipt",
  "type": "object",
  "required": [
    "version","receipt_id","aic_id","policy_digest",
    "boundary_measurement","io_canon",
    "input_digest","output_digest",
    "t_start","t_end",
    "monotonic_counter","nonce",
    "anchor","inclusion_proof","signatures"
  ],
  "properties": {
    "version":      { "type": "integer", "minimum": 1, "default": 1 },
    "receipt_id":    { "type": "string", "pattern": "^[a-f0-9]{64}$" },
    "aic_id":        { "type": "string", "pattern": "^[a-f0-9]{64}$" },
    "policy_digest": { "type": "string", "pattern": "^[a-f0-9]{64}$" },
    "boundary_measurement": {
      "type": "object",
      "required": ["vendor","quote","tcb","measurement"],
      "properties": {
        "vendor":   { "type": "string", "enum": ["intel-sgx","intel-tdx","amd-sev-snp","arm-
tz","hsm","sandbox"] },
        "model":   { "type": "string" },
        "fw":   { "type": "string" },
```

```
          "tcb":   { "type": "string" },
          "quote":   { "type": "string", "contentEncoding": "base64url", "contentMediaType":
"application/cbor" },
          "measurement": { "type": "string", "pattern": "^[a-f0-9]{64}$" }
        },
        "additionalProperties": false
      },
      "alg": {
      "type": "object",
      "properties": {
      "hash": {
        "type": "string",
        "description": "e.g., sha-256, sha3-256; see Appendix A [A037]"
      },
      "sig": {
        "type": "string",
        "description": "e.g., ed25519, dilithium2; see Appendix A [A037]" }
      },
      "additionalProperties": false
      },
    "code_measurement": { "type": "string", "pattern": "^[a-f0-9]{64}$" },
    "determinism_salt": { "type": "string", "pattern": "^[a-f0-9]{32,}$" },
    "io_canon": {
      "type": "object",
      "required": ["alg"],
      "properties": {
        "alg": { "type": "string", "enum": ["jcs","cbor"] },
        "params": { "type": "object" }
      },
      "additionalProperties": false
    },
    "input_digest": { "type": "string", "pattern": "^[a-f0-9]{64}$" },
    "output_digest": { "type": "string", "pattern": "^[a-f0-9]{64}$" },
    "t_start": { "type": "integer", "minimum": 0 },
    "t_end": { "type": "integer", "minimum": 0 },
    "monotonic_counter": { "type": "integer", "minimum": 0 },
    "nonce":      { "type": "string", "pattern": "^[a-f0-9]{32,}$" },
    "session_id":   { "type": "string", "pattern": "^[a-f0-9]{16,}$" },
    "parent_receipt_id": { "type": "string", "pattern": "^[a-f0-9]{64}$" },
    "anchor": {
      "type": "object",
      "required": ["log_id","tree_head","commitment"],
      "properties": {
        "log_id":   { "type": "string" },
        "tree_head": { "type": "string", "contentEncoding": "base64url", "contentMediaType":
"application/cbor" },
        "commitment": { "type": "string", "pattern": "^[a-f0-9]{64}$" }
      },
      "additionalProperties": false
    },
    "inclusion_proof": {
      "type": "array",
      "items": {
        "type": "object",
        "required": ["sib","pos"],
        "properties": {
          "sib": { "type": "string", "pattern": "^[a-f0-9]{64}$" },
          "pos": { "type": "string", "enum": ["L","R"] }
        },
        "additionalProperties": false
      }
    },
    "signatures": {
      "type": "object",
      "required": ["engine"],
      "properties": {
        "engine": { "type": "string", "contentEncoding": "base64url", "contentMediaType":
"application/cose" },
        "actor": { "type", "string", "contentEncoding": "base64url", "contentMediaType":
"application/cose" },
        "service": { "type", "string", "contentEncoding": "base64url", "contentMediaType":
"application/cose" },
      },
      "additionalProperties": false
    },
    "pq_signatures": {
      "type": "object",
      "additionalProperties": {
        "type": "string",
```

-continued

```
        "contentEncoding": "base64url",
        "contentMediaType": "application/cose"
      }
    },
    "zk_proofs": {
      "type": "array",
      "items": {
        "type": "object",
        "required": ["type","proof"],
        "properties": {
          "type": { "type": "string" },
          "proof": { "type": "string", "contentEncoding": "base64url", "contentMediaType":
"application/cbor" },
          "vk_ref":{ "type": "string" }
        },
        "additionalProperties": false
      }
    },
    "provenance": {
      "type": "object",
      "properties": {
        "platform_attest": { "type": "string", "contentEncoding": "base64url",
"contentMediaType": "application/cbor" },
        "prompt_attestation": { "type": "boolean" }
      },
      "additionalProperties": true
    },
    "model_identity_digest": { "type": "string", "pattern": "^[a-f0-9]{64}$" },
    "extenstions": {
      "type": "object",
      "description": "Extenstions (non-core). Optional interop fields (e.g., sel_refs, sel_claims,
promptcaps_ref, promptcaps_hash, promptcaps_level) MAY be carried here; privacy-sensitive
material MUST appear only as salted digests, selective-disclosure payloads, or zero-knowledge
proofs. Extensions are non-core and do not affect the Minimal ReceiptCore commitment.",
        "additionalProperties": true
      }
    },
    "additionalProperties": false
}
```

[D031] ReceiptCore constraints (normative)

(1) Composition (Minimal ReceiptCore). The Minimal ReceiptCore consists essentially of {policy_digest, boundary_measurement, input_digest, output_digest, monotonic_counter, trusted_timestamp}, where trusted_timestamp:=t_end (numeric time64).

(2) Exclusions (non-Core). The following MUST NOT be part of the Minimal ReceiptCore: anchor, inclusion_proof, signatures (including any pq_signatures), zk_proofs, provenance, model_identity_digest, extensions, code_measurement, determinism_salt, io_canon, t_start, nonce, session_id, and parent_receipt_id.

(These fields MAY appear in the Receipt as extensions or metadata but are excluded from the Core commitment.)

(3) Canonicalization and commitment identity.

(a) The ReceiptCore MUST be serialized deterministically per Appendix D.A; the canonicalization algorithm and parameters MUST be recorded in io_canon (outside the Core).

(b) Commitment identity rule.

receipt_id=H(canonical(Minimal ReceiptCore)) and anchor.commitment=receipt_id.

A verifier MUST fail-closed if receipt_id anchor.commitment or if io_canon is missing/inconsistent with the canonicalization used to compute the commitment.

(4) Time and counters. t_end>t_start MUST hold, and monotonic_counter MUST strictly increase per wallet/device key (Appendix A [A025]I3). Violations MUST be treated as errors (e.g., E006 COUNTER_ROLLBACK).

(5) Algorithm agility. The digest suite MUST follow the deployment registry (default SHA-256); hex outputs MUST be lowercase. Use of ZK-friendly permutations for optional proofs MUST NOT change the Core commitment used for anchoring.

(6) Interop note (non-limiting; claim-neutral). Fields such as code_measurement, determinism_salt, io_canon, and alg are Receipt Extensions (outside the Minimal ReceiptCore). They remain optional at the schema level to preserve profile agility and are consistent with § [0042A]. Presence or absence of such extensions does not affect the Core commitment.

D.B.3 Capability Token (CPT)

[D040] CPT (JSON Schema).

```
{
  "$id": "https://spec.popc.dev/schema/cpt.json",
  "title": "Capability Token",
  "type": "object",
  "required":
["issuer","sub","scope_digest","ttl_utc","aic_id",
  "nonce", "policy_digest", "receipt_core_digest"," sig"
  ],
  "properties": {
    "issuer": {"type": "string" },
    "sub": {"type": "string" },
    "scope_digest": {"type": "string", "pattern": "^[a-f0-9]{64}$" },
    "ttl_utc": {"type": "string", "format": "date-time" },
    "aic_id": {"type": "string", "pattern": "^[a-f0-9]{64}$" },
    "receipt_id": {"type": "string", "pattern": "^[a-f0-9]{64}$" },
```

"nonce": {"type": "string", "pattern": "^[a-f0-9]{32,}$" },
"policy_digest": {"type": "string", "pattern": "^[a-f0-9]{64}$" },
"attest_measurement": {"type": "string", "pattern": "^[a-f0-9]{64}$" },
"pc_h": {"type": "string", "pattern": "^[a-f0-9]{64}$" },
"pc_level": {"type": "integer", "minimum": 0, "maximum": 9},
"rpid": {"type": "string", "description": "relying-party identifier (audience binding)" },
"receipt_core_digest":{"type": "string", "pattern": "^[a-f0-9]{64}$", "description": "binding to Minimal ReceiptCore digest" },
"sig": {"type": "string", "contentEncoding": "base64url", "contentMediaType": "application/cose" }
},
"additionalProperties": false
}

D.B.4 Receipt Log Anchor

[D050] Anchor (JSON Schema).

{
"$id": "https://spec.popc.dev/schema/anchor.json",
"title": "Receipt Log Anchor",
"type": "object",
"required": ["log_id","commitment","tree_head","inclusion_proof" ],
"properties": {
"log_id": {"type": "string" },
"commitment": {"type": "string", "pattern": "^[a-f0-9]{64}$" },
"tree_head": {"type": "string", "contentEncoding": "base64url", "contentMediaType": "application/cbor" },
"inclusion_proof": {"type": "array", "items": {"type": "string", "pattern": "^[a-f0-9]{64}$" }},
"consistency_proof": {"type": "array", "items": {"type": "string", "pattern": "^[a-f0-9]{64}$" }}
},
"additionalProperties": false
}

D.C Minimal Verifier & Settlement API (OpenAPI 3.1)

[D060] Transport & security. HTTPS/TLS 1.3; mTLS strongly recommended (optional aTLS per Appendix A [A044A]). Content-Type: application/json (or application/cbor). Clients SHOULD send Idempotency-Key on POST endpoints. API MUST use Appendix A [A030] codes in codes[ ]. Implementations SHALL deny or hold any Follow-On Privilege (FOP) until the conditions in Appendix A [A107] are satisfied.

[D061] OpenAPI (subset).

```
openapi: 3.1.0
jsonSchemaDialect: "https://json-schema.org/draft/2020-12/schema"
info:
  title: PoPC Verifier API
  version: "1.0.0"
```

```
paths:
  /verify:
    get:
      summary: Verify PoPC receipt by ID
      parameters:
        - in: query
          name: receipt_id
          required: true
          schema: { type: string, pattern: "^[a-f0-9]{64}$" }
      responses:
        "200":
          description: Verification result
          content:
            application/json:
              schema:
                type: object
                required: [receipt_id, status, codes]
                properties:
                  receipt_id: { type: string, pattern: "^[a-f0-9]{64}$" }
                  status:
                    type: string
          enum: [INVALID, VALID, PENDING, REVOKED, DISPUTED, SETTLED,
CLAWED_BACK]
        codes:
          type: array
          items: { type: string }
        sth_id:
          type: object
          required: [log_id, root_hash, tree_size, timestamp]
          properties:
            log_id: { type: string }
            root_hash: { type: string, pattern: "^[a-f0-9]{64}$" }
            tree_size: { type: integer, minimum: 0 }
            timestamp: { type: string, format: date-time }
          additionalProperties: false
        continuity:
          type: object
          properties:
            from: { type: string }
            to: { type: string }
          transcript: { type: string, contentEncoding: base64url, contentMediaType:
application/json }
        "404": { description: Receipt not found }
```

-continued

```
/anchor:
  post:
    summary: Anchor receipt leaf
    parameters:
      - in: header
        name: Idempotency-Key
        required: false
        schema: { type: string }
    requestBody:
      required: true
      content:
        application/json:
          schema:
            type: object
            required: [commitment]
            properties:
              commitment: { type: string, pattern: "^[a-f0-9]{64}$" }
    responses:
      "201":
        description: Anchor artifacts
        content:
          application/json:
            schema:
              $ref: "https://spec.popc.dev/schema/anchor.json"
      "424": { description: Anchor failure }
/settle:
  post:
    summary: Release or claw back
    parameters:
      - in: header
        name: Idempotency-Key
        required: false
        schema: { type: string }
    requestBody:
      required: true
      content:
        application/json:
          schema:
            type: object
            required: [receipt_id, action]
            properties:
              receipt_id: { type: string, pattern: "^[a-f0-9]{64}$" }
              action: { type: string, enum: [RELEASE, HOLD, CLAWBACK] }
  responses:
    "200":
      description: Settlement disposition
      content:
        application/json:
          schema:
          type: object
          required: [receipt_id, disposition]
          properties:
            receipt_id: { type: string, pattern: "^[a-f0-9]{64}$" }
            disposition: { type: string, enum: [SETTLED, CLAWED_BACK, HOLD] }
            settlement_tx: { type: string, contentEncoding: base64url }
            codes: { type: array, items: { type: string } }
    "409": { description: Dispute open / cannot settle }
/transcript/anchor:
  post:
    summary: Anchor verification transcript commitment
    description: >
      Commits a verification transcript (or its digest) to a publicly
      verifiable append-only log (transparency-style); mirrors /anchor behavior.
    parameters:
      - in: header
        name: Idempotency-Key
        required: false
        schema: { type: string }
    requestBody:
      required: true
      content:
        application/json:
          schema:
            type: object
            required: [commitment]
            properties:
              commitment: { type: string, pattern: "^[a-f0-9]{64}$" }
    responses:
      "201":
```

-continued

```
            description: Transcript anchor artifacts
            content:
              application/json:
                schema:
                  $ref: "https://spec.popc.dev/schema/anchor.json"
          "424": { description: Anchor failure }
  /certify:
    post:
      summary: Issue conformance certificate for one or more receipts
      parameters:
        - in: header
          name: Idempotency-Key
          required: false
          schema: { type: string }
      requestBody:
        required: true
        content:
          application/json:
            schema:
              type: object
              required: [receipt_ids, policy]
              properties:
                receipt_ids:
                  type: array
                  minItems: 1
                  items: { type: string, pattern: "^[a-f0-9]{64}$" }
                policy:
                  type: string
                  description: Conformance policy identifier
                  enum: [Core, Pro]
      responses:
        "201":
          description: Conformance certificate
          content:
            application/json:
              schema:
                $ref: "https://spec.popc.dev/schema/conformance-certificate.json"
        "400": { description: Invalid request }
        "424": { description: Certificate issuance failure }
  /cert/anchor:
    post:
      summary: Anchor conformance certificate commitment
      parameters:
        - in: header
          name: Idempotency-Key
          required: false
          schema: { type: string }
      requestBody:
        required: true
      content:
        application/json:
          schema:
            type: object
            required: [commitment]
            properties:
              commitment: { type: string, pattern: "^[a-f0-9]{64}$" }
    responses:
      "201":
        description: Certificate anchor artifacts
        content:
          application/json:
            schema:
              $ref: "https://spec.popc.dev/schema/anchor.json"
      "424": { description: Anchor failure }
  /oracle/attest:
    post:
      summary: Submit oracle attestation for a receipt outcome
      parameters:
        - in: header
          name: Idempotency-Key
          required: false
          schema: { type: string }
      requestBody:
        required: true
        content:
          application/json:
            schema:
              type: object
              required: [receipt_id, outcome, attestation_sig]
```

-continued

```
                properties:
                  receipt_id:   { type: string, pattern: "^[a-f0-9]{64}$" }
                  outcome:      { type: string, description: "Outcome label or tuple" }
                  attestation_sig: { type: string, contentEncoding: base64url, contentMediaType:
application/cose }
                  attester_id:   { type: string }
                  issued_utc:      { type: string, format: date-time }
      responses:
        "201":
          description: Oracle attestation accepted
          content:
            application/json:
              schema:
                $ref: "https://spec.popc.dev/schema/oracle-attestation.json"
  /oracle/anchor:
    post:
      summary: Anchor oracle attestation commitment
      parameters:
        - in: header
          name: Idempotency-Key
          required: false
          schema: { type: string }
      requestBody:
        required: true
        content:
          application/json:
            schema:
              type: object
              required: [commitment]
              properties:
                commitment: { type: string, pattern: "^[a-f0-9]{64}$" }
      responses:
        "201";
          description: Attestation anchor artifacts
          content:
            application/json:
              schema:
                $ref: "https://spec.popc.dev/schema/anchor.json"
        "424": { description: Anchor failure }
  /coord/certify:
    post:
      summary: Issue non-collusion or conflict certificate for anchors
      requestBody:
        required: true
        content:
          application/json:
            schema:
              type: object
              required: [receipt_core_commit, anchors]
              properties:
                receipt_core_commit: { type: string, pattern: "^[a-f0-9]{64}$" }
                anchors:
                  type: array
                  minItems: 2
                  items:
                    type: object
                    required: [log_id, sth_id, inclusion_proof]
                    properties:
                      log_id: { type: string }
                      sth_id: { type: string }
                      inclusion_proof:
                        type: array
                        items: { type: string, pattern: "^[a-f0-9]{64}$" }
      responses:
        "201":
          description: Non-collusion or conflict certificate
          content:
            application/json:
              schema:
                oneOf:
                  - $ref: "https://spec.popc.dev/schema/noncollusion-certificate.json"
                  - $ref: "https://spec.popc.dev/schema/conflict-certificate.json"
  /analytics/aggregate:
    post:
      summary: Produce a signed aggregate transcript over validated receipts
      requestBody:
        required: true
        content:
          application/json:
```

```
          schema:
            type: object
            required: [context, window, method]
            properties:
              context: { type: object, additionalProperties: true }
              window:
                type: object
                required: [start, end]
                properties:
                  start: { type: string, format: date-time }
                  end:   { type: string, format: date-time }
              method:
                type: object
                required: [id, version]
                properties:
                  id: { type: string, enum: ["PSI", "OPRF", "HE", "MIXED"] }
                  version: { type: string }
    responses:
      "201":
        description: Aggregate transcript
        content:
          application/json:
            schema:
              $ref: "https://spec.popc.dev/schema/aggregate-transcript.json"
/registry/mac:
  post:
    summary: Issue a measurement attestation certificate (MAC) for a code measurement
    description: >
      Verifies deterministic-build metadata and issues a digitally signed MAC
      committing to code_measurement and build manifest; illustrative and non-limiting.
    parameters:
      - in: header
        name: Idempotency-Key
        required: false
        schema: { type: string }
    requestBody:
      required: true
      content:
        application/json:
          schema:
            type: object
            required: [code_measurement, build_manifest_digest]
            properties:
              code_measurement:     { type: string, pattern: "^[a-f0-9]{64}$" }
              build_manifest_digest: { type: string, pattern: "^[a-f0-9]{64}$" }
              toolchain:       { type: string }
              boundary_measurement: { type: string, pattern: "^[a-f0-9]{64}$" }
    responses:
      "201":
        description: MAC issued
        content:
          application/json:
            schema:
              $ref: "https://spec.popc.dev/schema/measurement-certificate.json"
      "400": { description: Invalid request }
      "424": { description: MAC issuance failure }
  get:
    summary: Retrieve MAC by code measurement
    parameters:
      - in: query
        name: code_measurement
        required: true
        schema: { type: string, pattern: "^[a-f0-9]{64}$" }
    responses:
      "200":
        description: MAC
        content:
          application/json:
          schema:
            $ref: "https://spec.popc.dev/schema/measurement-certificate.json"
      "404": { description: MAC not found }
/rvt/issue:
  post:
    summary: Issue a regulator-view transcript (RVT) with selective-disclosure proof
    description: >
      Produces a signed RVT over a redacted audit view plus SD proof; optional anchor
      via /transcript/anchor; illustrative and non-limiting.
    parameters:
      - in: header
```

-continued

```
            name: Idempotency-Key
            required: false
            schema: { type: string }
        requestBody:
          required: true
          content:
            application/json:
              schema:
                type: object
                required: [receipt_id, redaction_profile, proof_type]
                properties:
                  receipt_id:   { type: string, pattern: "^[a-f0-9]{64}$" }
                  redaction_profile: { type: string }
                  proof_type:   { type: string, enum:
["MERKLE_SD","ZK_MEMBERSHIP","BOOLEAN_CIRCUIT"] }
        responses:
          "201":
            description: RVT issued
            content:
              application/json:
                schema:
                  $ref: "https://spec.popc.dev/schema/rvt.json"
  /pvc/issue:
    post:
        summary: Issue a provenance certificate (PVC)
        description: >
          Computes a provenance score under a named policy and issues a signed PVC; optional
          anchor via /cert/anchor; illustrative and non-limiting.
        parameters:
          - in: header
            name: Idempotency-Key
            required: false
            schema: { type: string }
        requestBody:
          required: true
          content:
            application/json:
              schema:
                type: object
                required: [subject_id, window, policy]
                properties:
                  subject_id: { type: string, description: "service or entity identifier" }
                  window:
                    type: object
                    required: [start, end]
                    properties:
                      start: { type: string, format: date-time }
                      end:   { type: string, format: date-time }
                  policy: { type: string, description: "provenance scoring policy id" }
          responses:
        "201":
          description: PVC issued
          content:
            application/json:
              schema:
                $ref: "https://spec.popc.dev/schema/provenance-certificate.json"
        "400": { description: Invalid request }
        "424": { description: PVC issuance failure }
```

[D061A] Note (consistency). INVALID is both an API status returned by/verify and an allowed lifecycle state per Appendix A [A019]. Deployments that do not persist INVALID MAY map it to an internal “rejected” bucket for storage, but the API MUST expose INVALID.

[D062] Error taxonomy. API MUST use Appendix A [A030] codes in codes[ ]; suggested HTTP mappings per [A030].

[D063] Transcripts. Verification responses SHOULD include a signed verification transcript (receipt IDs, STH/continuity). Settlement responses SHOULD include a signed settlement transcript (see Appendix A [A047]).

D.D Policy Grammar (EBNF—Minimal)

[D070] Grammar.

policy=“policy”, “{”, rule, {“;”, rule}, “1”

rule=budget|region|allow|deny|rate|timewin|guard;

budget=“budget_usd_max”, “=, number;

region=“region”, “IN”, “{”, ident, {“,”, ident}, “}”

allow=“allow_tools”, “IN”, “{”, ident, {“,”, ident}, “}”

deny=“deny_tools”, “IN”, “{”, ident, {“,”, ident}, “}”

rate=“rate_per_min”, “=, number;

timewin=“time_window”, “IN”, interval;

interval=isoDateTime, “..”, isoDateTime;

guard=“guard” “=” ident “(” param?”)”|“prompt-caps_level_min” “number;

param=ident, “=”, (number|string);

ident=letter, {letter|digit|“_”|“–” } number=digit, {digit};

string=“\”” {char, “\””

isoDateTime=“\””, YYYY-MM-DD “T” HH:MM:SS “Z”, “\””;

Compilation. Compiler emits bytecode for the Policy VM; policy_digest:=H(bytecode||stable_params) (see Appendix A [A004]).

D.E Reference Verifier Algorithm (Normative)

[D080] Inputs. Receipt R; AIC lookup GetAIC(aic_id); attestation revocation list ARL; transparency log TL; freshness policy MMD (see Appendix A [A041]).

Outputs. status E {PENDING, VALID, REVOKED, DISPUTED, INVALID, SETTLED, CLAWED_BACK}, codes[ ], settlement_hint.

[D081] Procedure.

1. Schema & bounds. Validate R against schema; ensure t_start≤t_end; io_canon.alg present. On failure→INVALID with code E016 SCHEMA_INVALID.
2. Policy bind. Retrieve A:=GetAIC(R.aic_id). Recompute policy digest from A.policy.bytecode/params; mismatch→INVALID with E002 POLICY_MISMATCH.
3. Attestation. Verify quote signature and endorsements; check measurement € ARL.revoked_measurements and quote key V ARL.revoked_keys. If revoked→REVOKED with E003 ATTESTATION_REVOKED; settlement_hint:=CLAWBACK.
4. Anchor (STH→inclusion→consistency→freshness). Verify STH/SSH signature under a public key associated with the log; verify inclusion of commitment==H (canonical(Minimal ReceiptCore)) to the STH/SSH; enforce consistency proofs when advancing STH/SSH; enforce MMD freshness relative to t_end. Fail→INVALID with E001 INVALID_ANCHOR or E013 STALE_STH.
5. Signatures. Verify signatures.engine over the ReceiptCore with a key bound to measurement. Optional actor/service if present. Fail→INVALID with E010 SIGNATURE_INVALID.
6. Uniqueness & replay. Enforce uniqueness of (nonce, session_id) within (log_id, aic_id); ensure strictly increasing monotonic_counter. Violation→INVALID with E004 NONCE_REUSE or E006 COUNTER_ROLLBACK.
7. Recompute guard (optional). If artifacts present, recompute canonical output_digest given {AIC, inputs, determinism_salt, code_measurement}; mismatch→INVALID with E015 IO_DIGEST_MISMATCH.
8. ZK proofs (optional). Verify each proof under vk_ref Fail→INVALID with E009 ZK_INVALID.
9. Dual-anchor (optional). If enabled, require agreement across≥2 logs; inconsistency→INVALID with E014 DUAL_ANCHOR_NONCOLLUSION.
10. Temporal window. If now—t_end<revocation_window(A), set settlement_hint:=HOLD, else RELEASE.
11. Outcome. If all checks pass→VALID with settlement_hint from step 10. When present, the verifier MAY include PC_H and PC_LEVEL in a PromptCaps Transcript (PCT) and/or the VerificationTranscript's approved_service (flags); absence does not affect receipt validity.
12. (Optional profile) Intent link. If receipt extensions include ic_ipk/coi_digest and an IntentCapsTranscript (ICT) is supplied, require consistency with the AIR referenced by air_digest. Mismatch→INVALID(policy_mismatch); omissions are permitted unless the deployment profile mandates intent linking.

[D082] Complexity. O(1) hashes/sigs, O(log N) inclusion proof (N=log size).

D.F Connector Verification (Gateway Behavior)

[D090] Required checks. A connector MUST require a CPT per request and verify: (i) issuer signature; (ii) ttl_utc≥now; (iii) scope_digest covers endpoint/params; (iv) known aic_id; (v) CPT nonce unused (per subject); (vi) if chaining required: presence of corresponding receipt anchor for the prior step; (vii) if audience-binding is enabled: RPID matches requested relying party and the token's receipt_core_digest binds to the Minimal ReceiptCore digest (see Appendix A [A044]); (viii) If promptcaps_level_min is active, verify promptcaps_level≥required_level and (where configured) that promptcaps_hash matches the verifier-echoed PC_H bound to {C_RC, scope, RPID}; otherwise deny mint/FOP.

D.G OutcomeRank Report (Minimal JSON Schema)

[D100] Rank report.

```
{
  "$id": "https://spec.popc.dev/schema/rank-report.json",
  "title": "OutcomeRank Batch Report",
  "type": "object",
  "required": ["window", "context","subjects"],
  "properties": {
    "window": {
      "type": "object",
      "required": ["start", "end"],
      "properties": {
        "start": { "type": "string", "format": "date-time" },
        "end": { "type": "string", "format": "date-time" }
      }
    },
    "context": { "type": "object", "additionalProperties": true },
    "subjects": {
      "type": "array",
      "items": {
        "type": "object",
        "required": ["id","receipts"],
        "properties": {
          "id": { "type": "string" },
          "receipts": { "type": "array", "items": { "type": "string",
  "pattern": "^[a-f0-9]{64}$" }, "minItems": 1 }
        }
      }
    }
  }
}
```

D.H Transport & Headers (Representative)

[D110] HTTP/3 example with CPT.

POST/v1/connector/search HTTP/3
Host: api.tool.example
Content-Type: application/json
POPC-CPT: <base64url(CPT)>
POPC-Anchor: 2b0d . . .
{"query": "flight BOS→SFO", "date": "2025-08-20" }

Connectors SHOULD return POPC-Receipt-Ref: <receipt_id>upon policy-guarded execution. mTLS recommended; Cache-Control: no-store for receipt/token material. Connectors SHOULD respond 428 Precondition Required with codes[ ] including E030 when a CPT is required but not presented.

[D111] Content negotiation. Servers SHOULD honor Accept: application/json or Accept: application/cbor for transcript payloads; default to JSON if unspecified. When CBOR is used, canonical CBOR MUST be used.

[D 112] Recommended headers (illustrative, non-limiting).

POPC-PromptCaps: base64url of a compact PROMPTCAPS descriptor or a digest reference (e.g., PC_H). Purpose: signal prompt-class expectations to the verifier/connectors. Binding: implementations MAY bind PC_H into ConsentReceipt, PCT (Appendix E [E115]), or Receipt extensions.

POPC-IntentCaps: base64url of compact INTENTCAPS descriptor or digest (IC_H). Purpose: carry intent-capability policy knobs for downstream gates. Binding: implementations MAY reflect IC_H in extensions and echo it in verification transcripts.

POPC-License-Ref: sha256:<clm_digest> or base64url of a compact CLM pointer. Purpose: let a caller hint the verifier/connector about a Composable License Manifest (CLM) binding for the operation; implementations MAY echo the digest in transcripts or include the referenced artifact in an EvidenceBundle.

[D113] POPC-IntentCaps (request). Purpose: signal an intent-bound call. Value: compact JSON (base64url) carrying {ic_ipk: hex, coi_digest?: hex}. Notes: advisory metadata for traceability; servers SHOULD echo the binding in a transcript and MAY enforce profile rules; sensitive fields MUST be digests.

[D114] POPC-AIR-Ref (response). Purpose: return a reference (digest or implementation id) to a companion Attested Intent Receipt (AIR) issued by the intent stack. Value: 32-byte lowercase hex (air_digest). Notes: the full AIR MAY be packaged in an EvidenceBundle on request.

D.I Interop & Versioning

[D120] Version fields. Artifacts MUST include version and (optionally) schema_version. Backward-incompatible changes MUST bump major.minor.

[D121] Algorithm identifiers. When non-default algorithms are used, receipts MUST enumerate alg: {hash: "sha3-256", sig: "dilithium2" }(see Appendix A [A037]).

[D122]$id stability. Schema $id URIs MUST be stable; breaking changes require a new $id and a schema_version bump.

[D123] Default suites. If alg is omitted, defaults are {hash:"sha-256", sig:"ed25519" } per Appendix A [A037].

D.J Conformance Levels

[D130] Level 1 (Anchored Receipts). Implements AIC, Receipt, signatures, log anchoring, /verify. CPT OPTIONAL.

[D131] Level 2 (Guarded Egress). Adds CPT issuance/validation, budget/region guards, monotonic counters.

[D132] Level 3 (Privacy Enhanced). Adds ZK predicates, regulator view export, federated OutcomeRank reporting.

D.K Canonicalization & Commitment Test Vectors (illustrative; claims control)

[D140] Purpose. These vectors make the commitment recipe (canonicalize→hash) trivially reproducible across toolchains. They are examples only; the Minimal ReceiptCore definition and the Commitment Identity Rule remain normative in § [0042A].

Hash suite. Unless otherwise negotiated by registry, examples use SHA-256 over exact bytes; hex shown in lowercase.

D.K.1 Deterministic JSON (JCS)—single-field sanity vector

Input JSON (UTF-8; no BOM; no trailing newline):

{"a":{"x":1, "y":2}, "b":"Z" }

Canonicalization. For this specific input, JCS (RFC 8785) yields the same string (already canonical).

Digest (SHA-256 over the exact UTF-8 bytes above):

46a208039988f637ce42d86f3c936defdd0ae7cd57e370e bff9b7020b3a48080

Notes (normative for this vector): altering whitespace, encoding, or appending a newline changes the digest.

D.K.2 Canonical CBOR (deterministic)—same structure

Logical value: {"a":{"x":1, "y":2}, "b":"Z" }

Deterministic CBOR bytes (hex):

a26161a2617801617902616261 5a

Digest (SHA-256):

f2cf5f2145954ald9dbalefd0287f934dafe23f6b31a4fd70 43312f00772e1c6

Notes. Definite lengths; map keys sorted by length then lexicographic (RFC 8949 § 4.2); text encoded UTF-8.

D.K.3 Length-Prefixed Binary (LPB)—minimal illustration

Recipe: 4-byte big-endian length N followed by the exact UTF-8 payload from D.K.1.

Bytes (hex):

0000001b7b2261223a7b2278223a312c2279223a327d2 c2262223a225a227d (where 0000001b is N=27 and the remainder is the JSON payload)

Digest (SHA-256):

226082838d85cbbd2aa977072cf33c7d4545425c080805 523ce33eeed74449c7

D.K.4 ReceiptCore commitment identity (normative rule, restated)

Trusted timestamp. trusted_timestamp:=t_end (time64) per § [0042A].

Commitment identity.

receipt_id=H(canonical(Minimal ReceiptCore) )

anchor.commitment=receipt_id

Verifier behavior. Fail-closed on mismatch or missing/inconsistent io_canon.

D.K.5 Implementation checklist (interop, not restrictive)

1. Select io_canon (JCS for JSON or canonical CBOR per § [0043]/[0043A]); record alg and params.
2. Serialize deterministically the Minimal ReceiptCore (§ [0042A]).
3. Hash with the registry suite (default SHA-256); output lowercase hex.
4. Set fields: receipt_id:=digest; anchor.commitment:=receipt_id.
5. Enforce freshness & consistency (validate inclusion to the STH/SSH and consistency on advance within MMD).
6. Emit a signed verification transcript with STH/SSH identifiers and continuity when validated (§ [0100]).

Equivalence & agility. References to STH/inclusion/consistency include their SSH/SCP equivalents; auxiliary ZK-friendly permutations (e.g., Poseidon) MAY be used only for optional proofs—anchors remain bound to the registry hash suite.

D.L Best-Mode Parameters (Digest/Nonce/Windows/Thresholds)

[D150] Hash. SHA-256 (default); SHA-512/256 alternative.

[D151] Signatures. Ed25519 (default); PQ hybrid (Ed25519+Dilithium2).

[D152] Nonces. ≥128-bit random; monotonic counters: 64-bit.

[D153] Revocation windows. Commerce 24-72 h; Finance/Health 7-30 d; IoT real-time 0-15 min.

[D154] Arbitration thresholds. 3-of-5 best mode; range 2-of-3 to 5-of-7.

[D155] Transparency log MMD. <1 h (policy configurable 5 min-24 h).

[D156] Receipt sizes. 1-3 KB (no ZK); 3-12 KB (with ZK).

[D157] OutcomeRank half-life. 7-60 days (domain dependent).

D.M Compliance Notes (Non-Limiting)

[D160] Determinism disclosures. Implementations SHOULD expose build reproducibility and policy-compilation inputs to aid audit.

[D161] Privacy budgets. ZK statements SHOULD avoid over-unique linking values; regulator views MUST NOT leak raw PII unless compelled and logged.

[D162] Equivalents. Functionally equivalent schemas, transports, or crypto suites offering comparable security and verifiability are within scope (see Appendix A [A022]).

D.N Interoperability Profiles (Non-Mandatory)

[D170] PROFILE-ID-01 (DID/VC intake). AIC intake accepts a VC asserting role/scope; credential hash is included in io_canon inputs; no reliance on any DID method.

[D171] PROFILE-PVL-01 (publicly verifiable append-only log). Anchoring uses an STH log with inclusion/consistency proofs; MMD enforced; dual-anchor variant per Appendix A [A048].

[D172] PROFILE-CEE-01 (TEE/HSM). Boundary measurement+sealed-key signature in ReceiptCore; verifier in TEE/HSM includes its measurement in signed response.

[D173] PROFILE-VCOMP-01 (verifiable computation). Receipt includes a verifiable-computation proof; anchor. commitment still commits to the Minimal ReceiptCore.

[D174] PROFILE-ESCROW-01 (conditional release). Settlement requires proof-validated receipts; optional oracle attestations recorded in a settlement transcript (Appendix A [A047]).

[D175] PROFILE-SEL-01 (AI-SEL bridge; illustrative, claims-neutral).

Implementations MAY ingest pre-authorization artifacts originating in external sovereign-execution frameworks (e.g., execution signatures, quorum verdicts, or blacklist cascades) as one or more of:

(i) Receipt extensions (outside the Minimal ReceiptCore), (ii) Oracle attestations (/oracle/attest+/oracle/anchor), or (iii) signed verification/settlement transcripts.

[D176] PROFILE-PROMPTCAPS-01 (advisory): Echo PC_H/PC_LEVEL, require prompt_attestation=true, and recommend PID profile active for "high-assurance" flows. (Illustrative; non-limiting.)

Such artifacts MUST NOT replace PoPC's invariants: the Minimal ReceiptCore commitment, inclusion and (on advance) consistency proofs under the freshness policy (MMD), and mint-after-verify (MAV) remain required before any Follow-On Privilege. External ledgers are treated as publicly verifiable ADS instances (STH/SSH+SCP) per § [0044E]. Naming is illustrative and non-limiting; functionally equivalent evidence is contemplated.

D.O Standard HTTP Headers (illustrative, non-limiting)

[D180] Recommended header names.

1. POPC-CPT (request). Capability-token gate. Value: base64url(CPT) per [D040]. Treat as sensitive; servers SHOULD return Cache-Control: no-store.
2. POPC-Anchor (request). Bind a call to a validated receipt commitment. Value: lowercase 64-hex-character digest (32-byte value)=H(canonical(Minimal ReceiptCore)).

3. POPC-Receipt-Ref (response). Newly created receipt reference. Value: lowercase-hex receipt_id.
4. POPC-Transcript-Ref (response). Reference to a verification transcript when the body contains a summary.
5. POPC-MMD-Policy (response). Disclose freshness policy. Value: integer seconds (e.g., 3600).
6. POPC-Prompt-Attest (response). Indicate prompt-attestation in high-assurance profiles. Value: truelfalse.
7. POPC-Audience (request). Relying-party identifier (audience binding). Value: UTF-8 RPID string; must match the audience encoded/bound in the token and echoed by the verifier transcript.
8. POPC-PromptCaps (request/response): value=lowercase-hex PC_H (advisory).
9. POPC-PromptCaps-Level (request/response): value=integer PC_LEVEL (advisory).

[D181] Header guidance. Do not place large blobs (attestation quotes, proofs, full transcripts) in headers; carry them in the body with the declared media type. Servers SHOULD return Cache-Control: no-store for PoPC headers and payloads; clients SHOULD avoid persistent caching. HTTP trailers or gRPC metadata are acceptable equivalents.

APPENDIX E—TRANSCRIPT & CERTIFICATE SCHEMAS

[E001] Purpose & scope. This appendix defines machine-readable schemas for verification transcripts, settlement transcripts, conformance certificates, oracle attestations, (non-)collusion certificates, aggregate transcripts, measurement attestation certificates, regulator-view transcripts, provenance certificates, and ranking transcripts. Schemas are normative for interoperability and non-limiting for claims. Optional anchor fields reference the Anchor schema in Appendix D [D050]. Unlearning/attribution artifacts referenced in Evidence Bundles use the $R^2$UA definitions in Appendix A [A141]-[A141C]; their concrete shapes may be conveyed as JSON/CBOR payloads per Appendix H.

Conventions (apply to all schemas):

$schema: JSON Schema 2020-12; $id URIs are stable hints.

Digests: lowercase hex (e.g., [a-f0-9]{64}$).

Signed blobs: contentEncoding: "base64url" with an appropriate contentMediaType (e.g., application/cose, application/cbor).

additionalProperties: false to lock shapes; extend via version bumps or extensions in other appendices.

codes[ ] values, where present, MUST be Appendix A [A030] error codes.

E.1 Verification Transcript (JSON Schema)

[E010] VerificationTranscript (JSON).

```
{
  "$schema": "https://json-schema.org/draft/2020-12/schema",
  "$id": "https://spec.popc.dev/schema/verification-transcript.json",
  "title": "Verification Transcript",
  "type": "object",
  "required": [
    "version",
    "receipt_ids",
    "status",
    "codes",
    "sth_id",
    "freshness_policy",
    "verifier",
    "signature",
    "created utc"
  ],
```

-continued

```
    "properties": {
      "version": { "type": "integer", "minimum": 1, "default": 1 },
      "receipt_ids": {
        "type": "array",
        "minItems": 1,
        "items": { "type": "string", "pattern": "^[a-f0-9]{64}$" }
      },
      "status": {
        "type": "string",
        "enum":
["PENDING", "VALID", "REVOKED", "DISPUTED", "INVALID", "SETTLED", "CLAWED_BACK"]
      },
      "codes": { "type": "array", "items": { "type": "string" } },
      "sth_id": {
        "type": "object",
        "required": ["log_id","root_hash", "tree_size", "timestamp"],
        "properties": {
          "log_id": { "type": "string" },
          "root_hash": { "type": "string", "pattern": "^[a-f0-9]{64}$" },
          "tree_size": { "type": "integer", "minimum": 0 },
          "timestamp": { "type": "string", "format": "date-time" }
        },
        "additionalProperties": false
      },
      "continuity": {
        "type": "object",
        "properties": { "from": { "type": "string" }, "to": { "type": "string" } },
        "additionalProperties": false
      },
      "freshness_policy": {
        "type": "object",
        "required": ["mmd_seconds"],
        "properties": { "mmd_seconds": { "type": "integer", "minimum": 0 } },
        "additionalProperties": false
      },
      "approved_service": {
        "type": "object",
        "properties": {
          "anchor_ok": { "type": "boolean" },
          "consistency_ok": { "type": "boolean" },
          "recompute_ok": { "type": "boolean" },
          "pq_present": { "type": "boolean" }
        },
        "additionalProperties": false
      },
      "meter": {
        "type": "object",
        "description": "Illustrative metering hook; evidentiary only-does not affect ReceiptCore
validity, anchoring, freshness, or MAV.",
        "properties": {
          "class": { "type": "string", "description": "e.g., verify | settle | actuation | certify |
aggregate" },
          "units": { "type": "number", "minimum": 0 }
        },
        "additionalProperties": false
      },
      "tcs": { "type": "number", "minimum": 0.0, "maximum": 1.0 },
      "audience": {
        "type": "object",
        "properties": {
          "id": { "type": "string", "description": "relying-party or device audience identifier" },
          "confirmed": { "type": "boolean" }
        },
        "additionalProperties": false
      },
      "prompt_attestation": { "type": "boolean" },
      "pid_active": { "type": "boolean" },
      "hitl_required": { "type": "boolean" },
      "verifier": {
        "type": "object",
        "required": ["vendor", "measurement", "key_id"],
        "properties": {
          "vendor": {
            "type": "string",
            "pattern": "^[a-z0-9](?: [a-z0-9-]{0,62} [a-z0-9])?$",
            "description": "identifier from registry Appendix A [A037]"
          },
          "measurement": { "type": "string", "pattern": "^[a-f0-9]{64}$" },
          "key_id": { "type": "string" }
```

-continued

```
    },
    "additionalProperties": false
  },
  "anchor": { "$ref": "https://spec.popc.dev/schema/anchor.json" },
  "signature": {
    "type": "string",
    "contentEncoding": "base64url",
    "contentMedia Type": "application/cose"
  },
  "created_utc": { "type": "string", "format": "date-time" }
},
"additionalProperties": false
}
```

[E011] Notes (normative).

(a) codes[ ] MUST use Appendix-A [A030] identifiers.

(b) continuity SHOULD appear when an STH/SSH advance was validated (Appendix A [A042]). Audience binding: If present, audience.id SHOULD match the relying party (or device audience) echoed by the connector, and audience.confirmed indicates the verifier performed audience binding.

(c) approved_service flags MAY include indicators for anchor, consistency, recompute, and PQ-dual-sig (Appendix A [A045]).

(d) anchor is optional and mirrors/transcript/anchor (Appendix D [D061]).

(e) hitl_required reflects high-risk flows requiring human approval (Appendix A [A104]).

(f) pid_active indicates a Prompt-Injection-Defense profile was active (Appendix A [A105]).

(g) meter is optional and transcript-evidentiary only; it does not alter ReceiptCore validity, anchoring, freshness, or MAV.

(h) dual-anchor deployments SHOULD emit one signed VerificationTranscript per log (each with a single sth_id) and return them as an array in API wrappers (see Appendix K). This preserves the single-head invariant in [E010].

E.2 Settlement Transcript (JSON Schema)

[E020] SettlementTranscript (JSON).

```
{
  "$schema": "https://json-schema.org/draft/2020-12/schema",
  "$id": "https://spec.popc.dev/schema/settlement-transcript.json",
  "title": "Settlement Transcript",
  "type": "object",
  "required": [
    "version","receipt_id","disposition","reasons",
    "window_state","artifacts","signature","created_utc"
  ],
  "properties": {
    "version":   { "type": "integer", "minimum": 1, "default": 1 },
    "receipt_id": { "type": "string", "pattern": "^[a-f0-9]{64}$" },
    "disposition": { "type": "string", "enum": ["SETTLED","CLAWED_BACK","HOLD"] },
    "reasons": { "type": "array", "items": { "type": "string" } },
    "window_state": {
      "type": "object",
      "required": ["revocation_window_seconds","within_window"],
      "properties": {
        "revocation_window_seconds": { "type": "integer", "minimum": 0 },
        "within_window":      { "type": "boolean" }
      },
      "additionalProperties": false
    },
    "arbitration": {
      "type": "object",
      "properties": {
        "scheme":   { "type", "string", "enum": ["bls12-381","ed25519-multisig","other"] },
        "m":   { "type", "integer", "minimum": 1 },
        "n":   { "type", "integer", "minimum": 1 },
        "signatures": { "type": "array", "items": { "type": "string", "contentEncoding":
"base64url" } }
      },
      "additionalProperties": false
    },
    "oracle_attestations": { "type": "array", "items": { "type": "string" } },
    "revocation_refs": { "type": "array", "items": { "type": "string" } },
    "dispute_artifacts": { "type": "array", "items": { "type": "string" } },
    "artifacts": {
      "type": "object",
      "properties": {
        "anchor_update": {
          "type": "object",
          "properties": { "log_id": { "type", "string" }, "entry_id": { "type": "string" } },
          "additionalProperties": false
```

-continued

```
        },
        "evidence_ref": { "type", "string" }
      },
      "additionalProperties": true
    },
    "anchor":   { "$ref": "httpsspec.popc.dev/schema/anchor.json" },
    "codes":   { "type": "array", "items": { "type": "string" } },
    "signature": { "type": "string", "contentEncoding": "base64url", "contentMediaType":
"application/close" },
      "created_utc": { "type": "string", "format": "date-time" }
    },
    "additionalProperties": false
  }
```

[E021] Notes (normative).

(a) disposition MUST reflect the applied update (spec § [0104]).

(b) When arbitration occurred, include quorum parameters and threshold signatures (Appendix A [A015]).

(c) reasons[ ] SHOULD include Appendix A [A030] codes.

(d) anchor is optional and aligns with/cert/anchor (Appendix D).

E.3 Conformance Certificate (JSON Schema)

[E030] ConformanceCertificate (JSON).

```
{
   "$schema": "https://json-schema.org/draft/2020-12/schema",
   "$id": "https://spec.popc.dev/schema/conformance-certificate.json",
   "title": "Conformance Certificate",
   "type": "object",
   "required": [
      "version",
      "receipt_ids",
      "policy",
      "freshness_policy",
      "status",
      "indicators",
      "signature",
      "created_utc"
   ],
   "properties": {
      "version": { "type": "integer", "minimum": 1, "default": 1 },
      "receipt_ids": {
         "type": "array",
         "items": { "type": "string", "pattern": "^[a-f0-9]{64}$" },
         "minItems": 1
      },
      "policy": { "type": "string", "description": "Conformance policy identifier (Core|Pro . . . )" },
      "freshness_policy": {
         "type": "object",
         "required": ["mmd_seconds"],
         "properties": { "mmd_seconds": { "type": "integer", "minimum": 0 } }
      },
         "continuity": {
            "type": "object",
            "properties": { "from": { "type":"string" }, "to": { "type": "string" } }
         },
         "indicators": { "type": "array", "items": { "type": "string" } },
         "status": { "type": "string", "enum": ["PASS", "FAIL", "REVOKED"] },
         "anchor": { "$ref": "https://spec.popc.dev/schema/anchor.json" },
         "signature": {
            "type": "string",
            "contentEncoding": "base64url",
            "contentMediaType": "application/cose"
         },
         "created_utc": { "type": "string", "format": "date-time" }
      },
      "additionalProperties": false
}
```

E.4 Oracle Attestation (JSON Schema)

[E040] OracleAttestation (JSON).

```
{
  "$schema": "https://json-schema.org/draft/2020-12/schema",
  "$id": "https://spec.popc.dev/schema/oracle-attestation.json",
  "title": "Oracle Attestation",
  "type": "object",
  "required": ["version","receipt_id","outcome","attester_id", "issued_utc","signature"],
  "properties": {
    "version": { "type": "integer", "minimum": 1, "default": 1 },
    "receipt_id": { "type": "string", "pattern": "^[a-f0-9]{64}$" },
    "outcome": { "type": "string", "description": "Outcome label or tuple" },
    "attester_id": { "type": "string" },
    "issued_utc": { "type": "string", "format": "date-time" },
    "anchor": { "$ref": "https://spec.popc.dev/schema/anchor.json" },
    "signature": {
      "type": "string",
      "contentEncoding": "base64url",
      "contentMediaType": "application/cose"
    }
  },
  "additionalProperties": false
}
```

[E041] For license workflows, attester_id MAY identify a license authority (e.g., ‘LBTC-CLM’), and outcome MAY encode ACTIVE|REVOKED|HOLD states corresponding to a CLM; anchoring is optional but recommended.

[E045] PromptCaps Attestation (PCA)

```
{
  "$id": "https://spec.popc.dev/schema/promptcaps-attestation.json",
  "title": "PromptCaps Attestation (PCA)",
  "type": "object",
  "required": ["version","pc_h","pc_level","attester_id","issued_utc","signature"],
  "properties": {
    "version":   { "type": "integer", "minimum": 1, "default": 1 },
    "pc_h":   { "type": "string", "pattern": "^[a-f0-9]{64}$" },
    "pc_level":   { "type": "integer", "minimum": 0, "maximum": 9 },
    "c_rc":   { "type": "string", "pattern": "^[a-f0-9]{64}$", "description": "optional binding to
Minimal ReceiptCore digest" },
    "rpid":   { "type": "string" },
    "attester_id": { "type": "string" },
    "issued_utc": { "type": "string", "format": "date-time" },
    "anchor":   { "$ref": "https://spec.popc.dev/schema/anchor.json" },
    "signature":   { "type": "string", "contentEncoding": "base64url", "contentMediaType":
  "application/cose" }
  },
  "additionalProperties": false
}
```

-continued

```
"type": "array",
"minItems": 2,
```

E.5 Non-Collusion/Conflict Certificates (JSON Schema)

[E050] NonCollusionCertificate (JSON).

```
{
  "$schema": "https://json-schema.org/draft/2020-12/schema",
  "$id": "https://spec.popc.dev/schema/noncollusion-certificate.json",
  "title": "Non-Collusion Certificate",
  "type": "object",
  "required": [
    "version",
    "receipt_core_commit",
    "logs",
    "freshness_policy",
    "signature",
    "created_utc"
  ],
  "properties": {
    "version": { "type": "integer", "minimum": 1, "default": 1 },
    "receipt_core_commit": { "type": "string", "pattern":
    "^[a-f0-9]{64}$" },
    "logs": {
```

-continued

```
"items": {
  "type": "object",
  "required": ["log_id","sth_id"],
  "properties": {
    "log_id": { "type": "string" },
    "sth_id": {
      "type": "object",
      "required": ["log_id", "root_hash", "tree_size",
      "timestamp"],
      "properties": {
        "log_id": { "type": "string" },
        "root_hash": { "type": "string", "pattern":
        "^[a-f0-9]{64}$" },
        "tree_size": { "type": "integer", "minimum": 0 },
        "timestamp": { "type": "string", "format": "date-time" }
      },
      "additionalProperties": false
    }
  },
  "additionalProperties": false
```

-continued

```
      }
    },
    "freshness_policy": {
      "type": "object",
      "required": ["mmd_seconds"],
      "properties": {
        "mmd_seconds": { "type": "integer", "minimum": 0 }
      },
      "additionalProperties": false
    },
    "continuity": {
      "type": "object",
      "properties": {
        "from": { "type": "string" },
        "to": { "type": "string" }
      },
      "additionalProperties": false
    },
    "anchor": { "$ref": "https://spec.popc.dev/schema/anchor.json" },
    "signature": {
      "type": "string",
      "contentEncoding": "base64url",
      "contentMediaType": "application/cose"
    },
    "created_utc": { "type": "string", "format": "date-time" }
  },
  "additionalProperties": false
}
```

[E051] ConflictCertificate (JSON).

```
{
  "$schema": "https://json-schema.org/draft/2020-12/schema",
  "$id": "https://spec.popc.dev/schema/conflict-certificate.json",
  "title": "Conflict Certificate",
  "type": "object",
  "required": [
    "version",
    "receipt_core_commit",
    "conflict_reason",
    "evidence",
    "signature",
    "created_utc"
  ],
  "properties": {
    "version": { "type": "integer", "minimum": 1, "default": 1 },
    "receipt_core_commit": { "type": "string", "pattern":
    "^[a-f0-9]{64}$" },
    "conflict_reason": {
      "type": "string",
      "enum": ["ANCHOR_MISMATCH","CONSISTENCY_MISSING",
      "STALE_STH"]
    },
    "evidence": { "type": "object","additionalProperties": true },
    "anchor": { "$ref": "https://spec.popc.dev/schema/anchor.json" },
    "signature": {
      "type": "string",
      "contentEncoding": "base64url",
      "contentMediaType": "application/cose"
    },
    "created_utc": { "type":"string","format":"date-time" }
  },
  "additionalProperties": false
}
```

E.6 Aggregate Transcript (JSON Schema)
[E060] AggregateTranscript (JSON).

```
{
  "$schema": "https://json-schema.org/draft/2020-12/schema",
  "$id": "https://spec.popc.dev/schema/aggregate-transcript.json",
  "title": "Aggregate Transcript",
  "type": "object",
  "required": [
```

-continued

```
    "version",
    "context",
    "window",
    "method",
    "freshness_policy",
    "receipt_set_commit",
    "signature",
    "created_utc"
  ],
  "properties": {
    "version": { "type": "integer", "minimum": 1, "default": 1 },
    "context": { "type": "object", "additionalProperties": true },
    "window": {
      "type": "object",
      "required":["start","end"],
      "properties": {
        "start": { "type": "string", "format": "date-time" },
        "end": { "type": "string", "format": "date-time" }
      },
      "additionalProperties": false
    },
    "method": {
      "type": "object",
      "required": ["id","version"],
      "properties": {
        "id": { "type": "string", "enum": ["PSI", "OPRF", "HE",
        "MIXED"] },
        "version": { "type": "string" }
      },
      "additionalProperties": false
    },
    "freshness_policy": {
      "type":"object",
      "required": ["mmd_seconds"],
      "properties": { "mmd_seconds": { "type":"integer","minimum":0 }
}
    },
    "receipt_set_commit": {
      "type": "string",
      "pattern": "^[a-f0-9]{64}$",
      "description": "RSC per Appendix A [A065]"
    },
    "poa": {
      "type": "string",
      "contentEncoding": "base64url",
      "contentMediaType": "application/cbor",
      "description": "Proof of Aggregation per Appendix A [A066]"
    },
    "anchor": { "$ref": "https://spec.popc.dev/schema/anchor.json" },
    "signature": {
      "type": "string",
      "contentEncoding": "base64url",
      "contentMediaType": "application/cose"
    },
    "created_utc": { "type":"string", "format":"date-time" }
    },
    "additionalProperties": false
}
```

E.7 Measurement Attestation Certificate (MAC)
[E070] MeasurementCertificate (JSON).

```
{
  "$schema": "https://json-schema.org/draft/2020-12/schema",
  "$id": "https://spec.popc.dev/schema/measurement-certificate.json",
  "title": "Measurement Attestation Certificate (MAC)",
  "type": "object",
  "required": [
    "version",
    "code_measurement",
    "build_manifest_digest",
    "signature",
    "created_utc"
  ],
  "properties": {
    "version": { "type": "integer", "minimum": 1, "default": 1 },
    "mac_id": { "type": "string" },
```

-continued

```
    "code_measurement": { "type": "string", "pattern": "^[a-f0-9]{64}$" },
    "build_manifest_digest": { "type": "string", "pattern":
    "^[a-f0-9]{64}$" },
    "toolchain": { "type": "string" },
    "boundary_measurement": { "type": "string", "pattern":
    "^[a-f0-9]{64}$" },
    "freshness_policy": {
      "type": "object",
      "properties": { "mmd_seconds": { "type": "integer", "minimum":
      0 } }
    },
    "continuity": {
      "type": "object",
      "properties": { "from": { "type": "string" }, "to": { "type":
      "string" } }
    },
    "anchor": { "$ref": "https://spec.popc.dev/schema/anchor.json" },
    "revoked": { "type": "boolean" },
    "signature": {
      "type": "string",
      "contentEncoding": "base64url",
      "contentMediaType": "application/cose"
    },
    "created_utc": { "type": "string", "format": "date-time" }
  },
  "additionalProperties": false
}
```

E.8 Regulator-View Transcript (RVT) RegulatorViewTranscript (JSON).

```
{
  "$schema": "https://json-schema.org/draft/2020-12/schema",
  "$id": "https://spec.popc.dev/schema/rvt.json",
  "title": "Regulator-View Transcript (RVT)",
  "type": "object",
  "required": [
    "version",
    "receipt_id",
    "redaction_profile",
    "proof_type",
    "view_digest",
    "signature",
    "created_utc"
  ],
  "properties": {
    "version": { "type": "integer", "minimum": 1, "default": 1 },
    "rvt_id": { "type": "string" },
    "receipt_id": { "type": "string", "pattern": "^[a-f0-9]{64}$" },
    "redaction_profile": { "type": "string" },
    "proof_type": {
      "type": "string",
      "enum": ["MERKLE_SD","ZK_MEMBERSHIP",
      "BOOLEAN_CIRCUIT"]
    },
    "proof": {
      "type": "string",
      "contentEncoding": "base64url",
      "contentMediaType": "application/cbor"
    },
    "view_digest": {
      "type": "string",
      "pattern": "^[a-f0-9]{64}$",
      "description": "Digest of the redacted audit view"
    },
    "approved_service": {
      "type": "object",
      "properties": {
        "anchor_ok":   { "type": "boolean" },
        "consistency_ok": { "type": "boolean" },
        "recompute_ok": { "type": "boolean" },
        "pq_present":   { "type": "boolean" }
      },
      "additionalProperties": false
    },
    "freshness_policy": {
      "type": "object",
```

-continued

```
      "properties": {"mmd_seconds": {"type": "integer", "minimum":
      0 } },
      "additionalProperties": false
    },
    "continuity": {
      "type": "object",
      "properties": { "from": { "type": "string" }, "to": { "type":
      "string" } },
      "additionalProperties": false
    },
    "anchor": { "$ref": "https://spec.popc.dev/schema/anchor.json" },
    "codes": { "type": "array", "items": { "type": "string" } },
    "signature": {
      "type": "string",
      "contentEncoding": "base64url",
      "contentMediaType": "application/cose"
    },
    "created_utc": { "type": "string", "format": "date-time" }
  },
  "additionalProperties": false
}
```

E.9 Provenance Certificate (PVC) [E.090] ProvenanceCertificate (JSON).

```
{
  "$schema": "https://json-schema.org/draft/2020-12/schema",
  "$id": "https://spec.popc.dev/schema/provenance-certificate.json",
  "title": "Provenance Certificate (PVC)",
  "type": "object",
  "required": [
    "version",
    "subject_id",
    "window",
    'policy",
    "score",
    "signature",
    "created_utc"
  ],
  "properties": {
    "version": { "type": "integer", "minimum": 1, "default": 1 },
    "pvc_id": { "type": "string" },
    "subject_id": { "type": "string" },
    "window": {
      "type": "object",
      "required": ["start","end"],
      "properties": {
        "start": { "type": "string", "format": "date-time" },
        "end":   { "type": "string", "format": "date-time" }
      },
      "additionalProperties": false
    },
    "policy": { "type": "string", "description": "Provenance scoring
    policy id" },
    "score": { "type": "number" },
    "confidence": {
      "type": "object",
      "properties": {
        "lower": { "type": "number" },
        "upper": { "type": "number" }
      },
      "additionalProperties": false
    },
    "sample_floor": { "type": "integer", "minimum": 0 },
    "freshness_policy": {
      "type": "object",
      "properties": { "mmd_seconds": { "type":"integer","minimum":0 }
}
    },
    "receipt_set_commit": {
      "type": "string",
      "pattern": "^[a-f0-9]{64}$",
      "description": "RSC per Appendix A [A065]"
    },
    "anchor": { "$ref": "https://spec.popc.dev/schema/anchor.json" },
      "signature": {
        "type": "string",
```

-continued

```
          "contentEncoding": "base64url",
          "contentMediaType": "application/cose"
        },
        "created_utc": { "type": "string", "format": "date-time" }
    },
    "additionalProperties": false
}
```

E.10 Ranking Transcript (JSON Schema)

[E095] RankingTranscript (JSON).

```
{
  "$schema": "https://json-schema.org/draft/2020-12/schema",
  "$id": "https://spec.popc.dev/schema/ranking-transcript.json",
  "title": "Ranking Transcript",
  "type": "object",
  "required": ["version","subject_id","receipt_ids","score","signature","created_utc"],
  "properties": {
    "version": { "type": "integer", "minimum": 1, "default": 1 },
    "subject_id": { "type": "string", "description": "Ranked service/entity" },
    "receipt_ids": {
      "type": "array",
      "minItems": 1,
      "items": { "type": "string", "pattern": "^[a-f0-9]{64}$" }
    },
    "score": { "type": "number" },
    "independence_tau_e": { "type": "number", "minimum": 0.0, "maximum": 1.0 },
    "counterparty_diversity_m": { "type": "integer", "minimum": 0 },
    "vendor_diversity_h": { "type": "integer", "minimum": 0 },
    "k_min": { "type": "integer", "minimum": 0 },
    "d_min": { "type": "integer", "minimum": 0 },
    "oracle_attestations": { "type": "integer", "minimum": 0 },
    "rsc": {
      "type": "string",
      "pattern": "^[a-f0-9]{64}$",
      "description": "Receipt Set Commitment (Appendix A [A065])"
    },
    "poa": {
      "type": "string",
      "contentEncoding": "base64url",
      "contentMedia Type": "application/cbor",
      "description": "Proof of Aggregation (Appendix A [A066])"
    },
    "prior_ref": {
      "type": "string",
      "description": "Optional reference to a context prior (e.g., cohort/policy prior) used to
initialize OutcomeRank weights; evidentiary only-does not affect receipt validity or verifier
gates."
    },
    "anchor": { "$ref": "https://spec.popc.dev/schema/anchor.json" },
    "signature": {
      "type": "string",
      "contentEncoding": "base64url",
      "contentMediaType": "application/cose"
    },
    "created_utc": { "type": "string", "format": "date-time" }
  },
  "additionalProperties": false
}
```

[E096] Notes (normative). prior_ref, when present, identifies a context/corpus prior used to initialize OutcomeRank weights; it is evidentiary transcript metadata and does not affect ReceiptCore validity, anchoring, MMD/consistency verification, or MAV gating.

[E097] Notes (illustrative).

Smoothing prior. Implementations MAY apply a baseline compliance prior $\beta \in [0,1)$ so the displayed score is computed as $$\text{score} := (1-\beta)\cdot f(\text{validated\_receipts, context}) + \beta\cdot \text{prior}(\text{context}),$$

where prior(context) is documented (and referenced by prior_ref). This improves stability under sparse/evolving corpora. Rankings remain computed over validated receipts and policy context; transcripts commit to the receipt set used.

Farm resistance. Implementations SHOULD penalize tightly reciprocated clusters and low-entropy provenance patterns; independence/diversity floors ($\tau_e$, m, h, k_min, d_min) SHOULD be enforced to reduce collusive inflation.

Signed value rule. If smoothing is applied, the score value carried in this transcript MUST equal the effective score used for ordering; UI-only transforms (e.g., log-scaled displays) MUST NOT change the signed score.

E.11 Consent Receipt (JSON Schema)

[E100] ConsentReceipt (JSON).

```
{
  "$schema": "https://json-schema.org/draft/2020-12/schema",
  "$id": "https://spec.popc.dev/schema/consent-receipt.json",
  "title": "Consent Receipt",
  "type": "object",
  "required":
["version","consent_id","subject_digest","aic_id","scope_digest","signature","created_utc"],
  "properties": {
    "version": { "type": "integer", "minimum": 1, "default": 1 },
    "consent_id":   { "type": "string", "pattern": "^[a-f0-9]{64}$" },
    "subject_digest": { "type": "string", "pattern": "^[a-f0-9]{64}$", "description": "salted digest
of the consenting subject (no raw PII)" },
    "aic_id":   { "type": "string", "pattern": "^[a-f0-9]{64}$" },
    "policy_digest": { "type": "string", "pattern": "^[a-f0-9]{64}$" },
    "scope_digest": { "type": "string", "pattern": "^[a-f0-9]{64}$" },
    "rpid":   { "type": "string", "description": "relying-party identifier (audience binding)" },
    "prompt_attestation": { "type": "boolean" },
    "prompt_digest": { "type": "string", "pattern": "^[a-f0-9]{64}$" },
    "ttl_utc": { "type": "string", "format": "date-time", "description": "optional expiration for
consent window" },
    "anchor": { "$ref": "https://spec.popc.dev/schema/anchor.json" },
    "codes": { "type": "array", "items": { "type": "string" } },
    "signature": {
      "type": "string",
      "contentEncoding": "base64url",
      "contentMediaType": "application/cose"
    },
    "created_utc": { "type": "string", "format": "date-time" }
  },
  "additionalProperties": false
}
```

[E101] Notes (normative).

(a) Privacy. subject_digest MUST be computed with a deployment-scoped salt; no raw PII appears in the artifact.

(b) Audience binding. If used, rpid SHOULD match the relying party echoed by the verifier transcript when consent is exercised (see Appendix D and §§ [0061A]-[0061B]).

(c) Interplay with Dynamic Consent. This artifact may be referenced by withdrawal/incident events in the RevocationTranscript and by settlement gating in § [0054A] (illustrative, non-limiting).

(d) Anchor. anchor is optional; if present it SHALL conform to Appendix D [D050].

(e) Codes. codes[ ] MUST use Appendix A [A030] identifiers when applicable.

(f) ReceiptCore unaffected. This schema is outside the Minimal ReceiptCore and does not change the commitment identity rules.

E.12 Revocation Transcript (JSON Schema)

[E110] RevocationTranscript (JSON).

```
{
  "$schema": "https://json-schema.org/draft/2020-12/schema",
  "$id": "https://spec.popc.dev/schema/revocation-transcript.json",
  "title": "Revocation Transcript",
  "type": "object",
  "required":
["version","revocation_id","subject_digest","reason","effective_utc","signature","created_utc"],
  "properties": {
    "version": { "type": "integer", "minimum": 1, "default": 1 },
    "revocation_id": { "type": "string", "pattern": "^[a-f0-9]{64}$" },
```

-continued

```
      "subject_digest": { "type": "string", "pattern": "^[a-f0-9]{64}$", "description": "salted digest
(same domain as ConsentReceipt)" },
      "reason": {
        "type": "string",
      "enum":
["WITHDRAWAL","INCIDENT","SAFETY","PRIVACY","POLICY_CONTRADICTION",
"FRAUD","ABUSE","OTHER"]
      },
      "reason_detail": { "type": "string" },
      "effective_utc": { "type": "string", "format": "date-time", "description": "time revocation takes
effect" },
      "applies_to": {
        "type": "object",
        "properties": {
          "consent_id":   { "type": "string", "pattern": "^[a-f0-9]{64}$" },
          "receipt_id":   { "type": "string", "pattern": "^[a-f0-9]{64}$" },
          "aic_id":       { "type": "string", "pattern": "^[a-f0-9]{64}$" },
          "scope_digest": { "type": "string", "pattern": "^[a-f0-9]{64}$" }
        },
        "additionalProperties": false
      },
      "disposition": {
        "type": "string",
        "enum": ["DENY","HOLD","CLAWBACK","NONE"],
        "description": "advisory effect for controllers/connectors/settlement"
      },
      "anchor": { "$ref": "https://spec.popc.dev/schema/anchor.json" },
      "codes": { "type": "array", "items": { "type": "string" } },
      "signature": { "type": "string", "contentEncoding": "base64url", "contentMediaType":
"application/cose" },
      "created_utc": { "type": "string", "format": "date-time" }
  },
  "additionalProperties": false
}
```

[E112] IntentCapsTranscript (ICT, JSON). (illustrative; outside ReceiptCore)

```
{
  "$schema": "https://json-schema.org/draft/2020-12/schema",
  "$id": "https://spec.popc.dev/schema/intentcaps-transcript.json",
  "title": "IntentCaps Transcript (ICT)",
  "type": "object",
  "required": ["version","receipt_id","ic_ipk","coi_digest","status","signature","created_utc"],
  "properties": {
    "version":   { "type": "integer", "minimum": 1, "default": 1 },
    "receipt_id": { "type": "string", "pattern": "^[a-f0-9]{64}$" },
    "ic_ipk":   { "type": "string", "pattern": "^[a-f0-9]{64}$", "description": "Intent Portability
Key digest" },
    "coi_digest": { "type": "string", "pattern": "^[a-f0-9]{64}$" },
    "air_digest": { "type": "string", "pattern": "^[a-f0-9]{64}$", "description": "digest of Attested
Intent Receipt (AIR)" },
    "status":   { "type": "string", "enum": ["PASS","FAIL","HOLD","REVOKED","STALE"] },
    "budgets_pre_digest": { "type": "string", "pattern": "^[a-f0-9]{64}$" },
    "budgets_post_digest": { "type": "string", "pattern": "^[a-f0-9]{64}$" },
    "anchor": { "$ref": "https://spec.popc.dev/schema/anchor.json" },
    "signature": { "type": "string", "contentEncoding": "base64url", "contentMediaType":
"application/cose" },
    "created_utc": { "type": "string", "format": "date-time" }
  },
  "additionalProperties": false
}
```

[E113] Notes (normative):

(a) ic_ipk and coi_digest mirror the IntentCaps AIR fields for linkage only; this transcript does not affect the Minimal ReceiptCore commitment. See the IntentCaps AIR requirements (listing: ic_id, coi_digest, ipk, plan/provider, budgets, tests, status).

(b) air_digest is a digest reference to the AIR payload produced by the IntentCaps stack; full AIR packaging belongs in EvidenceBundles (Appendix H).

(c) Privacy: budget snapshots SHOULD be summarized or digested unless explicitly required.

E.13 PromptCaps Transcript (JSON Schema)

[E115] PromptCapsTranscript (PCT, JSON). (illustrative; non-limiting; outside ReceiptCore)

```
{
  "$schema": "https://json-schema.org/draft/2020-12/schema",
  "$id": "https://spec.popc.dev/schema/promptcaps-transcript.json",
  "title": "PromptCaps Transcript (PCT)",
  "type": "object",
  "required": ["version","receipt_id","pc_h","pc_level","verifier","signature","created_utc"],
  "properties": {
    "version":   { "type": "integer", "minimum": 1, "default": 1 },
    "receipt_id": { "type": "string", "pattern": "^[a-f0-9]{64}$" },
    "pc_h":      { "type": "string", "pattern": "^[a-f0-9]{64}$", "description": "PromptCaps Hash
(domain-specific digest)" },
    "pc_level":   { "type": "integer", "minimum": 0 },
    "rpid":      { "type": "string", "description": "relying-party identifier if audience-bound" },
    "prompt_attestation": { "type": "boolean" },
    "pid_active": { "type": "boolean", "description": "Prompt-Injection Defense profile active" },
    "verifier": {
    "type": "object",
    "required": ["key_id"],
    "properties": {
      "key_id":   { "type": "string" },
      "measurement": { "type": "string", "pattern": "^[a-f0-9]{64}$" }
    },
    "additionalProperties": false
    },
    "anchor":   { "$ref": "https://spec.popc.dev/schema/anchor.json" },
    "signature":   { "type": "string", "contentEncoding": "base64url", "contentMediaType":
"application/cose" },
    "created_utc": { "type": "string", "format": "date-time" }
  },
  "additionalProperties": false
}
```

Notes (placement cross-refs): In D.H Transport & Headers, you already added POPC-PromptCaps: (request) and a PromptCaps-Transcript-Ref: (response) example. In Appendix A, you can optionally add a tiny glossary pointer: "PromptCaps Hash (PC_H): a digest over prompt-policy constraints; non-limiting; carried in PCT or Receipt extensions."

APPENDIX F—CONFORMANCE TEST PROFILES & NAMED TEST VECTORS

[F001] Purpose. This appendix defines named, reproducible tests for interop and conformance. It references schemas in Appendix B/D, algorithms in Appendix D.E, and error codes in Appendix A [A030]. Actual vector bytes may be published per Appendix A [A040].

[F002] Profiles.

P1 Cloud Enclave (Appendix A [A026]): /attest, /exec, /anchor, /verify, /settle.

P2 OS/Browser Wallet: device-bound/exec, /anchor, /verify; prompt-attestation flag (Appendix A [A043]).

P3 Robotic rtPRC: compact receipts (rtPRC in [A046]), fixed-width canonicalization, cycle counters.

P4 Oracle-Gated Settlement (OGS): /oracle/attest, /oracle/anchor, /settle.

P5 Dual-Anchor Coordination (DACC): /coord/certify non-collusion & conflict certificates.

P6 Federated Analytics (FRA): /analytics/aggregate issuing Aggregate Transcript with RSC/PoA.

F.1 Named Tests (minimal+extended)

[F010] TV-01 Minimal ReceiptCore digest match. Expect VALID; receipt_id H(canonical(Minimal ReceiptCore)) and anchor.commitment==receipt_id.

[F011] TV-02 Inclusion proof valid; STH fresh. Expect VALID; MMD satisfied.

[F012] TV 03 Consistency required. Provide a newer STH within MMD; with a valid consistency proof expect VALID (continuity present). If the proof is missing/invalid, expect INVALID (E022 CONTINUITY_MISSING).

[F013] TV-04 MMD stale. STH older than policy; expect INVALID (E013 STALE_STH).

[F014] TV-05 Nonce reuse. Same (nonce, session_id) in same (log_id, aic_id); expect INVALID (E004 NONCE_REUSE).

[F015] TV-06 Counter rollback. Decreasing monotonic_counter; expect INVALID (E006 COUNTER_ROLLBACK).

[F016] TV-07 Bad signature. Corrupt signatures.engine; expect INVALID (E010 SIGNATURE_INVALID).

[F017] TV-08 Attestation revoked. Measurement/key in ARL; expect REVOKED (E003 ATTESTATION_REVOKED) and settlement_hint=CLAWBACK.

[F018] TV-09 Dual-anchor disagreement. Two logs disagree on leaf; expect INVALID (E014 DUAL_ANCHOR_NONCOLLUSION).

[F019] TV-10 Recompute mismatch. Recomputed output_ digest differs; expect INVALID (E015 10_DIGEST_MISMATCH).

[F020] TV-I1 ZK invalid. Failing proof; expect INVALID (E009 ZK_INVALID).

[F021] TV-12 CPT TTL expired. Expect connector hard denial; HTTP 401/403 and E008 TTL_EXPIRED.

[F022] TV-13 Audience mismatch. RPID doesn't match relying party; expect connector denial E007 CPT_SCOPE_MISMATCH or E018 AUDIENCE_MISMATCH.

[F023] TV-14 Anchor missing. No anchor yet; expect PENDING (or INVALID (E020 ANCHOR_NOT_FOUND) if policy forbids).

[F024] TV-15 PQ cutover. After Cutover T, missing PQ signature; expect INVALID (E019 PQ_REQUIRED).

[F025] Expected mapping. Each test MUST return an Appendix A [A030] code; suggested HTTP mappings are in [A030].

OGS/DACC/FRA extensions

[F026] TV-16 Oracle attestation mismatch. oracle.outcome conflicts with receipt outcome; expect HOLD/CLAW- BACK or INVALID per policy; include codes[ ] with one of E020 ANCHOR_NOT_FOUND, E002 POLICY_MISMATCH.

[F027] TV-17 Oracle anchor missing. Attestation not anchored; expect HOLD or INVALID (E020 ANCHOR_NOT_FOUND) until anchored.

[F028] TV-18 Non-collusion certificate (NCC) pass. Two anchors agree; /coord/certify returns NCC; settlement proceeds.

[F029] TV-19 Conflict certificate. Anchors disagree or consistency missing; /coord/certify returns ConflictCertificate; expect INVALID (E014 DUAL_ANCHOR_NONCOLLUSION).

[F030] TV-20 Aggregate transcript—valid PoA. /analytics/aggregate returns AggregateTranscript with RSC and PoA; verify OK. [F031] TV-21 Aggregate transcript—PoA invalid. Tamper with transcript; expect INVALID (E016 SCHEMA_INVALID). Expect INVALID (E032 POA_INVALID).

[F032] TV-22 Prompt-attestation required. High-assurance mode missing prompt bit; expect verifier/connector to reject: codes[ ] includes E031 CONSENT_MISSING (and/or a profile code).

[F033] AAP-01 (anchor admission exceeded). Expect HOLD (no mint), codes[ ] includes E020 ANCHOR_NOT_FOUND; secondary anchor succeeds→VALID.

[F034] PROMPT-01 (prompt-attestation missing when required). Expect 401/403 at connector boundary; verifier codes[ ] include policy violation.

[F035] DACC-02 (gossip conflict). Continuity gossip detects STH mismatch→ConflictCertificate; expect INVALID (E014 DUAL_ANCHOR_NONCOLLUSION).

[F036] ZK-HASH-01 (auxiliary ZK-friendly hash). Auxiliary ZK proofs valid with Poseidon; anchor remains SHA-256 receipt id=H(canonical Minimal ReceiptCore) →VALID.

[F037] FOP-MAV-01. Only “session resumption” used (no explicit token). Classify as FOP; if MAV/MMD unmet→DENY (or HOLD where policy).

[F038] SSH/SCP-01. Vector-commitment log using SSH/SCP. VALID (equivalent).

[F039] Private-log-only-01. Private log only; no public verification. Conformance FAIL in regulated/procurement modes.

[F040] Post-facto-settle-01. No pre-verification gate; settle later. MAV violation→DENY/HOLD.

[F041] Stream-FOP-01. Streaming privilege without token (rename attempt). FOP gate→DENY (codes[ ] includes E030 CPT_MISSING or E020 ANCHOR_NOT_FOUND, per profile).

[F042] IC-FAIL-01. $\tau_e$ below threshold→down-weight/exclude per profile; expect reported metric in RankingTranscript.

[F043] RPP-CLIQUE-01. Reciprocal-pair cluster detected→exclude; codes[ ] indicates policy rule.

[F044] OOL-REQ-01. Monetary outcomes lacking required oracle attestation→HOLD or low weight per policy.

[F045] CDF-FLOOR-01. m/h floors unmet→clip or exclude; RankingTranscript reports m, h.

[F046] KMIN-DMIN-01. k_min/d_min unmet→provisional or excluded; RankingTranscript reports floors.

[F047] IC-LINK-01. PoPC receipt includes extensions.ic_ipk/coi_digest; ICT present; AIR anchored and fresh→VALID; codes[ ] empty.

[F048] IC-STALE-02. AIR anchor older than MMD→INVALID (E013 STALE_STH) at PoPC verifier; HOLD settlement. (AIR profiles recommend freshness/quorum.)

[F049] IC-MISMATCH-03. coi_digest in ICT AIR→INVALID (E002 POLICY_MISMATCH) (or profile-specific code); no token mint.

F.2 Vector packaging (normative)

[F050] Vector bundle. A test bundle SHOULD include: (i) AIC JSON; (ii) canonicalized I/O sample+expected digests; (iii) PoPC receipt JSON; (iv) STH+inclusion/consistency proof artifacts; (v) optional ZK proof blob; (vi) expected response JSON(s) for/verify, /settle, and where applicable/oracle/attest, /coord/certify, /analytics/aggregate; (vii) expected codes[ ].

[F051] Determinism. Where recompute applies, bundles SHOULD include {AIC, inputs, determinism_salt, code_measurement}sufficient to recompute output_digest identically.

[F052] Transcript/certificate anchors. If a vector tests anchoring of a transcript or certificate, include the Anchor object (log_id, tree_head, inclusion_proof, optional consistency_proof) conformant to Appendix D [D050].

[F052A] Canonicalization/commitment reference. Implementations SHOULD reproduce the byte-exact canonicalization/commitment test vector in Appendix D.K as part of conformance (illustrative; claims control).

[F053] PID-01. Prompt-injection attempt→E002 POLICY_MISMATCH; no mint.

[F054] HITL-O1. High-risk profile without required human sign-off→DENY/HOLD.

[F055]E-STOP-01. Emergency stop during RUN_PERMIT window→RUN_PERMIT.=0 within ALB; denial transcript emitted.

[F056] CPT-00 (capability missing). No CPT presented where policy requires→DENY; codes[ ] includes E030 CPT_MISSING; suggested HTTP 428.

[F057] CONSENT-00 (consent/prompt missing). Required consent receipt/prompt-attestation absent→DENY; codes[ ] includes E031 CONSENT_MISSING; suggested HTTP 401/403.

[F058] PROMPT-02 (PromptCaps digest binding). High-assurance profile where PC_H must bind to {Minimal ReceiptCore digest, scope, audience}. Mismatch→DENY (policy code); verifier transcript records failure. ReceiptCore validity unchanged.

[F059] CONSENT-01 (HITL required but absent). Profile mandates human-in-the-loop for the operation class; missing HITL→DENY/HOLD with policy code; ReceiptCore rules remain unchanged.

APPENDIX G—ETHICAL USE & ANTI-MANIPULATION COVENANT (NON-LIMITING)

[G000] Construction and non-limiting effect. This appendix expresses recommended safeguards for deployments. It does not limit the scope of any claim, is not required to practice the invention, and creates no private right of action. The capitalized terms MUST, SHOULD, and MAY are used in the sense of RFC 2119/RFC 8174 as profile guidance only.

[G000A] Non-incorporation & terminology. References to standards, vendors, or profiles herein are illustrative and non-incorporating. Capitalized terms (e.g., platform-authenticator assertion, audience-bound token, continuity record, MMD) have the meanings in Appendix A.

[G000B] Non-limiting effect. Measures in this appendix are policy guidance for deployers; they do not limit any claim. Conformance remains governed by Minimal Receipt-Core→anchor→freshness/consistency→Mint-After-Verify (MAV).

[G001] Purpose. The PoPC rail is intended to protect persons and communities by making digital actions truth-attestable, privacy-preserving, and fail-closed against deception and manipulation.

[G001A] Human dignity & non-coercion (non-limiting). Deployments MUST respect intrinsic human dignity, avoid coercion or deception in obtaining consent, and provide accessible means to revoke consent and halt execution. [G001B] Anti-mimicry & consent integrity (illustrative). Deployments SHOULD discourage AI mimicry of consent by requiring platform-authenticator prompt attestation, optional PromptCaps binding (PC_H/PC_LEVEL) to {Minimal ReceiptCore digest, scope, audience}, and, in high-assurance profiles, human-in-the-loop confirmation. (Illustrative; claim scope unaffected.)

[G001C] Public misuse transparency (illustrative). Deployments SHOULD, subject to applicable privacy and legal obligations, publish anchored revocation/misuse notices and a policy-defined transparency summary (e.g., quarterly) to deter abuse and encourage accountability. Publication MAY redact PII and does not alter ReceiptCore, anchoring, freshness, or MAV requirements. (Illustrative; claim scope unaffected.) [G002] Prohibited uses (illustrative, non-exhaustive). Deployments SHOULD NOT use PoPC artifacts to enable: (i) coercive surveillance; (ii) social-credit scoring; (iii) deceptive impersonation or consent mimicry; (iv) targeted oppression; or (v) unlawful discrimination. These examples are illustrative; legality is jurisdiction-specific.

[G003] Required safeguards for high-assurance profiles (illustrative). A High-Assurance profile SHOULD include:

- [G003A] Prompt attestation. Platform-authenticator prompts (e.g., passkey-class) with prompt-attestation and anti-dark-pattern requirements; prompts MUST state who is asking, what will be done, and for how long. (Appendix A [A043].)
- [G003B] Confidential policies. Selective-disclosure/zero-knowledge regulator views to prevent PII leakage. (Appendix A [A021].)
- [G003C] Tamper resistance. Dual-anchor logs and continuity records to resist equivocation; verifiers MUST enforce a freshness threshold. (Appendix A [A048], [A042], [A041].)
- [G003D] Audit posture. Approved-service indicators and signed verification transcripts for auditability. (Appendix A [A045], [A047].)
- [G003E] Least privilege. Capability tokens with audience binding, scope, TTL, and revocation; tokens MUST fail-closed if bindings do not match attested parameters. (Appendix A [A044], [A013].)
- [G003F] Consent lifecycle. Consent refresh for long-running operations, easy revocation, and rate-limiting on high-risk actions.
- [G003G] Data minimization. Receipt fields SHOULD avoid raw PII; use canonical digests and unlinkable identifiers where feasible.
- [G003H] Minors safeguards (illustrative). For high-risk operations, deployments SHOULD enforce age-gating and verified parent/caregiver consent before issuing follow-on privileges; prompts SHOULD use plain-language rationale appropriate for minors; evidence SHOULD be recorded in a non-Core transcript. (Illustrative; claim scope unaffected.)

[G004] Access and licensing policy (illustrative, non-binding).

Providers MAY offer interoperability and royalty-free use for bona-fide public-interest deployments (e.g., safety, public health, low-income regions, and humanitarian or faith-based charitable services), subject to separate written agreements. Providers reserve the right to withhold licenses for clearly harmful uses. Nothing herein constitutes a binding FRAND commitment or offer; business terms are illustrative and do not affect claim scope.

[G005]Governance & conformance (illustrative).

Independent conformance suites, test vectors, and profiles MAY be published to validate receipt schema, verifier behavior (inclusion/consistency proofs and freshness), audience-binding of capability tokens, platform-authenticator verification inside the trusted boundary, and zero-knowledge regulator-view flows. Use of any given suite is optional and non-limiting. (Appendix A [A030], [A041], [A042], [A043], [A044].)

[G006] Legal primacy. In case of conflict with applicable law, law controls. Implementers SHOULD provide a contact path for suspected misuse and a mechanism to suspend or revoke credentials associated with harmful activity.

[G007] Freedom of conscience. Deployments SHOULD NOT be used to suppress lawful worship or religious conscience, to fabricate repentance or spiritual submission, or to persecute persons for faith practice.

[G008] Misuse response & revocation (illustrative). Deployments SHOULD maintain an abuse-report channel and MAY publish revocation/ban lists for measurements, keys, or certificates when misuse is confirmed; revocation artifacts SHOULD be anchored for audit and referenced by transcripts.

[G008A] Defensive termination (illustrative). Patent licenses may provide for defensive termination upon prohibited uses in [G002]. Any such licensing term is illustrative and does not alter technical requirements or claim scope.

[G009] Access & equity posture (illustrative). Deployments may adopt business-level policies (e.g., FRAND interoperability, public-interest terms, independent ethics oversight, and misuse transparency reporting). These measures are optional, non-limiting, and outside the claimed invention.

APPENDIX H—EVIDENCE PACKAGING PROFILES (AUDITOR BUNDLES)

[H001] Purpose & scope. This appendix defines machine-readable evidence bundles used for audits, regulator submissions, and cross-party dispute resolution. Bundles collect the minimum artifacts necessary to independently verify receipt validity, freshness (MMD), continuity, and (when applicable) transcript/certificate anchoring. Schemas are normative for interop and non-limiting for claims.

[H002] References. Anchor schema (Appendix D [D050]); OpenAPI routes (Appendix D [D061]); transcript/certificate schemas (Appendix E); error taxonomy (Appendix A [A030]); artifacts RSC and PoA (Appendix A [A065], [A066]); log properties/MMD/continuity (Appendix A [A028], [A041], [A042]).

H.1 EvidenceBundle (JSON Schema)

[H010] EvidenceBundle (JSON).

```
{
  "$id": "https://spec.popc.dev/schema/evidence-bundle.json",
  "title": "Evidence Bundle",
  "type": "object",
  "required": ["version", "bundle_id", "items", "created_utc"],
  "properties": {
    "version": { "type": "integer", "minimum": 1, "default": 1 },
    "schema_version": { "type": "string", "description": "Bundle schema version (semver-like)" },
    "bundle_id": { "type": "string" },
    "profile": {
      "type": "string",
  "enum": [
"RECEIPT","ANCHOR","CONSISTENCY","VERIFICATION_TRANSCRIPT","SETTLEMENT_
TRANSCRIPT",
"CONFORMANCE_CERTIFICATE","ORACLE_ATTESTATION","NONCOLLUSION_CERT",
"CONFLICT_CERT",
"AGGREGATE_TRANSCRIPT","RSC","POA","RVT","PVC","MEASUREMENT_CERTIFICATE",
"CONTINUITY_TRANSCRIPT","REVOCATION_TRANSCRIPT","SEL_LEDGER_NOTE","
UNLEARNING_TRANSCRIPT",
"UNLEARNING_CERTIFICATE","ATTRIBUTION_CERTIFICATE","DATA_CONTRIBUTION_
RECORD","IFC","BIC",
"RANKING_TRANSCRIPT","DRT","CONSENT_RECEIPT","PROMPTCAPS_ATTESTATION",
"INTENTCAPS_TRANSCRIPT"
],
    "description": "Named packaging profile (see Appendix H.2)"
  },
  "policy": {
    "type": "object",
    "properties": {
      "freshness_policy": {
        "type": "object",
        "required": ["mmd_seconds"],
        "properties": {
          "mmd_seconds": { "type": "integer", "minimum": 0 }
        }
      },
      "dual_anchor_required": { "type": "boolean", "default": false },
      "continuity_required": { "type": "boolean", "default": false },
      "recompute_guard_required": { "type": "boolean", "default": false }
    },
    "additionalProperties": false
  },
  "digest_suite": {
    "type": "object",
    "description": "Hash + canonicalization used for item payload digests and the
bundle_commitment",
    "properties": {
      "hash": { "type": "string", "description": "e.g., sha-256, sha3-256, blake3" },
      "canon": { "type": "string", "enum": ["jcs", "cbor"], "description": "JCS for JSON or
canonical CBOR" }
    },
    "additionalProperties": false
  },
  "sig_suite": {
    "type": "object",
    "description": "Signature suite(s) used for the bundle signature",
    "properties": {
      "primary": { "type": "string", "description": "e.g., ed25519, ecdsa-p256" },
      "secondary": { "type": "string", "description": "optional PQ/hybrid, e.g., dilithium2" }
    },
    "additionalProperties": false
  },
  "issuer": {
    "type": "object",
    "description": "Issuer of the bundle (auditor/operator/verifier)",
    "properties": {
      "name": { "type": "string" },
      "id":   { "type": "string" },
      "key_id": { "type": "string" }
    },
    "additionalProperties": false
  },
  "rsc": {
    "type": "string",
    "pattern": "^[a-f0-9]{64}$",
    "description": "Receipt Set Commitment (optional convenience mirror of item-level RSC)"
  },
  "poa": {
    "type": "string",
    "contentEncoding": "base64url",
    "contentMediaType": "application/cbor",
```

-continued

```
    "description": "Proof of Aggregation (optional convenience mirror)"
  },
  "previous_bundle_commitment": {
    "type": "string",
    "pattern": "^[a-f0-9]{64}$",
    "description": "Optional chaining to prior bundle"
  },
  "bundle_commitment": {
    "type": "string",
    "pattern": "^[a-f0-9]{64}$",
    "description": "Digest over canonical MinimalBundleCore (see [H013])"
  },
  "anchor": {
    "$ref": "https://spec.popc.dev/schema/anchor.json",
    "description": "Optional public anchor for the bundle_commitment"
  },
  "items": {
    "type": "array",
    "minItems": 1,
    "items": {
      "type": "object",
      "required": ["type", "payload"],
      "properties": {
      "type": {
        "type": "string",
        "enum": [
          "RECEIPT",
          "ANCHOR",
          "CONSISTENCY",
          "VERIFICATION_TRANSCRIPT",
          "SETTLEMENT_TRANSCRIPT",
          "CONFORMANCE_CERTIFICATE",
          "ORACLE_ATTESTATION",
          "NONCOLLUSION_CERT",
          "CONFLICT_CERT",
          "AGGREGATE_TRANSCRIPT",
          "RSC",
          "POA",
          "RVT",
          "PVC",
          "MEASUREMENT_CERTIFICATE",
          "CONTINUITY_TRANSCRIPT",
          "REVOCATION_TRANSCRIPT",
          "SEL_LEDGER_NOTE",
          "UNLEARNING_TRANSCRIPT",
          "UNLEARNING_CERTIFICATE",
          "ATTRIBUTION_CERTIFICATE",
          "DATA_CONTRIBUTION_RECORD","IFC","BIC",
"RANKING_TRANSCRIPT","DRT","CONSENT_RECEIPT",
"PROMPTCAPS_ATTESTATION"
        ]
      },
      "schema_id": {
      "type": "string",
      "format": "uri",
      "description": "Optional$id or URI of the concrete schema for payload validation"
    },
    "media_type": {
      "type": "string",
      "description": "IANA media type of payload, e.g., application/json or application/cbor"
    },
    "payload": {
      "type": "object",
      "additionalProperties": true,
      "description": "Item body; see normative payload mappings in [H011]"
    },
    "payload_digest": {
      "type": "string",
      "pattern": "^[a-f0-9]{64}$",
      "description": "Digest over canonical(payload) per digest_suite"
    },
    "commitment": {
      "type": "string",
      "pattern": "^[a-f0-9]{64}$",
      "description": "For committed objects (e.g., RSC, receipt leaf commitment)"
    },
    "references": {
      "type": "object",
      "description": "Lightweight pointers enabling cross-checks",
```

-continued

```
          "properties": {
            "receipt_id": { "type": "string", "pattern": "^[a-f0-9]{64}$" },
            "aic_id":   { "type": "string", "pattern": "^[a-f0-9]{64}$" },
            "log_id":   { "type": "string" },
            ""sth_id":  { "type": "string" }
          },
          "additionalProperties": true
        },
        "anchor": {
          "$ref": "https://spec.popc.dev/schema/anchor.json",
          "description": "Optional: per-item anchor if not embedded in payload"
        },
        "note": { "type": "string" }
      },
      "additionalProperties": false
    }
},
"codes": {
  "type": "array",
  "items": { "type": "string" },
  "description": "Appendix A [A030] codes observed while assembling/verifying the bundle"
},
"signature": {
  "type": "string",
  "contentEncoding": "base64url",
  "contentMediaType": "application/cose",
  "description": "Signature over canonical MinimalBundleCore; see [H012]-[H013]"
    },
    "created_utc": { "type": "string", "format": "date-time" },
    "part_no": { "type": "integer", "minimum": 1, "description": "Optional: for paged BATCH
bundles" },
    "part_total":{ "type": "integer", "minimum": 1, "description": "Optional: for paged BATCH
bundles" }
  },
  "additionalProperties": false
}
```

[H011] Normative payload formats.

Items MUST carry payloads that conform to the respective schemas below where defined. For items without a canonical schema herein (e.g., UNLEARNING_), the payload MAY be opaque but MUST include payload_digest and SHOULD include schema_id pointing to a publisher schema.

RECEIPTAppendix D [D030](PoPC Receipt).

ANCHOR→Appendix D [D050](log_id, tree_head, inclusion_proof, optional consistency_proof).

CONSISTENCY→Same shape as ANCHOR.consistency_proof when conveyed separately.

VERIFICATION_TRANSCRIPT→Appendix E [E010].

SETTLEMENT_TRANSCRIPT→Appendix E [E020].

CONFORMANCE_CERTIFICATE→Appendix E [E030].

NONCOLLUSION_CERT→Appendix E [E050].

CONFLICT_CERT→Appendix E [E051].

AGGREGATE_TRANSCRIPT→Appendix E [E060] (may include receipt_set_commit and poa).

RVT (Regulator-View Transcript)→Appendix E [E080] Regulator-View Transcript.

PVC (Provenance Certificate)→Appendix E [E090] Provenance Certificate.

MEASUREMENT_CERTIFICATE (MAC)→Appendix E [E070].

CONTINUITY_TRANSCRIPT→Appendix A [A074] (shape per implementation; MUST bind STH chain).

REVOCATION_TRANSCRIPT→Appendix E [E110].

RSC→Receipt-set commitment per Appendix A [A065] (opaque object with at least root/digest and method id).

POA→Proof of Aggregation per Appendix A [A066] (opaque proof object; SHOULD cite method/version).

SEL_LEDGER_NOTE→Object carrying pointers/digests to external sovereign-execution ledger entries used as policy evidence (AI-SEL). Bundle acceptance of SEL records is advisory; PoPC verification remains governed by Receipts/Anchors/Proofs/Transcripts.

UNLEARNING_TRANSCRIPT→$R^2$UA Unlearning Transcript (UT) (Appendix N [NO10]): includes target_set_commit, mid_pre, mid_post, timing, and codes[ ]; optional proof_blob/vk_ref; MAY include/point to anchor.

UNLEARNING_CERTIFICATE→$R^2$UA Unlearning Certificate (UC) (Appendix N [N020]): commits to target_set_commit, mid_pre, mid_post, and (where applicable) proof blob/verifying-key ref; MAY be anchored; complements IFC/BIC [A120], [A119].

ATTRIBUTION_CERTIFICATE→$R^2$UA Attribution Certificate (AC) (Appendix N [N030]): commits to contribution set and weights/bounds for mid_post; MAY cite RSC and PoA [A065], [A066]; MAY be anchored.

DATA_CONTRIBUTION_RECORD→Signed per-contributor record (hash of contributed unit(s), consent anchor reference, and time window).

IFC/BIC→Appendix A [A120]/[A119].

RANKING_TRANSCRIPT→Appendix E [E095].

DRT→Appendix A [A116]; concrete schema in Appendix 0 [0020].

CONSENT_RECEIPT→Appendix E [E100]

PROMPTCAPS_ATTESTATION→Appendix E [E045]

INTENTCAPS_TRANSCRIPT→Appendix E [E112] IntentCapsTranscript (ICT)

AIR→Attested Intent Receipt per IntentCaps spec (profile IC-Core/1.0 or IC-Pro/1.0); anchor optional. (AIR fields include coi_digest, ipk, plan/provider, budgets pre/post, tests, status.)

RACLE_ATTESTATION→Appendix E [E040]. When license gating is employed, an ORACLE_ATTESTATION MAY embed LBTC artifacts such as CLM (Composable License Manifest), LCP (License Consumption Proof), or LER (License Event Record), carried as their native JSON; anchors/freshness/quorum follow the verifier policy.

Digest requirement (normative). For any item that includes payload_digest, it MUST equal H(canonical(payload)) using digest_suite.hash over canonical form digest_suite.canon (JCS for JSON, canonical CBOR for CBOR).

[H012] Signing the bundle.

Bundles MAY be signed by an audit authority, operator, or verifier. The bundle signature covers MinimalBundleCore (see [H013]) and provides packaging integrity without replacing inner signatures (e.g., receipt, transcript, certificate). Where present, bundle_commitment MUST equal the hash of canonical MinimalBundleCore; the optional top-level anchor may be used to publicly commit that bundle commitment.

[H013] Bundle commitment identity (normative).

MinimalBundleCore (fields included in the bundle commitment):

version, schema_version?, bundle_id, profile?, policy, digest_suite, array of item commitments in item order where each element is either item.commitment (if present) or item.payload_digest (else fallback H(canonical(item.payload))), rsc?, poa?, previous_bundle_commitment?, created_utc.

Excluded from the commitment: anchor, signature, issuer, codes, part_no, part_total, and any per-item anchor/note/schema_id/media_type/references.

Computation. bundle_commitment:=H(canonical(MinimalBundleCore)) where canonicalization is selected by digest_suite.canon and H is digest_suite.hash.

Verifier rule. A verifier MUST fail-closed if a present bundle_commitment does not equal the recomputed digest of the canonical MinimalBundleCore, or if canonicalization parameters are missing/inconsistent.

[H014] The MIN bundle suffices to demonstrate conformance with the Mint-After-Verify Rule in Appendix A [A107](fresh inclusion and, on advance, consistency).

[H015] Auditor knobs (illustrative). Auditors MAY request the ranking prior (β) and parameter settings (e.g., $\tau_e$, m, h, k_min, d_min, freshness half-life H) referenced by a RankingTranscript. Inclusion is optional, transcript-only, and does not affect Minimal ReceiptCore validity.

H.2 Packaging Profiles (normative names; illustrative contents)

MIN—Minimal: RECEIPT+ANCHOR (inclusion; consistency if applicable)+VERIFICATION_TRANSCRIPT; policy.freshness_policy present.

EXT—Extended: MIN+any settlement/dispute artifacts (SETTLEMENT_TRANSCRIPT, RT/NCC/Conflict).

BATCH—Multi-receipt audit: MIN/EXT items repeated; part_no/part_total MAY be present for paging.

PIP—Pipeline: ordered RECEIPT chain with parent pointers; MAY include CONFORMANCE_CERTIFICATE and CONTINUITY_TRANSCRIPT.

UNL-MIN—Unlearning minimal: RECEIPT(s)+IFC/BIC+(optionally) UNLEARNING_TRANSCRIPT; schemas may be provider-specific.

APPENDIX H-BIS—REGULATOR-MODE MAPPINGS (ILLUSTRATIVE)

[HB001] Purpose & scope. This appendix provides illustrative mappings from widely referenced regulatory obligations to PoPC evidence artifacts to aid audits, conformity assessments, and procurement reviews. It is non-limiting; the claims control. Terms (ReceiptCore, anchor, MMD, transcripts, EvidenceBundle, etc.) have the meanings in Appendix A.

[HB002] Artifacts cross-referenced. Minimal ReceiptCore (see § [0042A]); anchors/inclusion/consistency proofs (see §§ [0044]-[0044A]); continuity records (§ [0055A]); VerificationTranscript/SettlementTranscript/ConformanceCertificate/Regulator-View Transcript (RVT) (Appendix E); EvidenceBundle profiles (Appendix H); error taxonomy (Appendix A [A030]); dual-anchor non-collusion (Appendix A [A048]); revocation transcript (Appendix A [A073]); oracle attestation (Appendix A [A060]).

H-bis.1 EU AI Act-style obligations→PoPC evidence (illustrative)

[HB010] Risk management & data governance.

AIC+Policy VM: risk controls encoded as machine-enforceable policy and evaluated inside a trusted boundary (see §§ [0047]-[0049], [0093]).

ZK predicates (optional): confidential compliance checks without revealing raw inputs (Appendix A [A035]; § [0112]).

Technical documentation pointer: Measurement Attestation Certificate (MAC)+SBOM (Appendix E [E070]; Appendix A [A068]).

[HB011] Record-keeping/traceability (logging).

Receipts: Minimal ReceiptCore+sealed-key signature (see §§ [0042A], [0093]).

Public anchors: inclusion+(on advance) consistency proofs under MMD (§§ [0044]-[0044A]).

Continuity: continuity records link successive STHs (§ [0055A]).

EvidenceBundle: MIN/EXT/BATCH bundles aggregate the minimal verifiable set (Appendix H).

[HB012] Transparency & information to users.

VerificationTranscript: signed, auditable status+STH/SSH identifiers+codes (Appendix E [E010]).

RVT (Regulator-View Transcript): redacted view with selective-disclosure proof (Appendix E [E080]).

Approved-service indicators: anchor/consistency/recompute/PQ presence captured (Appendix A [A045]).

[HB013] Human oversight & HITL.

Platform-authenticator prompt-attestation and optional PromptDigest (Appendix A [A043], [A088]; § [0101]).

HITL flags in VerificationTranscript (e.g., hitl_required, pid_active if present per Appendix E [E010]).

Fail-closed gating: no Follow-On Privilege (FOP) activation unless MAV+MMD+proofs validate (§§ [0061C]-[0061E]).

[HB014] Accuracy, robustness, cybersecurity.

Recompute guard (§ [0048A]) and deterministic canonicalization (§ [0043])→reproducible results.

Freshness (MMD)+dual-anchor non-collusion (Appendix A [A048])→anti-equivocation.

ConformanceCertificate for deployment profiles (Appendix E [E030]). [HB015] Post-market monitoring & incidents.

RevocationTranscript (Appendix A [A073])+anchored revocation entries (§ [0049A], § [0054]).

Conflict/Non-Collusion Certificates for log discrepancies (Appendix E [E051]/[E050]).

SettlementTranscript records disposition (Appendix E [E020]); EvidenceBundle-EXT packages the trail (Appendix H).

Note. References to "record-keeping," "traceability," "post-market monitoring," and "incident reporting" are used in the ordinary sense and illustratively; exact legal requirements vary by jurisdiction and deployment class.

H-bis.2 Post-market monitoring & incident handling (illustrative flow)

[HB020] Monitoring loop.

1. Ingest verifications and continuity records into an audit store (receipt corpus; § [0109]).
2. Detect revocation, inconsistency, or policy-contradiction signals (Appendix A [A030] codes including STALE_STH, DUAL_ANCHOR_NONCOLLUSION, ATTESTATION_REVOKED).
3. Anchor revocation/incident artifacts (revocation entry, ConflictCertificate, or NCC as applicable).
4. Update settlement state (SettlementTranscript; § [0104]) and publish EvidenceBundle-EXT for regulators (Appendix H).
5. Report RVT/Incident bundle on request (Appendix E [E080], Appendix H).

[HB021] Minimal 'incident' bundle (illustrative).

RECEIPT+ANCHOR+VERIFICATION_TRANSCRIPT (pre-incident)

Revocation/Conflict artifact (RT/ConflictCertificate/NCC)

Updated VERIFICATION_TRANSCRIPT/SETTLEMENT_TRANSCRIPT

Optional RVT (redacted), EvidenceBundle signature (Appendix H [H012])

H-bis.3 HL7 FHIR mapping (AuditEvent/Provenance) →PoPC fields (illustrative)

[HB030] FHIR AuditEvent→PoPC.

type/subtype→AIC operation/policy facet.

recorded→trusted_timestamp (t_end) (Appendix A [A008]; § [0042A]).

outcome/outcomeDesc→VerificationTranscript.status/codes (Appendix E [E010]).

agent (who/altId/role)→actor/service identifiers in receipts/provenance.

source→log_id/verifier id.

entity (what)→resource scope/scope_digest; securityLabel→policy tags.

signature→Transcript/Certificate signatures (Appendix E).

[HB031] FHIR Provenance→PoPC.

target→receipt_id (and any derived artifacts like transcripts).

recorded→trusted_timestamp (t_end).

agent (who/onBehalfOf)→actor/service/verifier identities.

activity/reason→AIC op/policy rationale.

entity (used/derived)→inputs/outputs (canonicalized) references.

signature→signatures.engine/transcript signatures.

[HB032] Export guidance (illustrative).

Export RVT and VerificationTranscript as attachments in FHIR bundles; include Anchor essentials (log_id, tree_head, inclusion/consistency proofs).

Use EvidenceBundle-BATCH for multi-receipt audits (Appendix H).

[HB040] Conformance & disclaimers. These mappings are illustrative interop guides. Equivalent regulatory frameworks (e.g., other jurisdictional AI safety or logging obligations) may be satisfied by substantially the same PoPC artifacts (receipts+anchors+transcripts+evidence bundles). Nothing herein limits the claims or incorporates external documents by reference.

APPENDIX I—THREAT MODEL & ASSURANCE CLAIMS MAPPING

[I001] Purpose & scope. This appendix maps threats to the assurance predicates enforced by the PoPC rail, with pointers to normative definitions. It is illustrative and non-limiting; the claims control.

[I002] Terminology. Predicates and artifacts use the meanings in Appendix A; logs are publicly verifiable append-only; commitments are leaf digests of the canonical Minimal ReceiptCore.

I.1 Threat→Predicate mapping

[I010] Replay & nonce recycling.

Mitigation: nonce, session_id, monotonic_counter uniqueness (Appendix A [A025]13; §§ [0045], [0053]).

Assurance claim: receipts reusing (nonce, session_id) in (log_id, aic_id) are INVALID; counter rollback INVALID.

[I011] Time-shifting/staleness.

Mitigation: MMD freshness and continuity (Appendix A [A041], [A042]; §§ [0044A], [0055A]).

Assurance claim: inclusion referencing an STH older than MMD INVALID; STH advance requires consistency proof.

[I012] Log equivocation/collusion.

Mitigation: dual-anchor non-collusion and DACC certificates (Appendix A [A048]; Appendix E [E050], [E051]).

Assurance claim: disagreeing anchors or missing consistency produce ConflictCertificate; acceptance requires NCC.

[I013] Consent spoofing/UI overlays.

Mitigation: platform-authenticator prompts and prompt-attestation (Appendix A [A043]; §§ [0058A]-[0058B]).

Assurance claim: high-assurance profiles may reject receipts lacking prompt-attestation.

[I013A] Prompt-laundering/overlay drift.

Mitigation: PROMPTCAPS binding (PC_H, PC_LEVEL) to {C_RC, scope, RPID} and verifier-echoed confirmation; denial on mismatch. Assurance claim: absent or mismatched capsule→no mint (MAV) in high-assurance profiles.

[I013B] AI mimicry/simulated consent. Threat: systems that simulate consent/obedience to obtain follow-on privileges. Predicate defenses (illustrative): prompt-attestation, PromptCaps binding to {Minimal ReceiptCore digest, scope, audience}, HITL for high-risk classes, and deny on any binding mismatch. (Illustrative; claims control.)

[I014] Scope/audience overreach (token laundering).

Mitigation: scope digest & audience-binding (Appendix A [A013], [A044]; §§ [0060]-[0061B], [0107]).

Assurance claim: connectors deny tokens with TTL/scope/audience mismatches.

[I015] Attestation revocation/key bans.

Mitigation: revocation window and re-checks (Appendix A [A014]; §§ [0049A], [0054]).

Assurance claim: revocation during the window→CLAWBACK/REVOKED.

[I016] Tamper-evidence & repudiation.

Mitigation: ReceiptCore→cryptographic commitment→Anchor (Appendix A [A008], [A028]; §§ [0044], [0096]).

Assurance claim: commitment mismatches or missing inclusion proof→INVALID (E001/INVALID_ANCHOR, E020/ANCHOR_NOT_FOUND).

[I017] Non-determinism drift/replayed compute.

Mitigation: determinism_salt, code_measurement, recompute guard (Appendix A [A007]; §§ [0048]-[0048A]).

Assurance claim: output recomputation mismatch→INVALID (E015 IO_DIGEST_MISMATCH).

[I018] Oracle falsification (outcome fraud).
Mitigation: oracle attestation+anchoring (Appendix A [A060]; Appendix E [E040]; Appendix D [D061] oracle routes).
Assurance claim: missing or conflicting oracle anchors→HOLD/CLAWBACK or INVALID per policy.

[I019] PQ signature downgrade.
Mitigation: PQ cutover & dual-sig policy (Appendix A [A017]; § [0057]).
Assurance claim: post-cutover receipts without PQ signature→INVALID (E019 PQ_REQUIRED).

[I019A] Device actuation hazards.
Mitigation: RUN_PERMIT latch, timing budgets, CDT, hazard class, quarantine (Appendix A [A055]-[A059]; §§ [0156]-[0156J], [0120]-[0121]).
Assurance claim: violation of timing/cadence/geofence→deny & evidence transcript.

I.2 Claims & evidence references

[I020] Evidence sources.
Receipts, proofs, transcripts, certificates, oracle attestations, RSC/PoA, and anchor artifacts provide independently verifiable evidence. See Appendix D [D050], [D061] and Appendix E.

[I021] Packaging.
Auditor bundles (Appendix H) deliver the minimal artifacts needed to reproduce validations, including MMD/continuity policy, codes[ ], and optional anchors for transcripts/certificates.

[I022] Non-limiting nature.
Threats and mappings herein are illustrative; deployments may add controls (e.g., aTLS sessions per Appendix A [A044A]) without departing from the claims.

APPENDIX J—GOLDEN INTEROP TEST VECTORS (ILLUSTRATIVE)

[J001] Purpose. Provide reproducible, cross-implementation validation for auditors and integrators using canonical payloads and expected outcomes. These vectors exercise the nucleus of the rail-Minimal ReceiptCore→commitment-→public anchoring under MMD→Mint-After-Verify—as articulated in the main body and Preliminary Remarks.
Illustrative; claims control. These examples and schemas are interoperability aids and do not alter Minimal ReceiptCore semantics or the claim scope.

[J010] Vector set (verifier status first; connector decision in parentheses when relevant).

TV-1 VALID. Minimal ReceiptCore→leaf commitment (receipt_id=H(canonical(Minimal ReceiptCore))=anchor.commitment). STH/SSH is fresh; inclusion and (if advanced) consistency proofs verify.
Verifier status: VALID; connector decision (if gating): ALLOW.

TV-2 STALE_STH. Inclusion proof references an STH/SSH older than the freshness policy (MMD).
Verifier status: INVALID with E013 STALE_STH; connector decision: DENY.

TV-3 DUAL_ANCHOR_NONCOLLUSION. Dual-anchor profile enabled; independent logs disagree on the committed leaf or a required consistency proof fails for either STH/SSH chain.
Verifier status: INVALID with E014 DUAL_ANCHOR_NONCOLLUSION.

TV-4 IO_DIGEST_MISMATCH. Recompute guard fails for {AIC, inputs, determinism_salt, code_measurement}; canonical output_digest does not match the ReceiptCore digest.
Verifier status: INVALID with E015 IO_DIGEST_MISMATCH.

TV-5 TTL_EXPIRED. Capability token (CPT) TTL has expired at the connector boundary; no change to the already-minted receipt.
Verifier status: unchanged; connector decision: DENY with E008 TTL_EXPIRED (suggested HTTP 401/403 per Appendix A mappings).

[J020] Vector format (interoperable envelope).
Vectors SHOULD be provided as JSON (or canonical CBOR) objects that carry both the inputs and the expected outcomes. Minimal shape:

```
{
  "id": "TV-1",
  "profile": "P1|P2|P3|...",
  "inputs": {
    "minimal_receipt_core": { /* policy_digest, boundary_measurement, input_digest,
output_digest, monotonic_counter, t_end */ },
  "anchor": {
    "log_id": "string",
    "tree_head": "base64url",
    "commitment": "hex64",
    "inclusion_proof": [
      { "sib": "hex64", "pos": "L" }
    ],
    "consistency_proof?": ["hex64","hex64"]
  },
  "aic?": { /* if needed for recompute */ },
  "determinism?": { "code_measurement": "hex64", "determinism_salt": "hex≥32" },
  "cpt?": { "ttl_utc": "RFC3339", "scope_digest": "hex64", "rpid?": "..." }
},
  "expected": {
  "verify": { "status":
"VALID|INVALID|PENDING|REVOKED|DISPUTED|SETTLED|CLAWED_BACK",
"codes": ["E0xx", "..."] },
    "connector?": { "decision": "ALLOW|DENY|HOLD", "codes": ["E0xx", "..."], "http?": 401 }
  }
}
```

JSON/CBOR canonicalization MUST follow Appendix D.A; digests are lowercase hex.
codes[ ] MUST use Appendix A [A030] identifiers.
status MUST use the API/transcript lexicon (Appendix E VerificationTranscript.status).
decision is connector-local (MAV/FOP gate) and is intentionally separate from status.

[J025] Notes & rigor.
Proof shape: inclusion_proof uses {sib,pos} pairs; consistency_proof is carried inside anchor when present (see Appendix D [D050]).”
Status/decision separation. Keep “status” reserved for verifier results and transcripts; use “decision” only at connector gates. This prevents UI/API drift and makes gate behavior auditable across deployments.
Consistency on advance (MUST). Where a newer STH/SSH than anchor.tree_head is available within MMD, the vector MUST include a consistency_proof; omission yields E022 CONTINUITY_MISSING in profiles that require it.
Dual-anchor vectors. When applicable, include two Anchor objects (distinct log_ids) and an expected E014 on disagreement.
Recompute vectors. Provide {AIC, canonicalized inputs, determinism_salt, code_measurement} sufficient to reproduce output_digest byte-for-byte.
Connector-only failures. TTL, audience, or scope issues are exercised as connector decisions (e.g., E008, E018, E007), leaving the verifier status unchanged unless policy elevates them.
Illustrative, claims-neutral. Vectors demonstrate the normative rules (Minimal ReceiptCore→public anchor→freshness/consistency→MAV fail-closed) without limiting claim scope.

APPENDIX K—REFERENCE VERIFIER API (OPENAPI SKETCH, NON-LIMITING)

[K001] Purpose & scope. A minimal, implementation-agnostic surface that: (i) validates STH/SSH signature→inclusion→(on advance) consistency within MMD; (ii) enforces Mint-After-Verify (MAV) (fail-closed); (iii) emits signed verification/settlement transcripts; and (iv) optionally handles batch and continuity for audit. Lifecycle status per [A019] is distinct from the gate decision (ALLOW/HOLD/DENY) for Follow-On Privileges (FOP).

Illustrative; claims control. These examples and schemas are interoperability aids and do not alter Minimal ReceiptCore semantics or the claim scope.

[K002] Security. HTTPS/TLS 1.3; mTLS RECOMMENDED; aTLS OPTIONAL where profiles require attested clients ([A044A]). Clients SHOULD send Idempotency-Key on POST. Verifier MAY run in a TEE/HSM; its measurement/key_id SHOULD be echoed in transcripts (Appendix E).

[K003] Decision semantics (informative).

status ∈{PENDING, VALID, REVOKED, DISPUTED, INVALID, SETTLED, CLAWED_BACK}.

decision ∈{ALLOW, HOLD, DENY}. Typical mapping: VALID→ALLOW (subject to revocation window); REVOKED/INVALID→DENY; PENDING→HOLD.

[K010] Endpoints (overview).
GET/verify—verify one receipt by receipt_id.
POST/verify/batch—verify a set of receipts.
GET/continuity/{log_id}—retrieve continuity records.
POST/settle—release/hold/claw back under revocation-window policy.

Normative alignment. /verify performs the checks in D.E: STH/SSH signature, inclusion, MMD freshness, consistency on advance, optional dual-anchor, optional recompute guard; codes MUST be from [A030]. [K011] GET/verify—minimum response (illustrative).

```
{
  "version": 1,
  "receipt_id": "^[a-f0-9]{64}$",
  "status": "PENDING | VALID | REVOKED | DISPUTED | INVALID |
SETTLED | CLAWED_BACK",
  "decision": "ALLOW | HOLD | DENY",
  "codes": ["E0xx", "E0yy"],
  "sth_ids": [
    { "log_id": "string", "root_hash": "^[a-f0-9]{64}$", "tree_size": 0,
"timestamp": "2025-01-01T00:00:00Z" }
  ],
  "continuity": {"from": "...", "to": "..." },
  "transcripts": [
    "<base64url(VerificationTranscript JSON)>",
    "<base64url(VerificationTranscript JSON)>"
  ]
}
```

For dual-anchor profiles, return one signed VerificationTranscript per log in transcripts[ ]. Each transcript carries a single sth_id as defined in Appendix E [E010]. Single-log deployments MAY return transcripts with one element.

[K012] POST/verify/batch—minimum request/response (illustrative).

```
// request
{ "receipt_ids": ["0123 ...<64 hex>", "..."], "dual_anchor_required": false }
// response
{
  {
  "version": 1,
  "results": [
    {
      "receipt_id": "...",
      "status": "VALID",
      "decision": "ALLOW",
      "codes": [ ],
      "sth_ids": [
        { "log_id": "ct:example.org", "root_hash": "hex64", "tree_size":
        123, "timestamp": "..." }
      ],
      "transcripts": ["<base64url>", "<base64url>"]
    }
  ],
  "continuity": [{ "log_id": "ct:example.org", "from": "...", "to": "..." }]
}
```

[K013] GET/continuity/{log_id}—shape (illustrative).

```
{
  "log_id": "ct:example.org",
  "records": [
    { "from_tree_size": 1200, "to_tree_size": 1500, "proof": ["hex64",
"hex64"], "timestamp": "2025-01-01T00:00:00Z" }
  ]
}
```

[K014] POST/settle—minimum request/response (illustrative).

```
// request
{ "receipt_id": "0123 ...<64 hex>", "action": "RELEASE | HOLD |
CLAWBACK" }
// response
```

-continued

```
{
  "version": 1,
  "receipt_id": "...",
  "disposition": "SETTLED | CLAWED_BACK | HOLD",
  "settlement_tx": "<base64url?>",
  "codes": ["E0xx"],
  "transcript": "<base64url(SettlementTranscript JSON)>"
}
```

[K015] Error & HTTP mapping (suggested). Return both machine codes[ ] and HTTP: 409 (nonce/session reuse), 412 (COUNTER_ROLLBACK/TIME_CONFIDENCE_LOW /CONTINUITY_MISSING), 424 (ANCHOR/ATTESTATION_FAILURE), 401/403 (auth/consent), 408/422 (ALB/CDT). Codes MUST be Appendix A [A030].

[K016] Normative guardrails (alignment).

(a) STH/SSH signature, inclusion, and (on advance) consistency within MMD MUST validate; reject stale STH or missing consistency when newer heads are in scope.

(b) MAV: no ALLOW unless (a) passes; tokens/settlement/device RUN_PERMIT fail-closed otherwise.

(c) Recompute guard (when determinism metadata present) is RECOMMENDED; mismatch→INVALID with E015.

APPENDIX L—RUN_PERMIT REFERENCE BOARD (ILLUSTRATIVE)

[L001] Purpose. A simple, auditable device-side latch that asserts RUN_PERMIT only after a fresh VALID verification under MAV; any denial/fault drives RUN_PERMIT:=0 (fail-closed). Hardware is illustrative; any equivalent gating that preserves these semantics is acceptable.

[L002] Signals (representative).

RUN_PERMIT (digital): high enables actuation path(s).

DENY_LED (digital): latched on deny/fault.

ACT_SIG (digital/analog): downstream actuator enable.

VER_OK (digital): edge from verifier module when decision==ALLOW and status==VALID (or policy "VALID within revocation HOLD window").

Q_MODE (digital): quarantine (sticky until signed clear).

WD_CLK (digital): watchdog tick to detect verifier silence.

[L003] Recommended wiring (example). RUN_PERMIT drives a normally-closed safety relay (NC opens on loss of power or any fault). DENY_LED is OR-wired from deny causes (codes mirrored in the actuation transcript).

[LL010] Timing budgets.

Allow Latency Budget (ALB): enforce t_act-t_val≤ALB; else E024 ALB_EXCEEDED and force RUN_PERMIT:=0.

Cadence Delta Threshold (CDT): streaming cadence bound; exceed→E025 CDT_EXCEEDED and HOLD/QUARANTINE.

Watchdog: verifier silence beyond policy timeout→SAFE (RUN_PERMIT low)+denial transcript.

[L015] Narrative state model.

SAFE—Default/deny state. Entered on boot, any fault, any stale/invalid anchor, or policy contradiction. Device listens for a fresh verifier decision.

VERIFYING—Receipt observed but final freshness/consistency checks pending; RUN_PERMIT remains 0. Any MMD breach or STH/SSH consistency failure returns to SAFE.

ARMED—A fresh ALLOW decision under MAV; RUN_PERMIT:=1. Any adverse signal (revocation, dual-anchor mismatch, recompute failure, audience mismatch, ALB/CDT breach, watchdog miss) instantly drops to SAFE.

QUARANTINE—Optional fail-safe mode for high assurance profiles after a policy breach or dual-anchor disagreement. RUN_PERMIT:=0; the board ignores new actuation requests until a fresh ALLOW and a self-test pass are observed.

[L020] Self-test (mandatory). On boot and at least once per duty cycle, synthesize deny→allow and allow→deny transitions and emit a signed Actuation Transcript within ALB. Failure to produce either transition within ALB→QUARANTINE.

[L021] Actuation Transcript (illustrative JSON).

```
{
  "version": 1,
  "device_id": "string",
  "run_permit_before": 0,
  "run_permit_after": 1,
  "decision": "ALLOW | DENY | HOLD",
  "receipt_id": "0123 ...<64 hex>",
  "codes": ["E0xx"],
  "alb_ms": 42,
  "cdt_ms": 900,
  "created_utc": "2025-01-01T00:00:00Z",
  "signature": "<base64url(cose)>"
}
```

For audits, bundle with the VerificationTranscript—and—optionally-anchor via /transcript/anchor.

[L030] Fault causes→canonical codes (representative).

Stale/missing proofs→E013 STALE_STH, E022 CONTINUITY_MISSING→SAFE/QUARANTINE.

Dual-anchor disagreement→E014 DUAL_ANCHOR_NONCOLLUSION→QUARANTINE.

Recompute mismatch→E015 IO_DIGEST_MISMATCH→SAFE (deny).

Policy/consent/audience failures at connector→401/403 with policy codes; device stays SAFE.

[L040] Conformance checkpoints (device).

Power-on default SAFE (RUN_PERMIT low; NC relay open).

Enforce MAV: only raise RUN_PERMIT on fresh VALID transcript (and revocation window policy).

Enforce ALB/CDT and watchdog; on breach→SAFE+actuation transcript.

Perform dual-anchor check where profile requires.

[L050] Reference pseudocode (illustrative).

```
on VerificationEvent(T):
  #T is a VerificationTranscript (Appendix E [E010])
  if T.status !=VALID: deny("E013") #treat non-VALID as
    not fresh/acceptable
  else if ("E013" in T.codes) or ("E022" in T.codes):
    deny("E013") #stale STH or missing continuity
  else if dualAnchorRequired and (("E014" in T.codes) or
    ("E023" in T.codes)): quarantine("E014") #disagree-
    ment/NCC missing
  else if now—parseUtc(T.created_utc)>ALB: deny
    ("E024") # use transcript timestamp
  else RUN_PERMIT:=1
```

APPENDIX M—SECURITY CONSIDERATIONS (NON-LIMITING)

[M001] Scope. This appendix summarizes optional profiles and operational hardening measures. It is illustrative and non-limiting; the claims control.

[M010] Crypto-agility & PQ migration. Long-horizon deployments SHOULD dual-sign receipts and transcripts (classical+post-quantum) and record suite identifiers; validators SHOULD accept suite rotation and verify continuity. See §§ [0057], [0042], Appendix A [A017].

[M020] Trusted time & freshness. Verifiers MUST enforce the freshness threshold (MMD) for inclusion/consistency (STH/SSH) and SHOULD maintain continuity records. The Minimal ReceiptCore's trusted timestamp is the numeric time64 value t_end (see § [0042A]); any human-readable RFC 3339 timestamps appear only in transcripts or non-Core extensions and do not affect the Core commitment. High-assurance profiles MAY enable Tri-Source Trusted Time (TCS) per § [0053A]. See §§ [0044A], [0055A].

[M030] Dual-anchor non-collusion. For higher-value flows, deployments SHOULD require two independent anchors and deny on disagreement or missing consistency. See §§ [0044B], [0044D], Appendix A [A107].

[M040] Attestation & determinism fallback. On attestation revocation or trust downgrade, recompute-verified deterministic runs (given {AIC, canonical inputs, determinism_salt, code_measurement}) MAY serve as an alternate correctness path; any mismatch fails closed. See §§ [0048A], [0049A].

[M041] Hardening Profile: Child Safety (CSPO1) illustrative only.

Deployments serving minors MAY enforce one or more of the following at Mint-After-Verify gatepoints, without altering ReceiptCore semantics:

- Age-mode predicate (e.g., "age ≥13" or "minor present") proven by attested attribute or ZK set-membership.
- Guardian co-presence (two-person rule) via a platform-authenticator assertion bound to the ReceiptCore digest and capability-token scope; missing/expired→structured deny (e.g., CONSENT_MISSING/KIDS_POLICY).
- Content-class & ad-cadence caps with machine-readable deny codes on violation.
- Regulator-mode emissions: include CSP flags in verification/settlement transcripts for audit, with privacy-preserving redaction where applicable.

(Illustrative/non-limiting; claims control. Equivalent mechanisms are within scope.)

[M050] Policy binding. Mint-after-verify SHALL NOT occur unless the receipt's policy_digest matches the compiled AIC policy and any ZK policy proofs validate against that digest. See Appendix A [A025](II), §§ [0060]-[0061].

[M060] Privacy & biometrics. Minimal ReceiptCore MUST NOT contain PII/biometric templates; regulator views SHOULD use selective-disclosure/ZK proofs. Where biometrics are used upstream, template-free mechanisms (e.g., neural fuzzy extractors) are recommended. See §§ [0030], [0062], [0058A.2]-[0058A.3].

[M070] OutcomeRank fairness & Sybil resistance. High-assurance ranking SHOULD enforce independence/diversity floors and publish a signed ranking transcript committing to receipt and STH/SSH identifiers used; non-compliant scores are provisional. See §§ [0064]-[0065], [0111B], Appendix A [A097]-[A103].

[M080] Log split-view mitigation. Verifiers SHOULD periodically gossip recent STH/SSH identifiers and anchor signed continuity records to deter split-views. See § [0044E], Appendix A [A074].

[M085] Deception/mimicry guard (non-limiting). High-assurance profiles SHOULD require: (i) prompt-attestation via platform-authenticator; (ii) PromptCaps binding (PC_H/PC_LEVEL) to the Minimal ReceiptCore digest and capability-token scope; (iii) HITL approval for designated risk classes; and (iv) audience-bound tokens with deny-on-mismatch. These controls are illustrative and do not alter ReceiptCore, anchoring, freshness, or MAV semantics.

[M086] Consent integrity safeguards (illustrative).

High-assurance profiles SHOULD require platform-authenticator prompt-attestation and deny simulated or automated mimicry of consent; where configured, PromptCaps bindings (PC_H/PC_LEVEL) to {Minimal ReceiptCore digest, scope, audience}SHOULD be verified, with HITL required for designated risk classes. ReceiptCore and MAV invariants remain the sole validity gates. (Illustrative; claims control.)

[M087] Dynamic consent & revocation. Where applicable, consent withdrawals SHOULD anchor revocation entries and be reflected in verification/settlement transcripts; redacted audit views SHOULD remain selectively verifiable. See § [0054A], § [0062].

[M088] Interop registry. Deployments MAY maintain registries for digest/sig suites and io_canon parameters to ensure consistent validation; claims remain independent of any registry. See § [0043A], Appendix A [A037].

APPENDIX N—R$^2$UA SCHEMAS (UNLEARNING & ATTRIBUTION)

[N001] Purpose. Provide machine-readable schemas for UT/UC/AC referenced in [A141] and Appendix H, aligning error codes E027/E028/E029. Illustrative; claims control. These examples and schemas are interoperability aids and do not alter Minimal ReceiptCore semantics or the claim scope.

[N010] UnlearningTranscript (JSON Schema).

```
{
  "$id": "https://spec.popc.dev/schema/unlearning-transcript.json",
  "title": "Unlearning Transcript (UT)",
  "type": "object",
  "required":
["version","target_set_commit","mid_pre","mid_post","method","timings","signature","created_
utc"],
  "properties": {
    "version": { "type": "integer", "minimum": 1, "default": 1 },
    "target_set_commit": { "type": "string", "pattern": "^[a-f0-9]{64}$" },
    "mid_pre": { "type": "string", "pattern": "^[a-f0-9]{64}$" },
    "mid_post": { "type": "string", "pattern": "^[a-f0-9]{64}$" },
    "method": {
      "type": "object",
      "required": ["id","version"],
      "properties": { "id": { "type": "string" }, "version": { "type": "string" } },
      "additionalProperties": false
    },
    "proof": { "type": "string", "contentEncoding": "base64url", "contentMediaType":
```

-continued

```
"application/cbor" },
      "vk_ref": { "type": "string" },
      "timings": {
         "type": "object",
         "properties": { "start": { "type": "string", "format": "date-time" }, "end":
{ "type":"string","format": "date-time" } },
         "additionalProperties": false
      },
      "codes": { "type": "array", "items": { "type": "string" } },
      "anchor": { "$ref": "https://spec.popc.dev/schema/anchor.json" },
      "signature": { "type": "string", "contentEncoding":"base64url",
"contentMediaType": "application/cose" },
      "created_utc": { "type": "string", "format": "date-time" }
   },
   "additionalProperties": false
}
```

[N020] UnlearningCertificate (JSON Schema).

```
{
   "$id": "https://spec.popc.dev/schema/unlearning-certificate.json",
   "title": "Unlearning Certificate (UC)",
   "type": "object",
   "required": ["version","target_set_commit","guarantee","status","signature","created_utc"],
   "properties": {
      "version": { "type": "integer", "minimum": 1, "default": 1 },
   "target_set_commit": { "type": "string", "pattern": "^[a-f0-9]{64}$" },
   "guarantee": {
      "type": "object",
      "required": ["policy_id","params"],
      "properties": { "policy_id": { "type":"string" }, "params": { "type":"object" } },
      "additionalProperties": true
   },
   "status": { "type": "string", "enum": ["PASS","FAIL","REVOKED","HOLD"] },
   "anchor": { "$ref": "https://spec.popc.dev/schema/anchor.json" },
   "codes": { "type": "array", "items": { "type": "string" } },
   "signature": { "type": "string", "contentEncoding":"base64url",
"contentMediaType":"application/cose" },
      "created_utc": { "type":"string", "format":"date-time" }
   },
   "additionalProperties": false
}
```

[N030] AttributionCertificate (JSON Schema).

```
{
   "$id": "https://spec.popc.dev/schema/attribution-certificate.json",
   "title": "Attribution Certificate (AC)",
   "type": "object",
   "required": ["version","contributor_set_commit","method","signature","created_utc"],
   "properties": {
      "version": { "type": "integer", "minimum": 1, "default": 1 },
      "contributor_set_commit": { "type": "string", "pattern": "^[a-f0-9]{64}$" },
      "weights_digest": { "type": "string", "pattern": "^[a-f0-9]{64}$" },
      "method": {
         "type": "object",
         "required": ["id", "version"],
         "properties": { "id": { "type": "string" }, "version": { "type": "string" } },
         "additionalProperties": false
      },
      "anchor": { "$ref": "https://spec.popc.dev/schema/anchor.json" },
      "codes": { "type": "array", "items": { "type": "string" } },
      "signature": { "type": "string", "contentEncoding": "base64url",
"contentMediaType": "application/cose" },
      "created_utc": { "type":"string","format": "date-time" }
   },
   "additionalProperties": false
}
```

[N040] Error mapping.

E027 UNLEARNING_REQUIRED (policy needs UT/UC); E028

UNLEARNING_PROOF_INVALID; E029 ATTRIBUTION_MISMATCH.

[N050] Evidence & bundles. UT/UC/AC items slot directly into Appendix H [HO11] and commit via MinimalBundleCore [H013].

APPENDIX O—DETERMINISTIC RECOMPUTE & DRT

[O001] Purpose. Operationalize the Recompute Guard ([A077]) and the Deterministic Recompute Transcript (DRT) ([A116]) with concrete schema and a challenge flow keyed to STH/SSH. Illustrative; claims control. These examples and schemas are interoperability aids and do not alter Minimal ReceiptCore semantics or the claim scope

[O010] Salt derivation (normative profile).

When present, determinism_salt SHOULD be derived via HKDF-SHA256 as:

salt="popc:v1:determinism"

IKM=boundary_measurement||aic_id||input_digest info="drt:"||STH_id (from [A114])||challenge_nonce (from [A051])

determinism_salt=HKDF-Expand(HKDF-Extract(salt, IKM), info, L)

Record the derivation reference in the transcript (see [0020]).

[O020] DeterministicRecomputeTranscript (DRT, JSON Schema).

```
{
  "$id": "https://spec.popc.dev/schema/drt.json",
  "title": "Deterministic Recompute Transcript (DRT)",
  "type": "object",
  "required":
["version","receipt_id","io_canon","code_measurement","determinism_salt_ref","recompute_status",
"output_digest","signature","created_utc"],
  "properties": {
    "version": { "type": "integer", "minimum": 1, "default": 1 },
    "receipt_id": { "type": "string", "pattern": "^[a-f0-9]{64}$" },
    "io_canon": { "type": "object", "required": ["alg"], "properties": { "alg":
{ "type":"string","enum":["jcs","cbor"] }, "params": { "type": "object" } } },
    "code_measurement": { "type": "string", "pattern": "^[a-f0-9]{64}$" },
    "determinism_salt_ref": { "type": "string", "description": "description or URI of derivation per
O010" },
    "output_digest": { "type": "string", "pattern": "^[a-f0-9]{64}$" },
    "recompute_status": { "type": "string", "enum":
["MATCH","MISMATCH","INCOMPLETE"] },
    "anchor": { "$ref": "https://spec.popc.dev/schema/anchor.json" },
    "codes": { "type": "array", "items": { "type": "string" } },
    "signature": { "type": "string", "contentEncoding":"base64url",
"contentMediaType":"application/cose" },
    "created_utc": { "type": "string", "format": "date-time" }
  },
  "additionalProperties": false
}
```

[O030] Challenge flow (illustrative).

Verifier issues STH-bound challenge_nonce ([A051]); recomputer runs under attested code_measurement with canonical inputs; emits DRT with recompute_status. MISMATCH→E015 IO_DIGEST_MISMATCH and DENY; MATCH may be a required bit for REG-01 ([A108]).

[O040] Evidence & bundles. DRT can be included in EvidenceBundles (Appendix H; item DRT) and optionally anchored.

What is claimed is:

1. A computer system comprising one or more processors and non-transitory memory storing instructions that, when executed, cause the system to operate as a policy-compliant execution rail, the system comprising: (a) a remotely attestable trusted compute boundary comprising at least one of a trusted execution environment (TEE), a hardware security module (HSM), or a verifiably deterministic audited sandbox; (b) a policy engine within the trusted compute boundary configured to evaluate a compiled, machine-readable policy against canonicalized inputs; (c) an input/output normalizer configured to deterministically canonicalize inputs and outputs; (d) a receipt generator configured to emit a non-replayable policy-compliance receipt that includes a ReceiptCore comprising: (i) a boundary measurement of the trusted compute boundary, (ii) a digest of the compiled policy, (iii) a canonical input digest, (iv) a canonical output digest, (v) a monotonic counter value, and (vi) a trusted timestamp (t_end), and further configured to generate, using a key sealed within the trusted compute boundary, a digital signature over a canonical encoding of the ReceiptCore; (e) an anchoring module configured to compute a leaf commitment digest by applying at least one cryptographic hash function to the canonical encoding of the ReceiptCore, and to record the leaf commitment digest in a transparency-style publicly verifiable append-only log that publishes signed heads including Signed Tree Heads (STHs) or Signed Set Heads (SSHs) (STH/SSH), each signed head including at least a head commitment value (for an STH, a root hash; for an SSH, a set commitment value) and a digital signature; and (f) a continuation module configured to: (i) obtain, from the append-only log, an STH/SSH and an inclusion proof for the leaf commitment digest; (ii) verify a digital signature of the obtained STH/SSH; (iii) enforce a freshness threshold by determining that the obtained STH/SSH is within a maximum-merge-delay (MMD) freshness bound relative to t_end; (iv) validate the inclusion proof by iteratively hashing the leaf commitment digest with proof elements specified by the inclusion proof, in an order specified by the inclusion proof, to compute a head commitment value, and compare the computed head commitment value to the head commitment value of the obtained STH/SSH; (v) when a newer STH/SSH is available within the MMD freshness bound, obtain the newer STH/SSH and a corresponding append-only consistency proof, and validate the append-only consistency proof from the obtained STH/SSH to the newer STH/SSH; and (vi) mint a capability token only after the validation in (ii)-(v), the capability token being cryptographically bound to a digest of the canonical ReceiptCore and required to gate a subsequent operation, wherein the subsequent operation is prevented unless the capability token is presented and successfully verified, and wherein upon any failure of (ii)-(v) the capability token is withheld and the subsequent operation is denied.

2. The system of claim 1, wherein the ReceiptCore consists essentially of the boundary measurement, the policy digest, the canonical input digest, the canonical output digest, the monotonic counter, and the trusted timestamp; and excludes anchors, inclusion proofs and consistency proofs, signatures (including post-quantum signatures), zero-knowledge proofs, provenance, a model-identity digest, code_measurement, determinism_salt, io_canon, t_start, nonce, session_id, parent_receipt_id, and extensions.

3. The system of claim 1, wherein the input/output normalizer deterministically canonicalizes the inputs and outputs using deterministic JSON canonicalization (RFC 8785), canonical CBOR encoding, fixed-field ordering, or length-prefix encoding, and wherein the receipt generator derives a determinism_salt from at least (i) the trusted boundary measurement and (ii) a verifier-supplied challenge nonce bound to an STH/SSH identifier used for validation, and uses the determinism_salt such that, given the canonical inputs and an attested code measurement, the canonical output_digest recomputes identically.

4. The system of claim 1, wherein the capability token encodes a relying-party identifier for a destination service and is cryptographically bound to (i) a digest of the canonical ReceiptCore and (ii) the token's scope, and wherein the continuation module denies the subsequent operation when the relying-party identifier does not match an identifier attested by a verifier service for the requested operation.

5. The system of claim 1, wherein the policy engine is configured to reject execution when the monotonic counter is not strictly greater than a previously recorded counter value for the same boundary measurement, or when the trusted timestamp is stale by more than a threshold interval, or when an attestation revocation or endorsement failure is detected for the trusted compute boundary.

6. The system of claim 1, wherein the anchoring module is further configured, prior to minting the capability token, to (i) validate an inclusion proof that the commitment is included in the log under an STH/SSH obtained within a freshness threshold; and (ii) validate that the referenced STH/SSH satisfies the freshness threshold.

7. The system of claim 1, wherein, upon detecting that a newer STH/SSH is available, the anchoring module obtains and validates a cryptographic consistency proof linking a previously observed STH/SSH to the newer STH/SSH to demonstrate append-only growth of the log.

8. The system of claim 1, wherein (i) the trusted compute boundary comprises a remotely attestable TEE or HSM, and validating remote attestation comprises: (a) verifying an endorsement chain and certificate path for an attestation key to a manufacturer root; (b) checking revocation status; and (c) comparing a reported boundary measurement to an expected boundary measurement recorded in a policy manifest or Atomic Intent Contract (AIC); and (ii) the continuation module encodes an expiration and a scope in the capability token and denies the subsequent operation when any of (a) the token's binding to the cryptographic commitment over the canonical ReceiptCore, (b) the expiration, or (c) the scope fails to match the policy-compliance receipt or the requested operation.

9. The system of claim 1, wherein minting the capability token further requires, within the trusted compute boundary, verification of an authenticator assertion produced by a platform-resident authenticator, the assertion being cryptographically bound to (i) a digest of the canonical ReceiptCore and (ii) the capability token's scope.

10. The system of claim 1, wherein the policy-compliance receipt further comprises a zero-knowledge proof segment that attests to at least the policy digest and the canonical input and output digests without revealing plaintext inputs or policy contents.

11. The system of claim 1, wherein the policy-compliance receipt further comprises, outside the ReceiptCore, a model-identity digest of at least one of model weights and code segments used during the operation.

12. The system of claim 1, wherein an Atomic Intent Contract designates the policy as confidential and includes commitments to one or more policy predicates, and wherein the continuation module mints the capability token only upon successful verification, within the trusted compute boundary, of a zero-knowledge proof that (i) the committed predicates were evaluated over canonicalized inputs bound into the ReceiptCore and (ii) the predicates evaluate to true for the execution context without revealing the predicates or underlying data.

* * * * *